US011633683B2

(12) United States Patent
Louison et al.

(10) Patent No.: US 11,633,683 B2
(45) Date of Patent: Apr. 25, 2023

(54) EASY TO SERVICE AIR FILTER

(71) Applicant: Cummins Filtration IP, Inc., Columbus, IN (US)

(72) Inventors: Matthew Louison, McFarland, WI (US); Travis E. Goodlund, McFarland, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

(21) Appl. No.: 16/961,176

(22) PCT Filed: Jan. 10, 2019

(86) PCT No.: PCT/US2019/012985
§ 371 (c)(1),
(2) Date: Jul. 9, 2020

(87) PCT Pub. No.: WO2019/140045
PCT Pub. Date: Jul. 18, 2019

(65) Prior Publication Data
US 2020/0360848 A1     Nov. 19, 2020

Related U.S. Application Data

(60) Provisional application No. 62/616,678, filed on Jan. 12, 2018.

(51) Int. Cl.
*B01D 46/00*     (2022.01)
*B01D 46/24*     (2006.01)
*B01D 46/42*     (2006.01)

(52) U.S. Cl.
CPC ..... *B01D 46/0004* (2013.01); *B01D 46/2414* (2013.01); *B01D 46/4227* (2013.01); *B01D 2265/028* (2013.01)

(58) Field of Classification Search
CPC ........... B01D 46/2414; B01D 46/0004; B01D 46/4227; B01D 2265/028; B01D 46/0005
See application file for complete search history.

(56) References Cited

U.S. PATENT DOCUMENTS 3,745,753 A    7/1973   Risse
3,928,007 A    12/1975   Jackson
(Continued)

FOREIGN PATENT DOCUMENTS

CN          2855503 Y      1/2007
CN     101048215 A    10/2007
(Continued)

OTHER PUBLICATIONS

International Search Report and Written Opinion issued for PCT/US2019/012985, dated Mar. 27, 2019, 10 pages.
(Continued)

*Primary Examiner* — Robert Clemente
(74) *Attorney, Agent, or Firm* — Foley & Lardner LLP

(57) ABSTRACT

An air cleaner assembly includes a filter housing extending axially along a longitudinal axis and a cover. The filter housing includes at least one sidewall (e.g., an annular sidewall) extending between a first housing end and a second housing end and a retainer formed proximate at least one of the first housing end and the second housing end. The cover is removably coupled to at least one of the first housing end and the second housing. The cover includes a handle assembly having a latch configured to releasably engage the retainer of the filter housing. The filter element includes filter media and is axially insertable into the filter housing when the cover is removed from the filter housing.

19 Claims, 41 Drawing Sheets

(56) References Cited

U.S. PATENT DOCUMENTS

| | | | |
|---|---|---|---|
| 4,162,905 | A | 7/1979 | Schuler |
| 5,244,755 | A | 9/1993 | Benoist et al. |
| 5,258,127 | A | 11/1993 | Gsell et al. |
| 5,295,602 | A | 3/1994 | Swanson |
| 5,545,241 | A | 8/1996 | Vanderauwera et al. |
| 5,730,769 | A | 3/1998 | Dungs et al. |
| 5,891,337 | A | 4/1999 | Keller et al. |
| 5,893,937 | A | 4/1999 | Moessinger |
| 6,039,778 | A | 3/2000 | Coulonvaux |
| 6,051,042 | A | 4/2000 | Coulonvaux |
| 6,152,979 | A | 11/2000 | Cappuyns |
| 6,334,887 | B1 | 1/2002 | Coulonvaux |
| 6,402,798 | B1 | 6/2002 | Kallsen et al. |
| 6,419,718 | B1 | 7/2002 | Klug et al. |
| 6,436,162 | B1 | 8/2002 | Wake et al. |
| 6,623,049 | B2 | 9/2003 | Shreeve et al. |
| 6,723,148 | B2 | 4/2004 | Stass |
| 6,902,598 | B2 | 6/2005 | Gunderson et al. |
| 6,958,083 | B1 | 10/2005 | Schmitz et al. |
| 7,070,642 | B2 | 7/2006 | Scott et al. |
| 7,097,694 | B1 | 8/2006 | Jaroszczyk et al. |
| 7,125,490 | B2 | 10/2006 | Clendenning et al. |
| 7,276,098 | B2 | 10/2007 | Koslow |
| 7,282,077 | B2 | 10/2007 | Honisch et al. |
| 7,291,198 | B2 | 11/2007 | Gieseke et al. |
| 7,314,558 | B1 | 1/2008 | Jaroszczyk et al. |
| 7,323,105 | B1 | 1/2008 | Janikowski et al. |
| 7,323,106 | B2 | 1/2008 | Jaroszczyk et al. |
| 7,413,588 | B2 | 8/2008 | Holzmann et al. |
| 7,537,631 | B2 | 5/2009 | Scott et al. |
| 7,540,895 | B2 | 6/2009 | Furseth et al. |
| 7,563,300 | B2 | 7/2009 | Nishiyama et al. |
| D600,790 | S | 9/2009 | Nelson et al. |
| 7,625,419 | B2 | 12/2009 | Nelson et al. |
| 7,645,546 | B2 | 1/2010 | Yang et al. |
| 7,658,777 | B2 | 2/2010 | Kopec et al. |
| 7,662,203 | B2 | 2/2010 | Scott et al. |
| 7,662,216 | B1 | 2/2010 | Terres et al. |
| 7,740,678 | B2 | 6/2010 | Gunderson et al. |
| 7,753,982 | B2 | 7/2010 | Merritt |
| RE41,713 | E | 9/2010 | Gunderson et al. |
| 7,789,926 | B2 | 9/2010 | Rieger et al. |
| 7,799,108 | B2 | 9/2010 | Connor et al. |
| 7,828,870 | B1 | 11/2010 | Rech et al. |
| 7,879,125 | B2 | 2/2011 | Haberkamp et al. |
| RE42,174 | E | 3/2011 | Gunderson et al. |
| 7,931,725 | B2 | 4/2011 | Wydeven et al. |
| 7,959,703 | B2 | 6/2011 | Merritt et al. |
| 7,976,601 | B2 | 7/2011 | Xu et al. |
| 7,976,602 | B2 | 7/2011 | Munkel |
| 7,981,183 | B2 | 7/2011 | Nepsund et al. |
| 7,981,186 | B2 | 7/2011 | Schrage et al. |
| 7,988,757 | B2 | 8/2011 | Scott et al. |
| 7,993,422 | B2 | 8/2011 | Krisko et al. |
| 8,038,756 | B2 | 10/2011 | Iddings et al. |
| 8,163,057 | B2 | 4/2012 | Blossey et al. |
| 8,177,874 | B2 | 5/2012 | Bittle et al. |
| 8,177,971 | B2 | 5/2012 | Bittle et al. |
| 8,216,335 | B2 | 7/2012 | Scott et al. |
| 8,286,804 | B2 | 10/2012 | Weindorf |
| 8,394,166 | B2 | 3/2013 | Scott |
| 8,460,425 | B2 | 6/2013 | Scott et al. |
| 8,545,588 | B2 | 10/2013 | Iddings et al. |
| 8,828,114 | B2 | 9/2014 | Dhiman et al. |
| 8,828,123 | B2 | 9/2014 | Holzmann et al. |
| 9,498,743 | B2 | 11/2016 | Dhiman et al. |
| 9,511,317 | B2 | 12/2016 | Ruhland et al. |
| 9,636,608 | B2 | 5/2017 | Morris et al. |
| 2004/0134171 | A1* | 7/2004 | Scott .................. F01M 13/0033 55/482 |
| 2005/0193695 | A1* | 9/2005 | Holmes .............. B01D 46/0002 55/482 |
| 2006/0086075 | A1 | 4/2006 | Scott et al. |
| 2008/0190082 | A1* | 8/2008 | Scott .................... B01D 46/521 55/520 |
| 2008/0276583 | A1 | 11/2008 | Munkel |
| 2009/0057219 | A1 | 3/2009 | Bagci et al. |
| 2009/0094951 | A1 | 4/2009 | Baseotto et al. |
| 2009/0126324 | A1 | 5/2009 | Smith et al. |
| 2009/0241489 | A1* | 10/2009 | Becker .................. B01D 45/06 55/320 |
| 2010/0146920 | A1 | 6/2010 | Iddings et al. |
| 2012/0060453 | A1* | 3/2012 | Holzmann ......... B01D 46/4272 55/480 |
| 2012/0067014 | A1* | 3/2012 | Dhiman ................ B01D 46/88 55/502 |
| 2014/0260994 | A1 | 9/2014 | Grider et al. |
| 2016/0136562 | A1 | 5/2016 | Nepsund et al. |
| 2017/0021291 | A1 | 1/2017 | Morris et al. |

FOREIGN PATENT DOCUMENTS

| | | | |
|---|---|---|---|
| CN | 201357024 Y | 12/2009 | |
| CN | 10195201 A | 1/2011 | |
| CN | 102350151 A | 2/2012 | |
| CN | 102350151 A | 2/2012 | |
| CN | 102527163 A | 7/2012 | |
| CN | 103025405 A | 4/2013 | |
| CN | 103732303 A | 4/2014 | |
| CN | 104421063 A | 3/2015 | |
| CN | 204419408 U | 6/2015 | |
| CN | 204611988 U | 9/2015 | |
| CN | 105263600 A | 1/2016 | |
| CN | 205173132 U | 4/2016 | |
| CN | 105658944 A * | 6/2016 | ............. B01D 27/08 |
| CN | 105658944 A | 6/2016 | |
| CN | 105840363 A | 8/2016 | |
| CN | 206381744 U | 8/2017 | |
| CN | 111757776 B | 1/2022 | |
| EP | 0 723 800 A1 | 7/1996 | |
| EP | 1 769 835 A2 | 4/2007 | |
| TW | 428670 U | 4/2001 | |
| WO | WO-02/31340 | 4/2002 | |
| WO | WO-2004/039476 A1 | 5/2004 | |
| WO | WO-2006/026241 A1 | 3/2006 | |
| WO | WO-2008/124437 | 10/2008 | |
| WO | WO-2009/019443 | 2/2009 | |
| WO | WO-201 6/040016 A1 | 3/2016 | |
| WO | WO-2019/140045 | 7/2019 | |

OTHER PUBLICATIONS

First Office Action issued for Chinese Patent Application No. CN 201980012052.1, dated Jun. 25, 2021, 14 pages.

First Examination Report for Indian Patent Application No. 2835/KOLNP/2012 dated Jul. 17, 2018, 9 pages.

Fist Office Action for Chinese Patent App. No. 201180030354.5 dated Apr. 18, 2014, 36 pages (with translation).

Foreign Action other than Search Report on DE 112011103121.1 dated Feb. 15, 2021.

Foreign Action other than Search Report on IN 201838035652 dated Feb. 17, 2021.

Foreign Action other than Search Report on IN 202247023311 dated Jun. 22, 2022.

International Search Report and Written Opinion issued for PCT Application No. PCT/US2021/026608 dated Jun. 24, 2021.

International Search Reports & Written Opinion for PCT/US11/51880 dated Feb. 2, 2012, 7 pages.

International Search Report and Written Opinion for PCT Application No. PCT/US2020/059838, dated Mar. 18, 2021.

Office Action for Brazilian Patent App. No. 1120120252518 dated Feb. 12, 2019, 8 pages (with translation).

Office Action for U.S. Appl. No. 13/234,309 dated Jan. 27, 2014, 11 pages.

Office Action for U.S. Appl. No. 14/453,084 dated Jan. 14, 2016, 7 pages.

First Office Action issued for Chinese Patent Application No. 2022100379027 dated Dec. 9, 2023, 5 pages.

* cited by examiner

EASY TO SERVICE AIR FILTER

CROSS-REFERENCE TO RELATED APPLICATIONS

This application is a national stage of PCT Application No. PCT/US2019/012985, filed Jan. 10, 2019, which claims priority to U.S. Provisional Patent Application No. 62/616,678, filed on Jan. 12, 2018. The contents of these applications are hereby incorporated by reference in their entirety.

TECHNICAL FIELD

The present invention relates generally to filter assemblies for filtering fluids in internal combustion engine systems.

BACKGROUND

Air cleaners are often used to filter air in air intake systems of devices, such as internal combustion engines. Air cleaners include a housing extending along an axis and having at least one sidewall extending between first and second axial ends, where the at least one sidewall includes an air inlet receiving dirty incoming air. One of the axial ends includes an outlet discharging clean filtered air, and the other axial end is typically closable by a removable cover. An air filter element is axially insertable into the housing through the axial end having a removable cover when the cover is removed. A number of conventional air cleaners include covers attached to the housing by several latches and/or bolts that require significant time to unlatch or unscrew prior to servicing the air filter element within and can be costly to manufacture. In addition, various conventional air cleaners include covers that require the use of two hands to remove.

SUMMARY

According to one set of embodiments, an air cleaner housing assembly comprises a filter housing extending axially along a longitudinal axis, and a cover. The filter housing includes at least one sidewall extending between a first housing end and a second housing end and a retainer formed proximate at least one of the first housing end and the second housing end. The cover is removably coupled to at least one of the first housing end and the second housing. The cover includes a handle assembly having a latch configured to releasably engage the retainer of the filter housing. A filter element is axially insertable into the filter housing when the cover is removed from the filter housing.

According to another set of embodiments, an air cleaner assembly includes a filter housing extending axially along a longitudinal axis. The filter housing includes at least one sidewall extending between a first housing end and a second housing end and a slot formed proximate at least one of the first housing end and the second housing end. The air cleaner assembly also includes a cover removably coupled to at least one of the first housing end and the second housing end, the cover including a handle assembly having a flexible portion having a protrusion configured to releasably engage the slot of the filter housing, and a filter element having filter media arranged in a cylindrical manner, the filter media including a first end fitted with a top endplate and a second end fitted with a bottom endplate. The filter media is coupled to the cover and the filter housing is configured to accept the filter element axially into the filter housing.

According to another set of embodiments, a filter element includes filter media arranged in a cylindrical manner. The filter media includes a first end fitted with a top endplate. The filter element also includes a cover coupled to the filter media, the cover including a handle assembly having a flexible portion and a static portion. The cover and the filter media are axially insertable into a filter housing. The flexible portion of the cover is removably coupled to the filter housing.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, an air cleaner housing assembly is described. The air cleaner housing assembly includes a first axial end and a second axial end, the first axial end closable by a removable cover. A filter element may be positioned within the housing accessibility and service of the filter element is provided by removal of the cover from the air cleaner housing. The cover includes a handle and one or more latches configured to engage the air cleaner housing in a closed position. By grasping the handle in various ways described further herein, a user can use a single hand to release the latches from the air cleaner housing and easily remove the cover, for example for servicing purposes.

Figure 1:
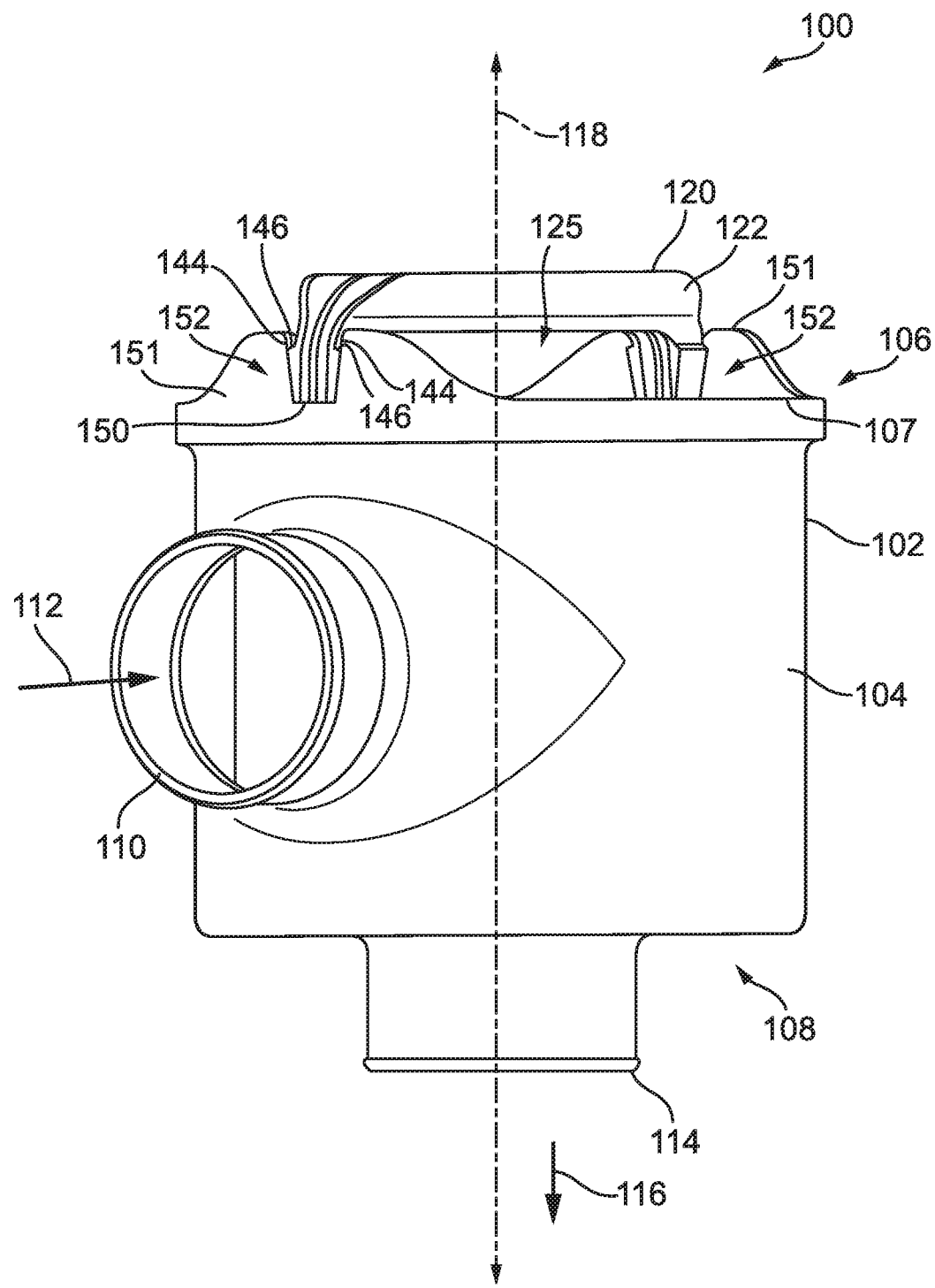
FIG. 1 shows a perspective view of an air cleaner, according to an example embodiment.
Figure 2:
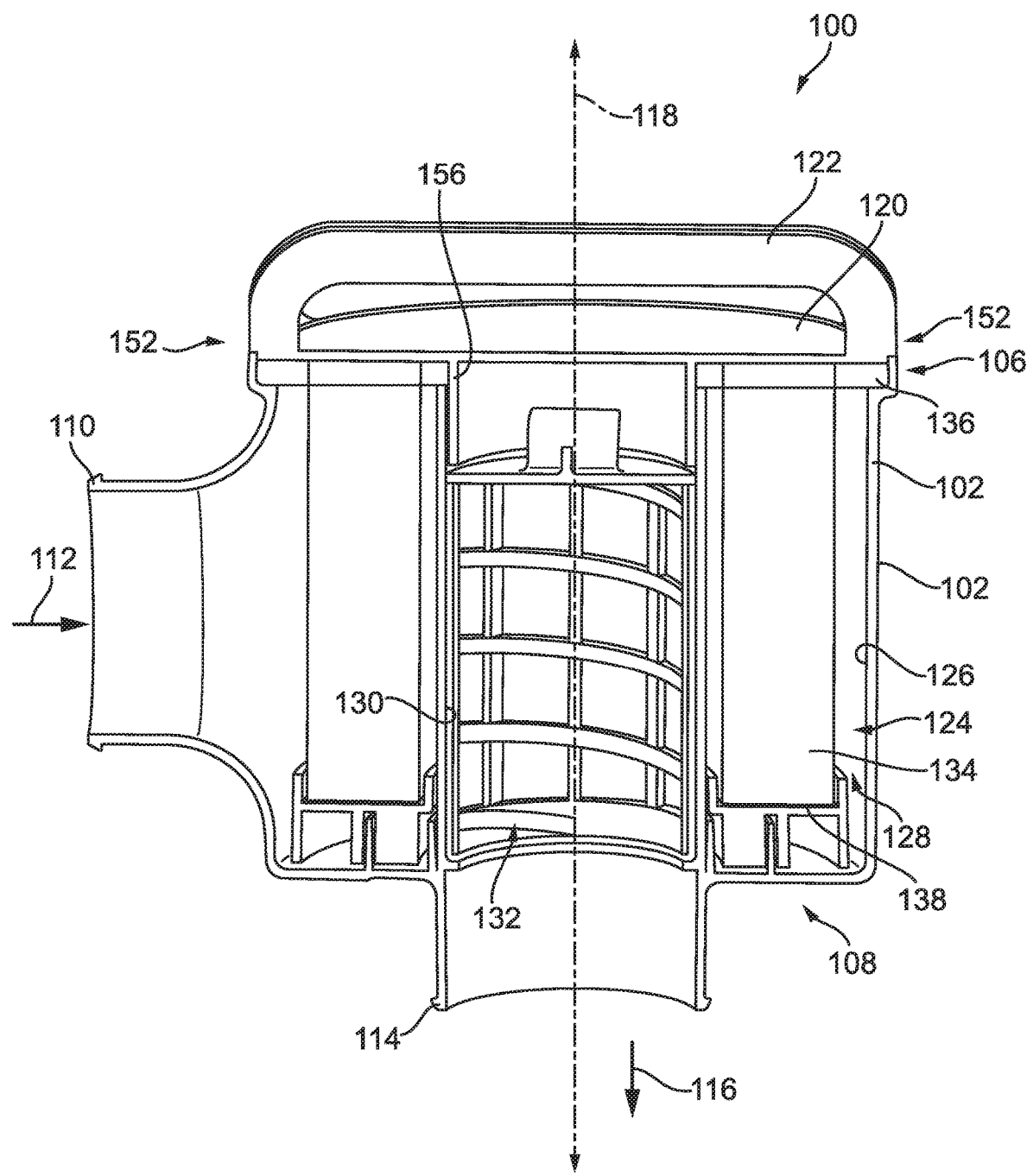
FIG. 2 shows a cross-sectional view of the air cleaner of FIG. 1.

Referring to FIGS. 1-4, the air cleaner 100 is shown according to an example embodiment. FIG. 1 shows a perspective view of an air cleaner 100 according to an example embodiment and FIG. 2 shows a cross-sectional view of the air cleaner of FIG. 1. The air cleaner 100 includes a housing 102 extending axially along a longitudinal axis 118 and having an annular sidewall 104 extending between a first end 106 and a second end 108. It should be noted that, for each embodiment depicted herein where a single annular sidewall is shown, it is also possible for multiple sidewalls to be included depending upon particular design requirements and specifications. The sidewall 104 includes an air inlet 110 configured to direct air into the housing 102 substantially along inlet direction 112. A cover 120 is coupled to the first end 106, as described further herein. The cover 120 is removable to enable replacement and servicing of the filter element 124 described below.

When the cover 120 is coupled to the first end 106, the first end 106 is in a closed condition and when the cover 120 is decoupled and removed from the housing 102, the first end 106 is in an open position. The second end 108 includes an air outlet 114 configured to discharge clean filtered air substantially along outlet direction 116.

Figure 3:
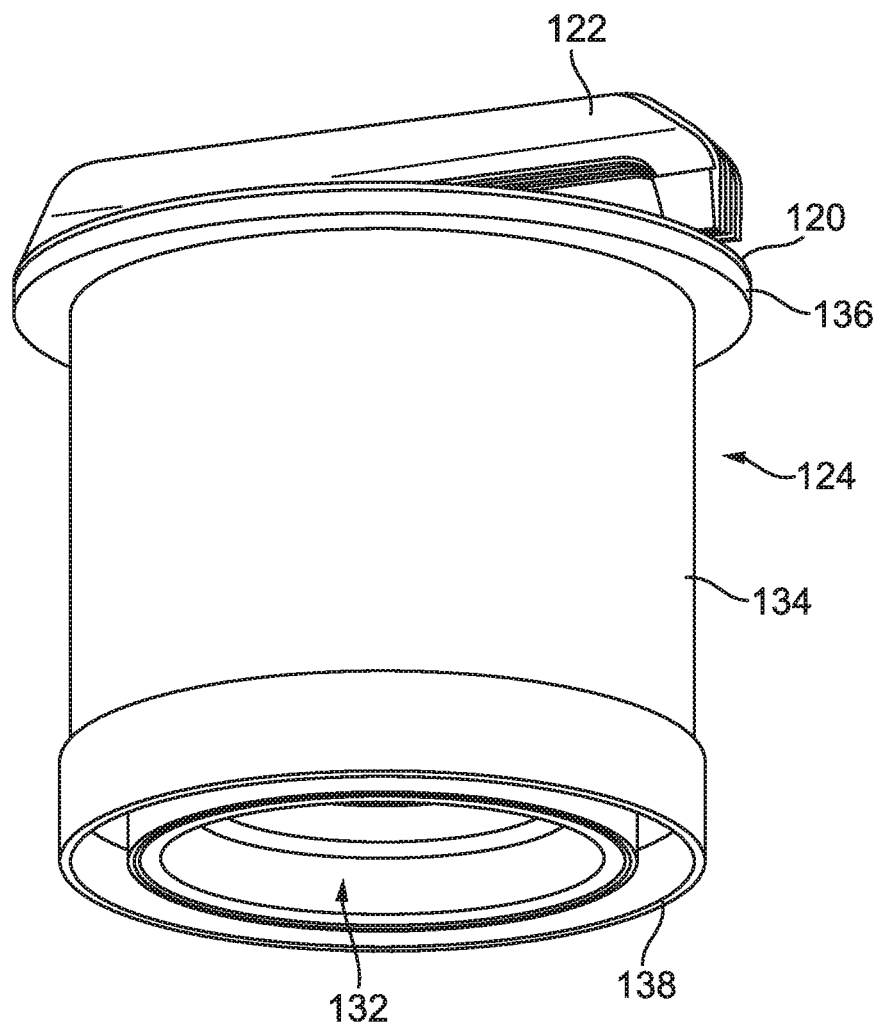
FIG. 3 shows a bottom perspective view of a filter element and cover of the air cleaner of FIG. 1.

As shown in FIGS. 2-3, the air cleaner 100 includes a filter element 124. The filter element 124 is disposed in the housing 102 and axially extends between first and second axial ends that are respectively adjacent to the first and second ends 106, 108 of the housing 102. The air filter element 124 includes filter media 134 arranged in a cylindrical manner with an inner surface 130 defining a clean air outlet channel 132. An annular dirty air inlet channel 128 is defined between the outer surface of the filter element 124 and the housing inner surface 126. A first end of the filter media 134 is fitted with a top endplate 136 and a second end of the filter media 134 is fitted with a bottom endplate 138. In some embodiments, urethane adhesive attaches the filter media 134 to the cover 120 and as such, forms and acts as the top endplate 136. In this way, when the cover 120 and filter element 124 are assembled with the housing 102, the urethane adhesive axially seals the cover 120 to the housing 102. In some embodiments, the filter media 134 is embedded directly into the top endplate 136. In some embodiments, as shown in FIG. 2, the top endplate 136 of the filter element 124 engages with the housing inner surface 126 such that a radial seal is created between the filter element 124 and the housing 102. The filter element 124 is axially insertable into the housing 102 through the first end 106 when the first end 106 is in an open condition (e.g., cover 120 is decoupled and removed from the housing 102). In addition, when the first end 106 is in an open condition, a user can access and service the filter element 124. As shown in FIG. 3, the filter element 124 is integrated with the cover 120.

At the first end 106, the housing 102 includes a top perimeter edge 107 and two axially extending walls 151. The walls 151 extend above the top perimeter edge 107 and each wall 151 is positioned substantially opposite each other relative to the longitudinal axis 118. Each wall 151 forms a groove 150 configured to receive a handle assembly 122 of the cover 120 as described further below.

Figure 4:
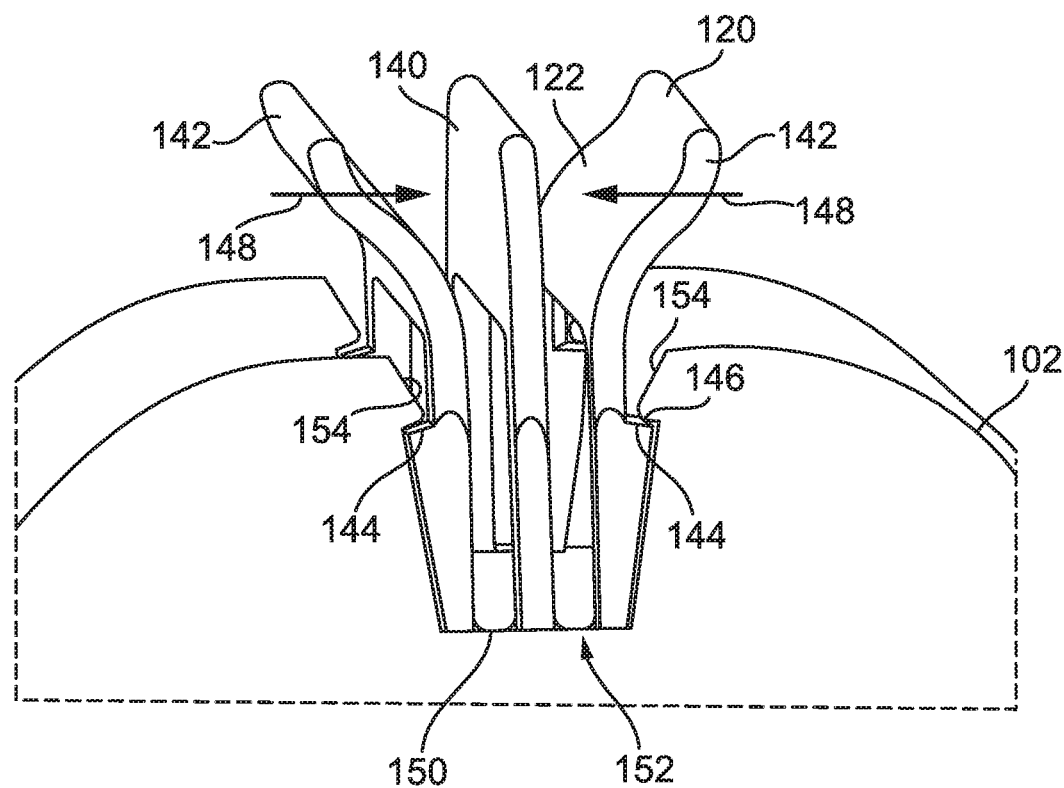
FIG. 4 shows a portion of a perspective view of the air cleaner of FIG. 1.

Referring to FIG. 4, the cover 120 includes a handle assembly 122 configured to couple and decouple the cover 120 to and from the housing 102. The handle assembly 122 is formed as an integral piece with the cover 120. The handle assembly 122 includes an inner handle member 140 and two outer handle members 142 extending between ends 152 of the handle assembly 122. The inner handle member 140 is positioned between and approximately an equal distance away from each of the outer handle members 142. The inner and outer handle members 140, 142 are substantially parallel to each other. The outer handle members 142 are flexible in nature such that a user can squeeze the outer handle members 142 in a direction 148 toward the inner handle member 140. The inner handle member 140 provides a stop for the two outer handle members 142 to ensure that the outer handle members 142 flex in substantially equal amounts toward the inner handle member 140.

Each end 152 of the handle assembly 122 is received within a groove 150 formed in the housing 102. Each of the outer handle members 142 includes a latch 144 that engages with a retainer 146 of the housing 102 when the cover 120 is coupled to the housing 102. The engagement of the latch 144 with the retainer 146 prevents upward axial movement of the cover 120 relative to the housing 102. As the outer handle members 142 are moved inward toward the inner handle member 140, the latches 144 also move inward along direction 148 and disengage from the retainers 146 on the housing 102. A gap 125 is formed between the handle assembly 122 and the first end 106 of the housing 102 to allow a user to grasp the handle assembly 122 from underneath and pull in a substantially vertical direction along axis 118. Simultaneously, the user squeezes the outer handle members 142 inward along direction 148 to disengage latches 144 from retainers 146 to remove the cover 120 from the housing 102. When replacing the cover 120, a user can use handle assembly 122 to align ends 152 with grooves 150 and move cover 120 downward along axis 118 until ends 152 of the handle assembly 122 slide along and past angled surfaces 154 and latches 144 engage retainers 146 snapping the cover 120 into place on the housing 102.

Figure 5:
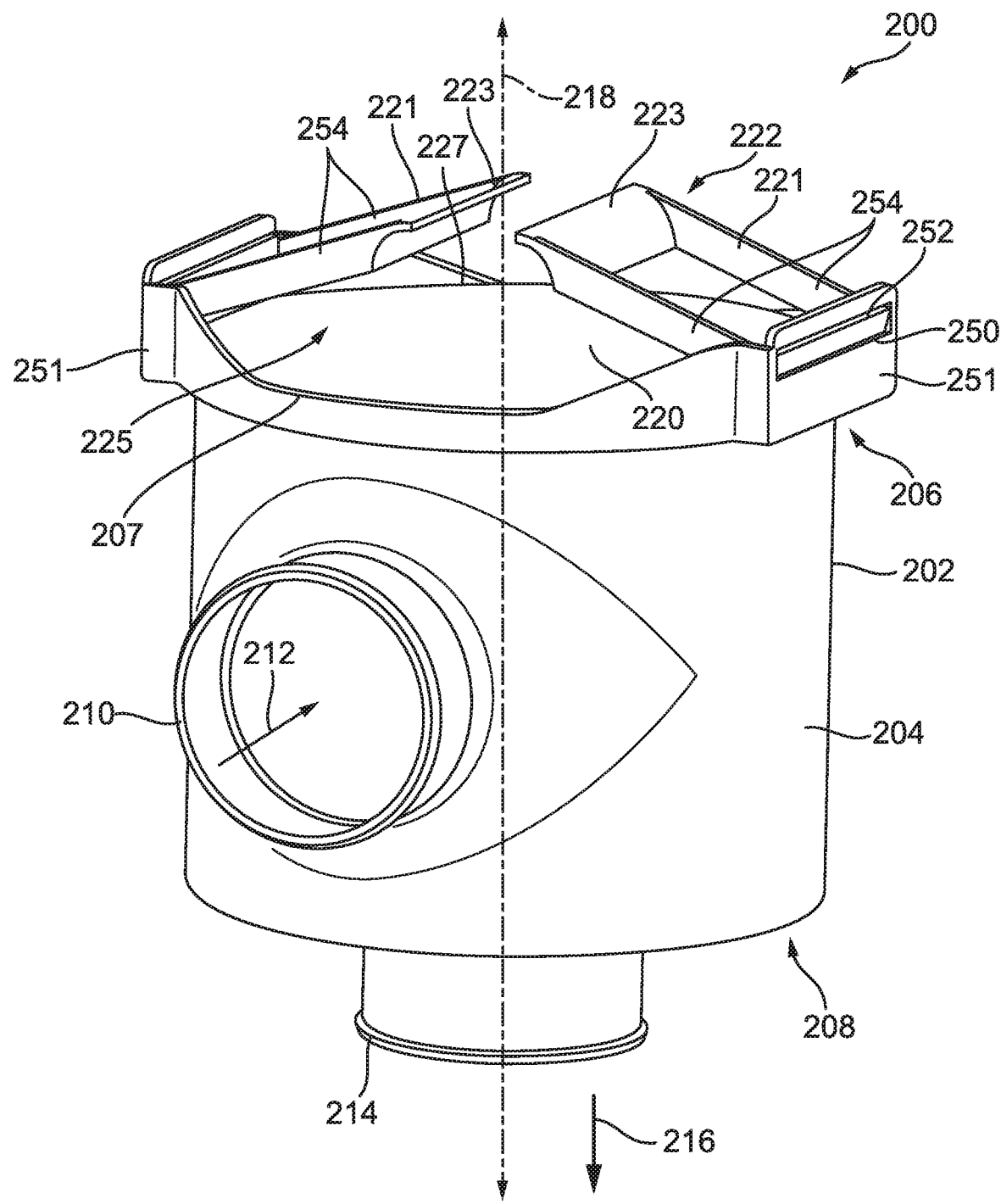
FIG. 5 shows a perspective view of an air cleaner, according to another example embodiment.
Figure 6:
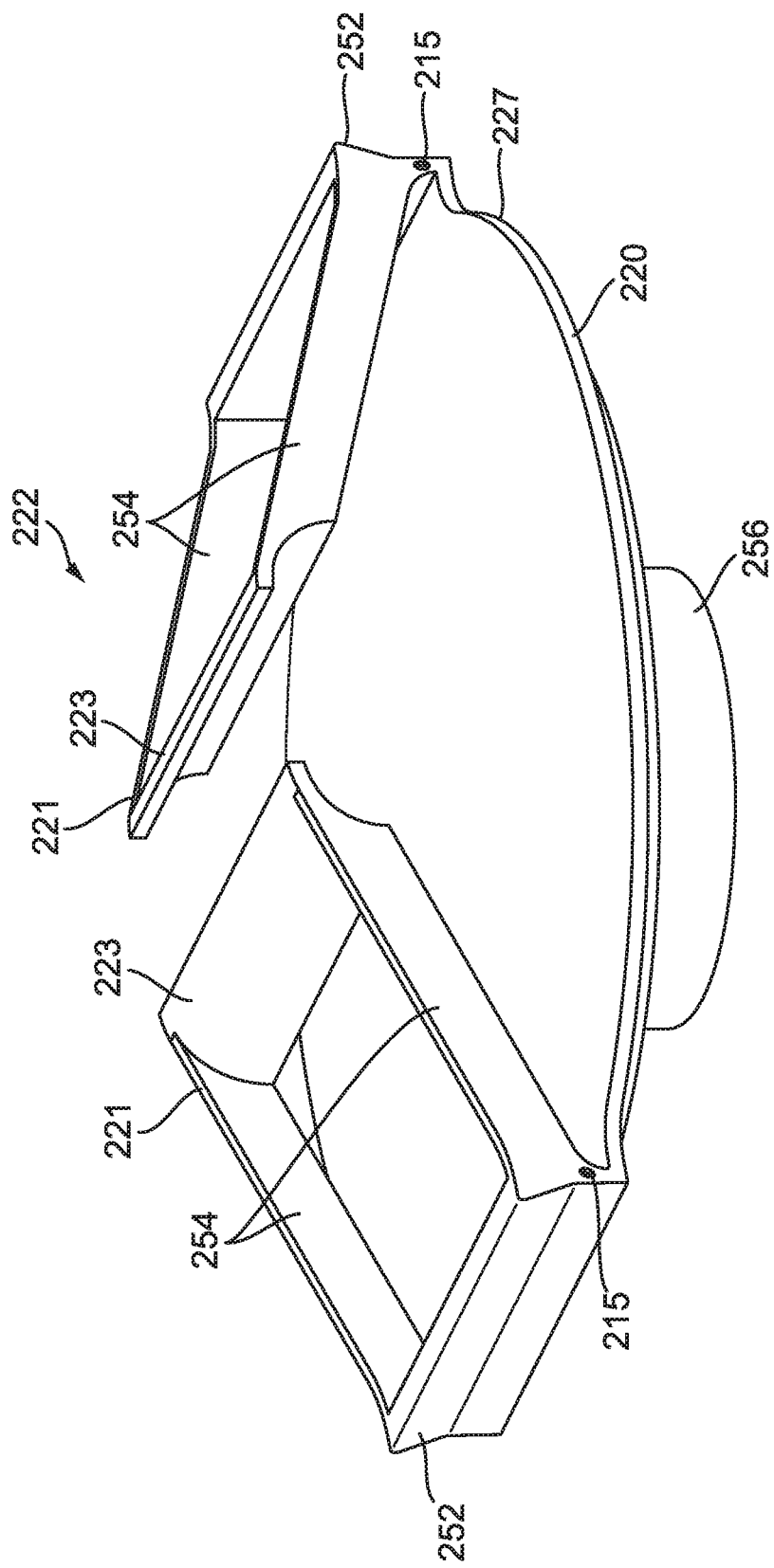
FIG. 6 shows a perspective view of a cover of the air cleaner of FIG. 5.
Figure 7:
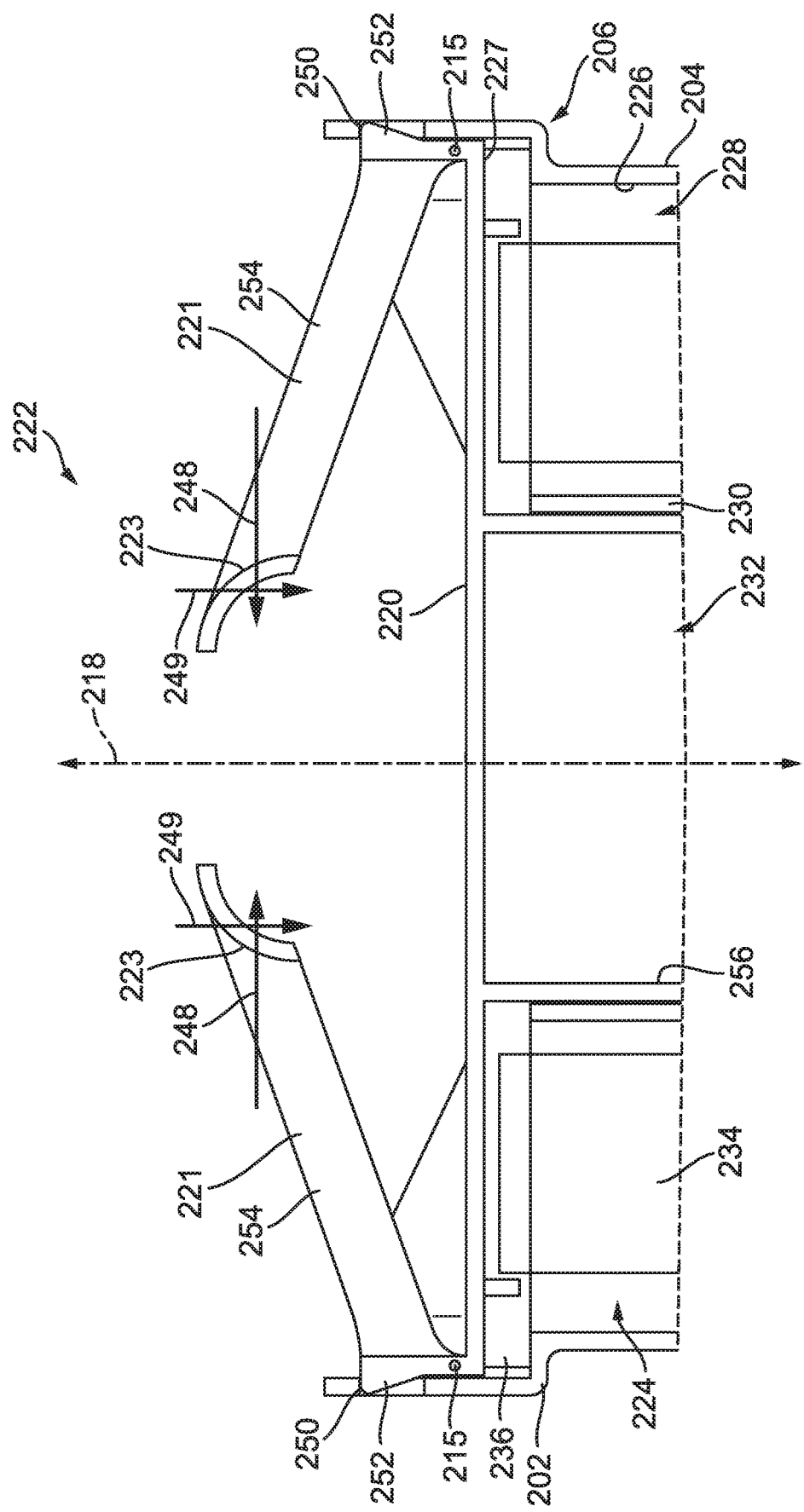
FIG. 7 shows a cross-sectional view of a portion of the air cleaner of FIG. 5.
Figure 8:
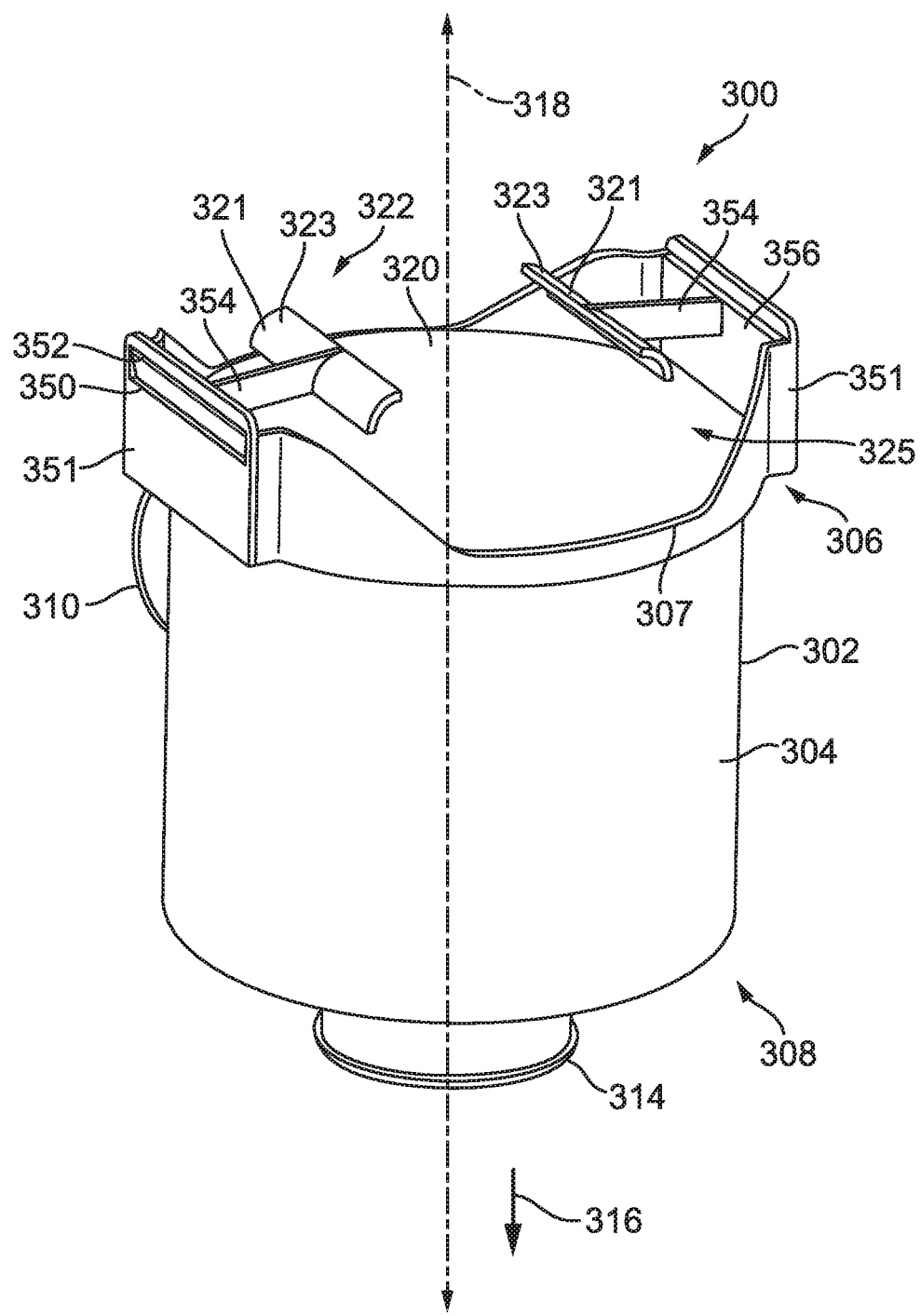
FIG. 8 shows a perspective view of an air cleaner, according to another example embodiment.

Referring to FIGS. 5-7, an air cleaner 200 according to another example embodiment is shown. The air cleaner 200 includes a housing 202 extending axially along a longitudinal axis 218 and having an annular sidewall 204 extending between a first end 206 and a second end 208. The sidewall 204 includes an air inlet 210 configured to direct air into the housing 202 substantially along inlet direction 212. A cover 220 is coupled to the first end 206, as described further herein. The cover 220 is removable to enable replacement and servicing of the filter element 224 described below. When the cover 220 is coupled to the first end 206, the first end 206 is in a closed condition and when the cover 220 is decoupled and removed from the housing 202, the first end 206 is in an open position. The second end 208 includes an air outlet 214 configured to discharge clean filtered air substantially along outlet direction 216.

The air cleaner 200 includes a filter element 224. The filter element 224 is disposed in the housing 202 and axially extends between first and second axial ends that are respectively adjacent to the first and second ends 206, 208 of the housing 202. The air filter element 224 includes filter media 234 arranged in a cylindrical manner with an inner surface 230 defining a clean air outlet channel 232. An annular dirty air inlet channel 228 is defined between the outer surface of the filter element 224 and the housing inner surface 226. A first end of the filter media 234 is fitted with a top endplate 236 and a second end of the filter media 234 is fitted with a bottom endplate 238. In some embodiments, urethane adhesive attaches the filter media 234 to the cover 220 and as such, forms and acts as the top endplate 236. In this way, when the cover 220 and filter element 224 are assembled with the housing 202, the urethane adhesive axially seals the cover 220 to the housing 202. In some embodiments, the filter media 234 is embedded directly into the top endplate 236. In some embodiments, the top endplate 236 of the filter element 224 engages with the housing inner surface 226 such that a radial seal is created between the filter element 224 and the housing 202. The filter element 224 is axially insertable into the housing 202 through the first end 206 when the first end 206 is in an open condition (e.g., cover 220 is decoupled and removed from the housing 202). In addition, when the first end 206 is in an open condition, a user can access and service the filter element 224.

At the first end 206, the housing 202 includes a top perimeter edge 207 and two axially extending walls 251. The walls 251 extend above the top perimeter edge 207 and each wall 251 is positioned substantially opposite each other relative to the longitudinal axis 218. Each wall 251 forms a retainer 250 configured to receive a latch 252 formed on a handle assembly 222 of the cover 220 as described further below.

Referring to FIG. 6, the cover 220 includes a handle assembly 222 configured to couple and decouple the cover 220 to and from the housing 202. The handle assembly 222 is formed as an integral piece with the cover 220. The handle assembly 222 includes two handle members 221 extending upward away from the first end 206 of the housing 202 and inward toward the axis 218. Each handle member 221 includes two cantilever members 254 extending inward from a perimeter 227 of the cover 220 and a cross-member 223. The cross-member 223 joins the two cantilever members 254. The cantilever members 254 are flexible approximately about a pivot 215. The cross-member 223 is curved inward toward the axis 218. The cross-member 223 is configured to be grasped by the user at the outer curved surfaces to flex the handle members 221 inward toward the axis 218 along direction 248 and downward toward the first end 206 of the housing 202 along direction 249.

Each of the handle members 221 includes a latch 252. Each latch 252 is configured to engage with a retainer 250 formed in the housing 202 when the cover 220 is coupled to the housing 202. The engagement of the latch 252 with the retainer 250 prevents upward axial movement of the cover 220 relative to the housing 202. As the handle members 221 are moved inward toward the axis 218, the latches 252 also move inward along direction 248 and disengage from the retainers 250 on the housing 202. A gap 225 is formed between the handle assembly 222 and the first end 206 of the housing 202 to allow for the flex of the handle members 221 when a user grasps the cross-members 223. When the user squeezes the handle members 221 to disengage latches 252 from the retainers 250 and simultaneously moves the cover 220 upward along axis 218, the cover 220 is removed from the housing 202. When replacing the cover 220, a user can use handle assembly 222 to align the latches 252 with the retainers 250 and move cover 220 downward along axis 218 until the latches 252 engage with the retainers 250 snapping the cover 220 into place on the housing 202.

Referring to FIGS. 8-11, an air cleaner 300 according to another example embodiment is shown. The air cleaner 300 includes a housing 302 extending axially along a longitudinal axis 318 and having an annular sidewall 304 extending between a first end 306 and a second end 308. The sidewall 304 includes an air inlet 310 configured to direct air into the housing 302. A cover 320 is coupled to the first end 306, as described further herein. The cover 320 is removable to enable replacement and servicing of the filter element 324 described below. When the cover 320 is coupled to the first end 306, the first end 306 is in a closed condition and when the cover 320 is decoupled and removed from the housing 302, the first end 306 is in an open position. The second end 308 includes an air outlet 314 configured to discharge clean filtered air substantially along outlet direction 316.

Figure 11:
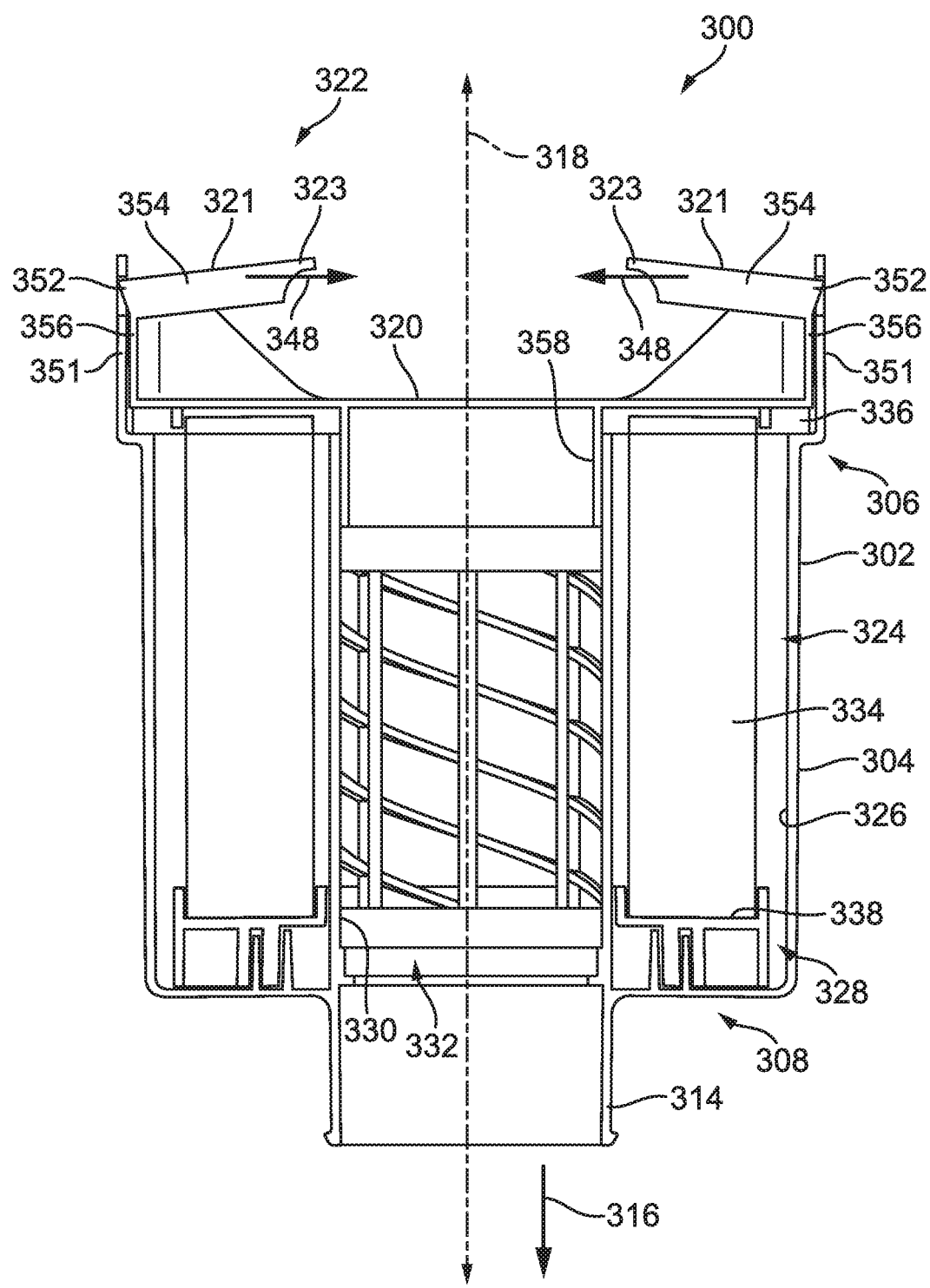
FIG. 11 shows a cross-sectional view of the air cleaner of FIG. 8.
Figure 12:
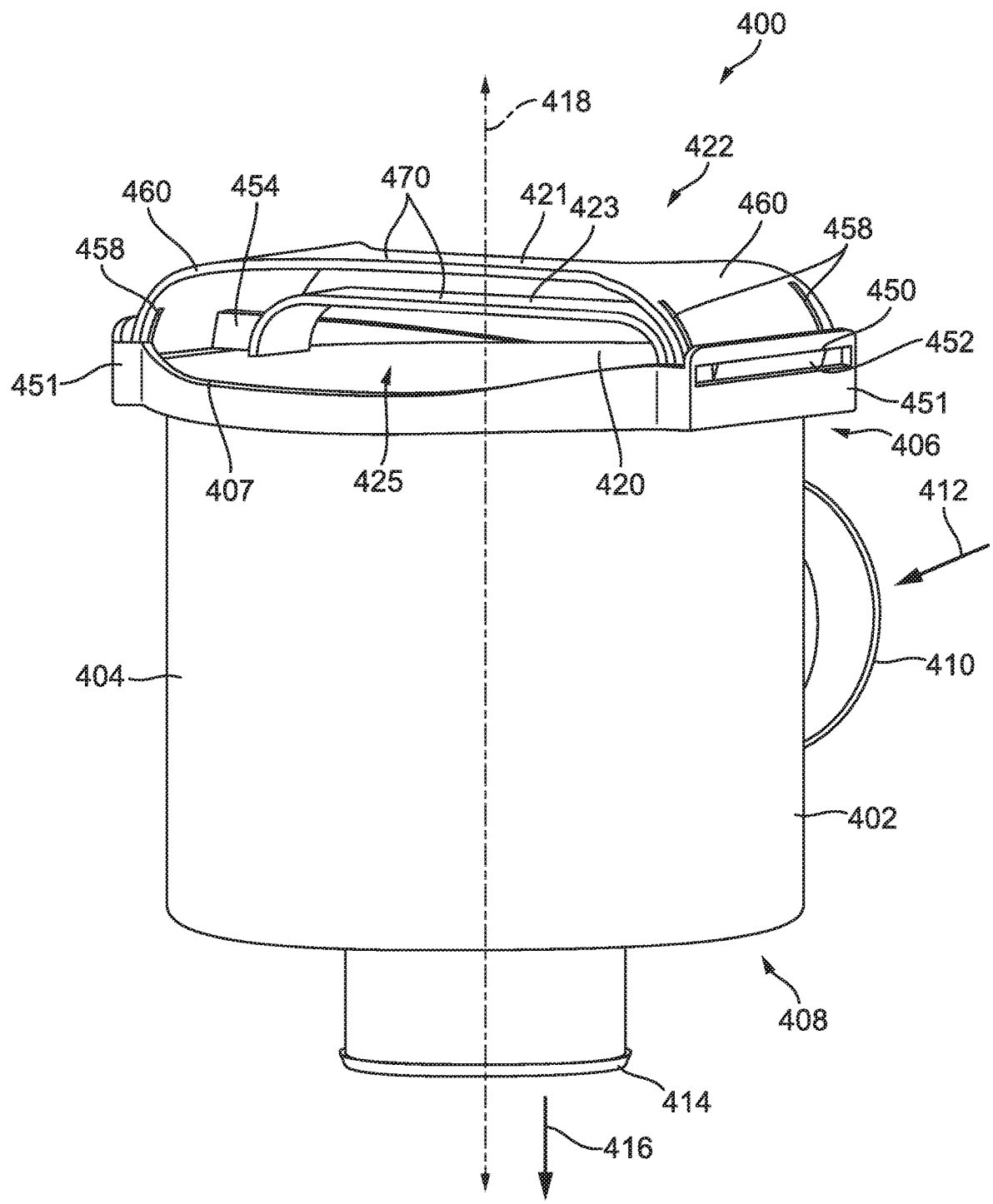
FIG. 12 shows a perspective view of an air cleaner, according to another example embodiment.

Referring to FIG. 11, the air cleaner 300 includes a filter element 324. The filter element 324 is disposed in the housing 302 and axially extends between first and second axial ends that are respectively adjacent to the first and second ends 306, 308 of the housing 302. The air filter element 324 includes filter media 334 arranged in a cylindrical manner with an inner surface 330 defining a clean air outlet channel 332. An annular dirty air inlet channel 328 is defined between the outer surface of the filter element 324 and the housing inner surface 326. A first end of the filter media 334 is fitted with a top endplate 336 and a second end of the filter media 334 is fitted with a bottom endplate 338. In some embodiments, urethane adhesive attaches the filter media 334 to the cover 320 and as such, forms and acts as the top endplate 336. In this way, when the cover 320 and filter element 324 are assembled with the housing 302, the urethane adhesive axially seals the cover 320 to the housing 302. In some embodiments, the filter media 334 is embedded directly into the top endplate 336. In some embodiments, the top endplate 336 of the filter element 324 engages with the housing inner surface 326 such that a radial seal is created between the filter element 324 and the housing 302. The filter element 324 is axially insertable into the housing 302 through the first end 306 when the first end 306 is in an open condition (e.g., cover 320 is decoupled and removed from the housing 302). In addition, when the first end 306 is in an open condition, a user can access and service the filter element 324.

At the first end 306, the housing 302 includes a top perimeter edge 307 and two axially extending housing walls 351. The housing walls 351 extend above the top perimeter edge 307 and each housing wall 351 is positioned substantially opposite each other relative to the longitudinal axis 318. Each housing wall 351 forms a retainer 350 configured to receive a latch 352 formed on a handle assembly 322 of the cover 320 as described further below.

Figure 9:
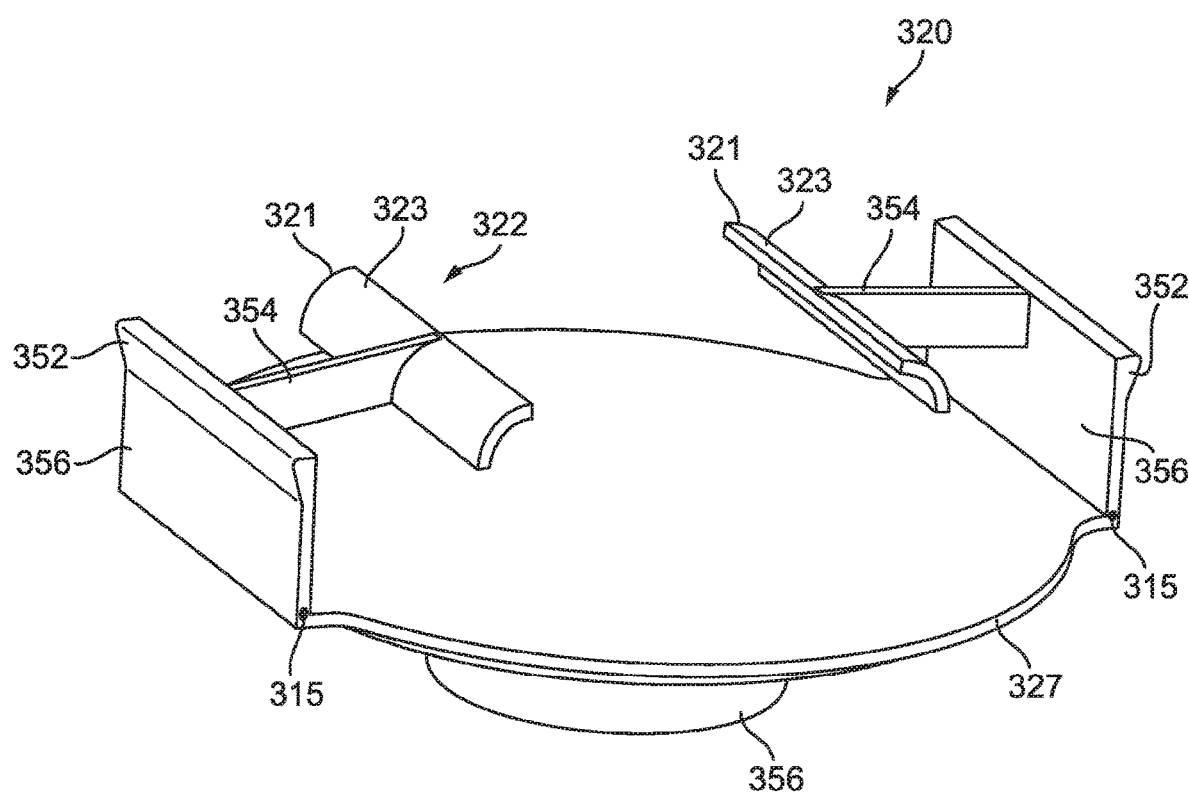
FIG. 9 shows a perspective view of a cover of the air cleaner of FIG. 8.
Figure 10:
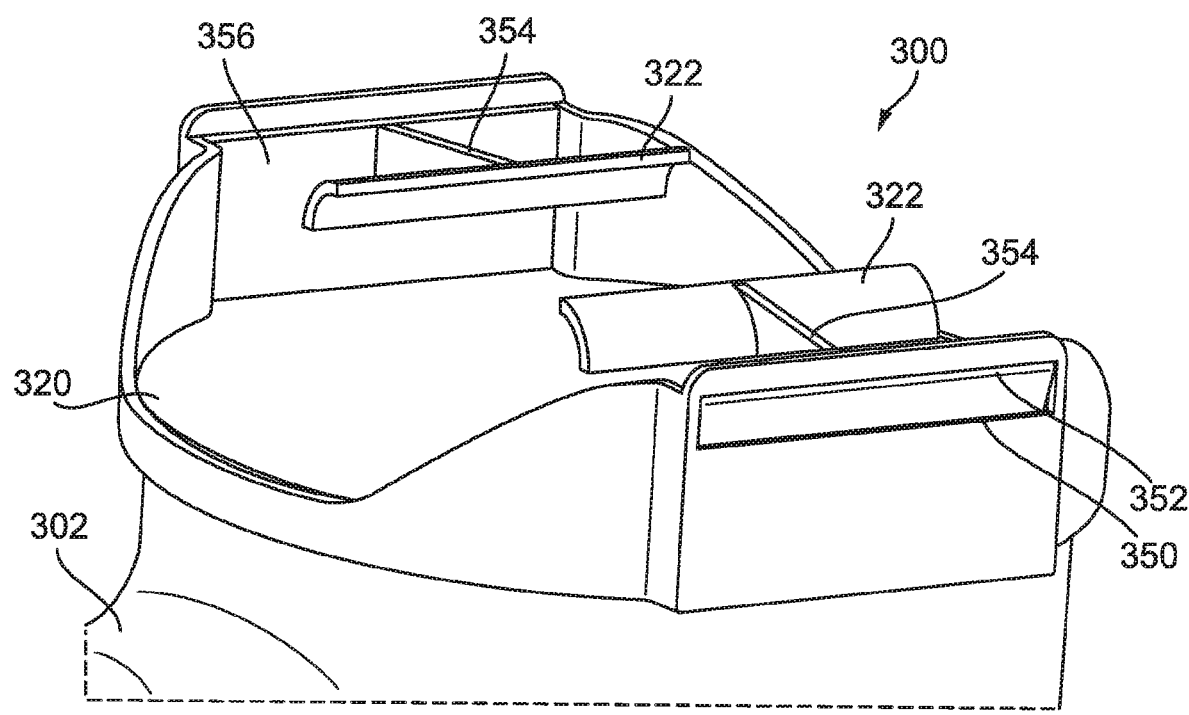
FIG. 10 shows a portion of a perspective view of the air cleaner of FIG. 8.

Referring to FIG. 9, the cover 320 includes a handle assembly 322 configured to couple and decouple the cover 320 to and from the housing 302. The handle assembly 322 is formed as an integral piece with the cover 320. The handle assembly 322 includes two handle members 321 extending inward toward the axis 318. Each handle member 321 includes a cantilever member 354 extending inward from a cover wall 356 formed proximate the perimeter 327 of the cover 320 and a cross-member 323. Each cross-member 323 is joined and substantially perpendicular to the cantilever member 354. Each cross-member 323 is curved inward toward the axis 318. Each cross-member 323 is configured to be grasped by the user at an outer curved surface to flex the handle members 321 inward toward the axis 318 along direction 348.

Each cover wall 356 is configured to slidingly engage the inner surface of a housing wall 351 and includes a latch 352 formed proximate the upper portion thereof. Each cover wall 356 is configured to flex about a pivot 315 toward the axis 318. Each latch 352 is configured to engage with a retainer 350 formed in the housing 302 when the cover 320 is coupled to the housing 302. The engagement of the latch 352 with the retainer 350 prevents upward axial movement of the cover 320 relative to the housing 302. As the handle members 321 are moved inward toward the axis 318 about pivot 315, the latches 352 also move inward along direction 348 and disengage from the retainers 350 on the housing 302. A gap 325 is formed between the handle assembly 322 and the first end 306 of the housing 302 to allow for a user to grasp the cross-members 323. When the user squeezes the handle members 321 to disengage latches 352 from the retainers 350 and simultaneously moves the cover 320 upward along axis 318, the cover 320 is removed from the housing 302. When replacing the cover 320, a user can use handle assembly 322 to align the cover walls 356 with the housing walls 351 and therefore align latches 352 with the retainers 350 and move cover 320 downward along axis 318 until the latches 352 engage with the retainers 350 snapping the cover 320 into place on the housing 302.

Referring to FIGS. 12-16, an air cleaner 400 according to another example embodiment is shown. The air cleaner 400 includes a housing 402 extending axially along a longitudinal axis 418 and having an annular sidewall 404 extending between a first end 406 and a second end 408, where the sidewall 404 includes an air inlet 410 configured to direct air into the housing 402 substantially along inlet direction 412. A cover 420 is coupled to the first end 406, as described further herein. The cover 420 is removable to enable replacement and servicing of the filter element 424 described below. When the cover 420 is coupled to the first end 406, the first end 406 is in a closed condition and when the cover 420 is decoupled and removed from the housing 402, the first end 406 is in an open position. The second end 408 includes an air outlet 414 configured to discharge clean filtered air substantially along outlet direction 416.

Figure 13:
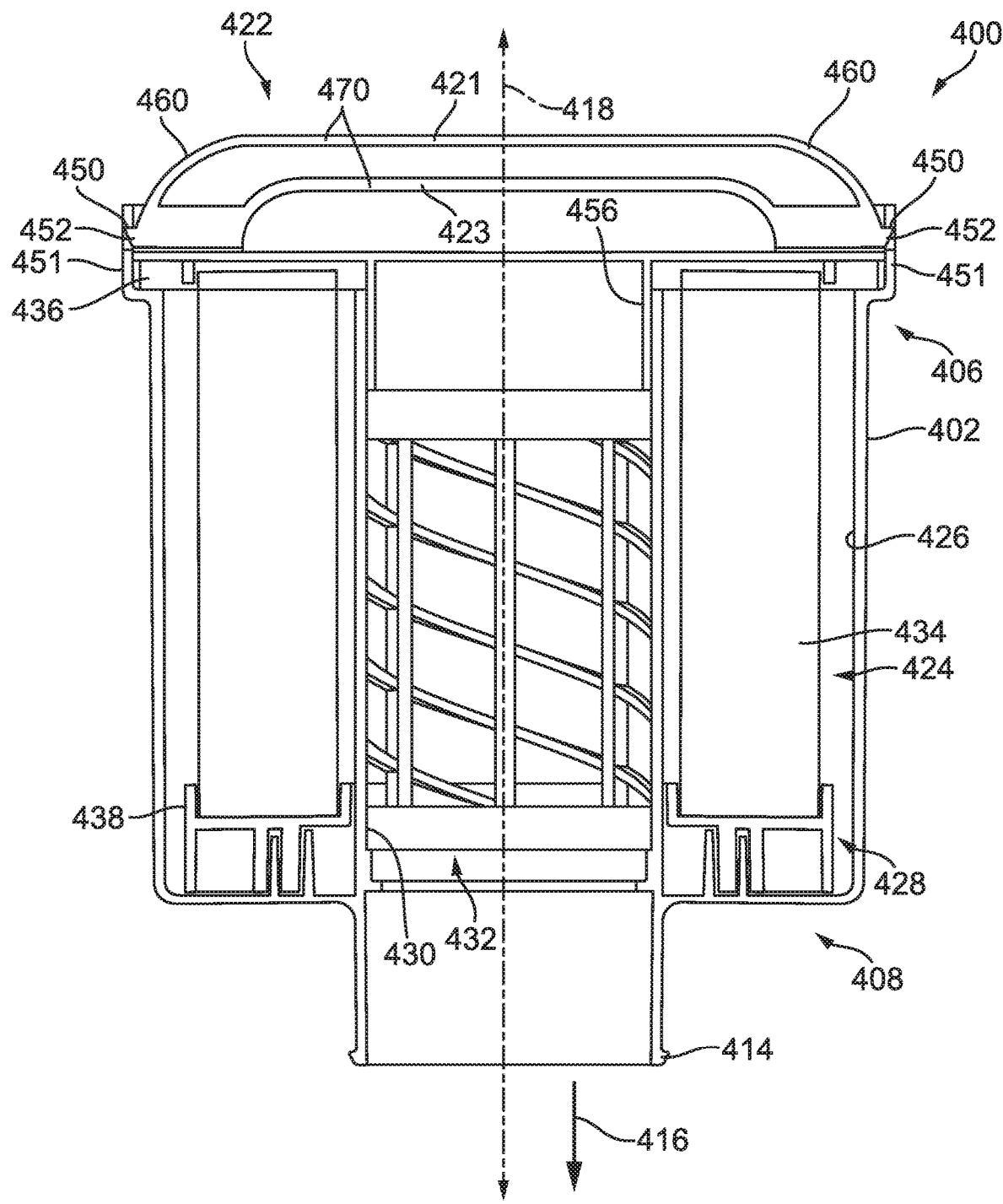
FIG. 13 shows a cross-sectional view of the air cleaner of FIG. 12.

As shown in FIG. 13, the air cleaner 400 includes a filter element 424. The filter element 424 is disposed in the housing 402 and axially extends between first and second axial ends that are respectively adjacent to the first and second ends 406, 408 of the housing 402. The air filter element 424 includes filter media 434 arranged in a cylindrical manner with an inner surface 430 defining a clean air outlet channel 432. An annular dirty air inlet channel 428 is defined between the outer surface of the filter element 424 and the housing inner surface 426. A first end of the filter media 434 is fitted with a top endplate 436 and a second end of the filter media 434 is fitted with a bottom endplate 438. In some embodiments, urethane adhesive attaches the filter media 434 to the cover 420 and as such, forms and acts as the top endplate 436. In this way, when the cover 420 and filter element 424 are assembled with the housing 402, the urethane adhesive axially seals the cover 420 to the housing 402. In some embodiments, the filter media 434 is embedded directly into the top endplate 436. In some embodiments, the top endplate 436 of the filter element 424 engages with the housing inner surface 426 such that a radial seal is created between the filter element 424 and the housing 402. The filter element 424 is axially insertable into the housing 402 through the first end 406 when the first end 406 is in an open condition (e.g., cover 420 is decoupled and removed from the housing 402). In addition, when the first end 406 is in an open condition, a user can access and service the filter element 424.

At the first end 406, the housing 402 includes a top perimeter edge 407 and two axially extending walls 451. The walls 451 extend above the top perimeter edge 407 and each wall 451 is positioned substantially opposite each other relative to the longitudinal axis 418. Each wall 451 forms a retainer 450 configured to receive a latch 452 of a handle assembly 422 of the cover 420 as described further below.

Figure 14:
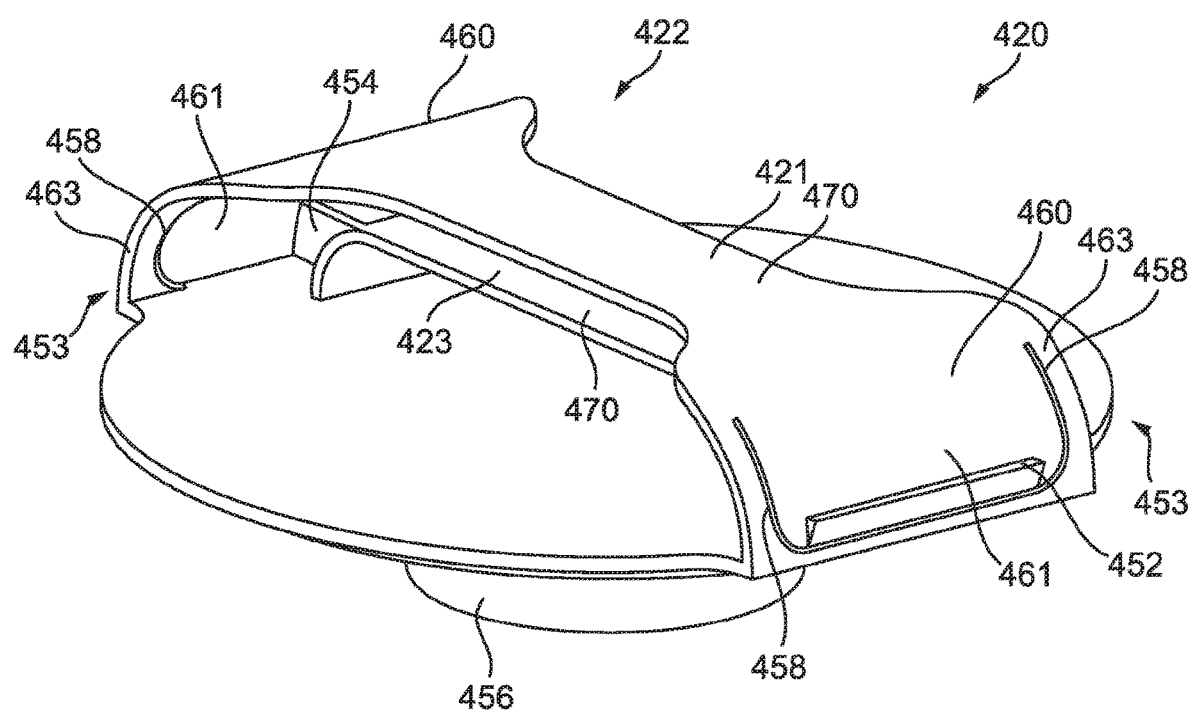
FIG. 14 shows a perspective view of a cover of the air cleaner of FIG. 12.
Figure 15:
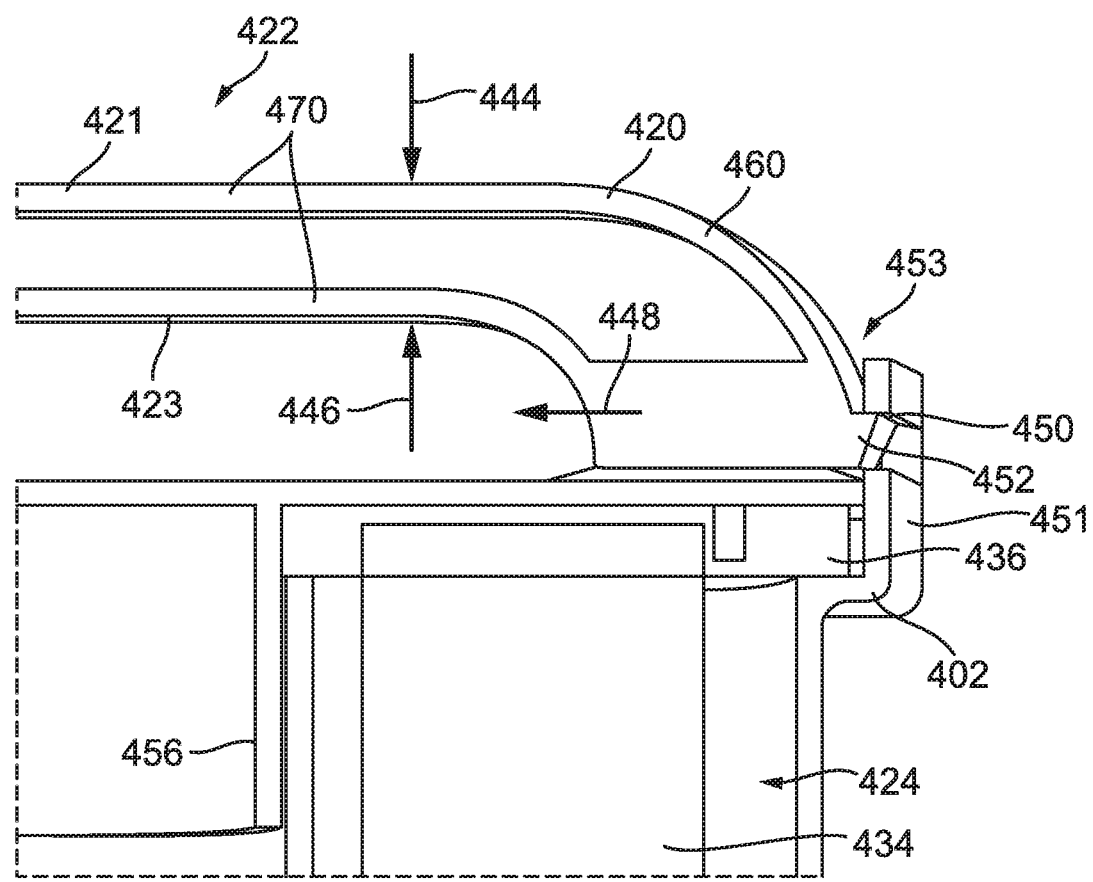
FIG. 15 shows a portion of a front cross-sectional view of the air cleaner of FIG. 12.
Figure 16:
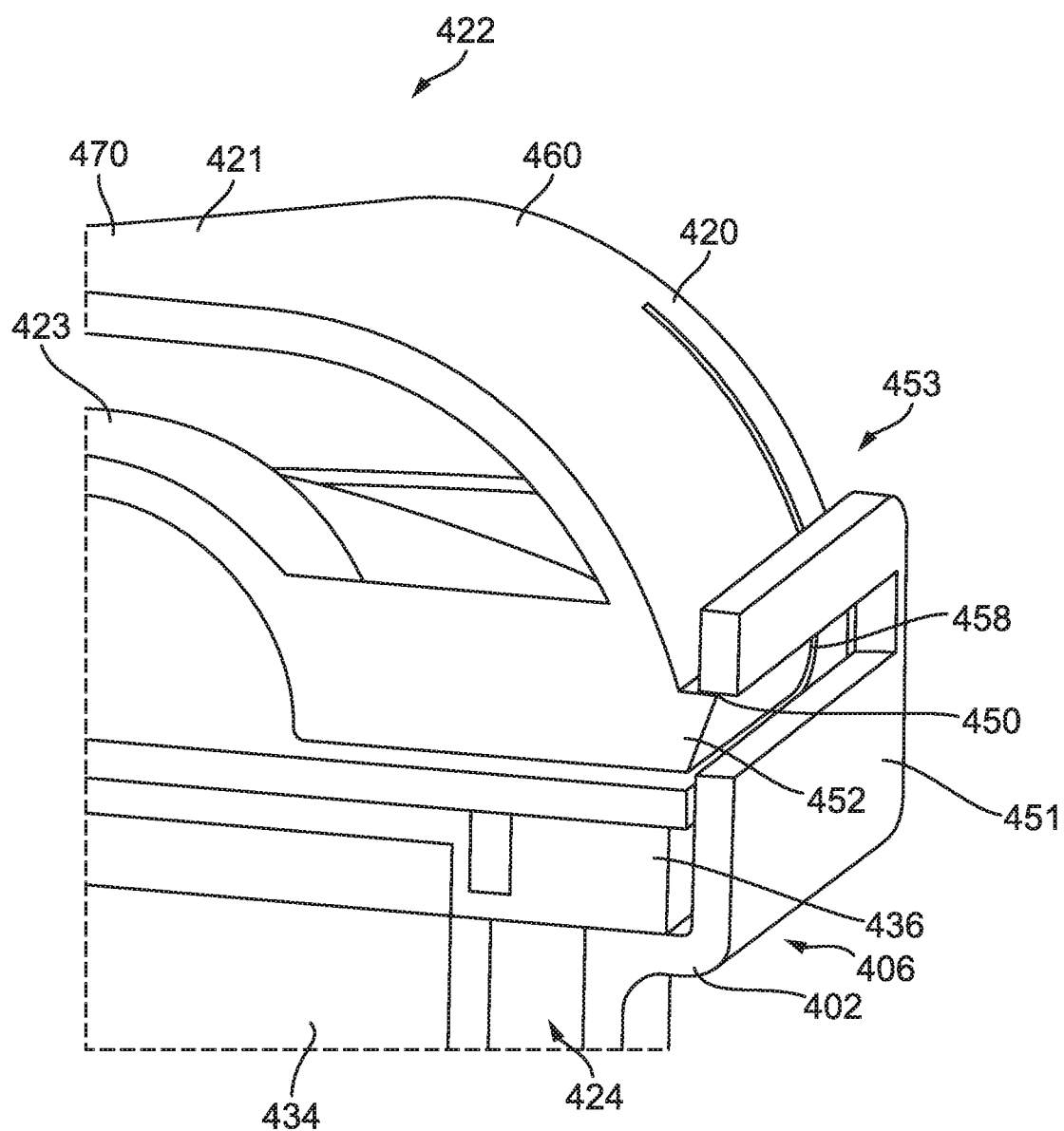
FIG. 16 shows a portion of a perspective cross-sectional view of the air cleaner of FIG. 12.

Referring to FIGS. 14-15, the cover 420 includes a handle assembly 422 configured to couple and decouple the cover 420 to and from the housing 402. The handle assembly 422 is formed as an integral piece with the cover 420. The handle assembly 422 includes a top handle member 421 and a bottom handle member 423 extending substantially between ends 453 of the handle assembly 422. Each of the top and bottom handle members 421, 423 include a flat portion 470 joining two curved portions 460 nearer the perimeter 427 of the cover 420. The top handle member 421 is positioned above the bottom handle member 423 along the axis 418 (e.g., further away from the first end 406 when the cover 420 is coupled to the housing 402). The first and second handle members 421, 423 are substantially parallel to each other. The handle members 421, 423 are flexible in nature such that a user can squeeze the handle members 421, 423 toward each other (e.g., squeeze top handle member 421 in a downward fashion along direction 444 and the bottom handle member 423 in an upward fashion along direction 446).

Each end 453 of the handle assembly 422 includes a latch 452. The latch 452 is positioned on the top handle member 421. The latch 452 engages with a retainer 450 of the housing 402 when the cover 420 is coupled to the housing 402. The engagement of the latch 452 with the retainer 450 prevents upward axial movement of the cover 420 relative to the housing 402. As the handle members 421, 423 are moved inward toward each other (e.g., along directions 444 and 446), the latches 452 also move inward along direction 448 and disengage from the retainers 450 on the housing 402. As shown in FIG. 14, on each end 453, the handle assembly 422 includes a movable portion 461 and a fixed portion 463 divided by a slot 458 formed on each end 453 (e.g., on the top handle member 421). The slot 458 allows the movable portion 461, including the latch 452, to move inward toward axis 418 and away from the retainer 450. A gap 425 is formed between the handle assembly 422 and the first end 406 of the housing 402 to allow a user to grasp the handle assembly 422 from underneath and pull in a substantially vertical direction along axis 418. Simultaneously, the user squeezes the handle members 421, 423 toward each other to disengage latches 452 from retainers 450 to remove the cover 420 from the housing 402. When replacing the cover 420, a user can use handle assembly 422 to align latches 452 with retainers 450 and move cover 420 downward along axis 418 until latches 452 engage retainers 450 snapping the cover 420 into place on the housing 402.

Figure 17:
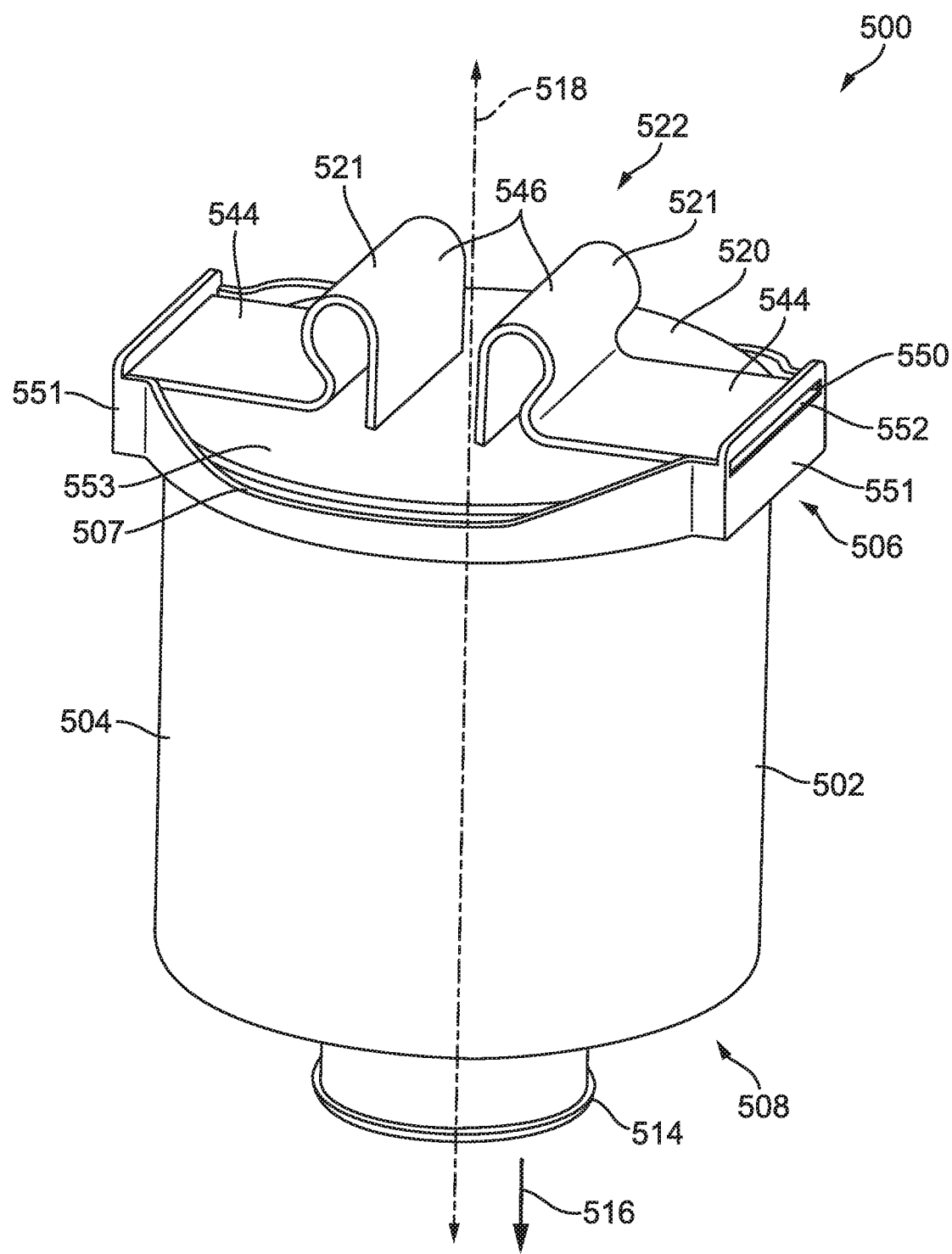
FIG. 17 shows a perspective view of an air cleaner, according to another example embodiment.
Figure 18:
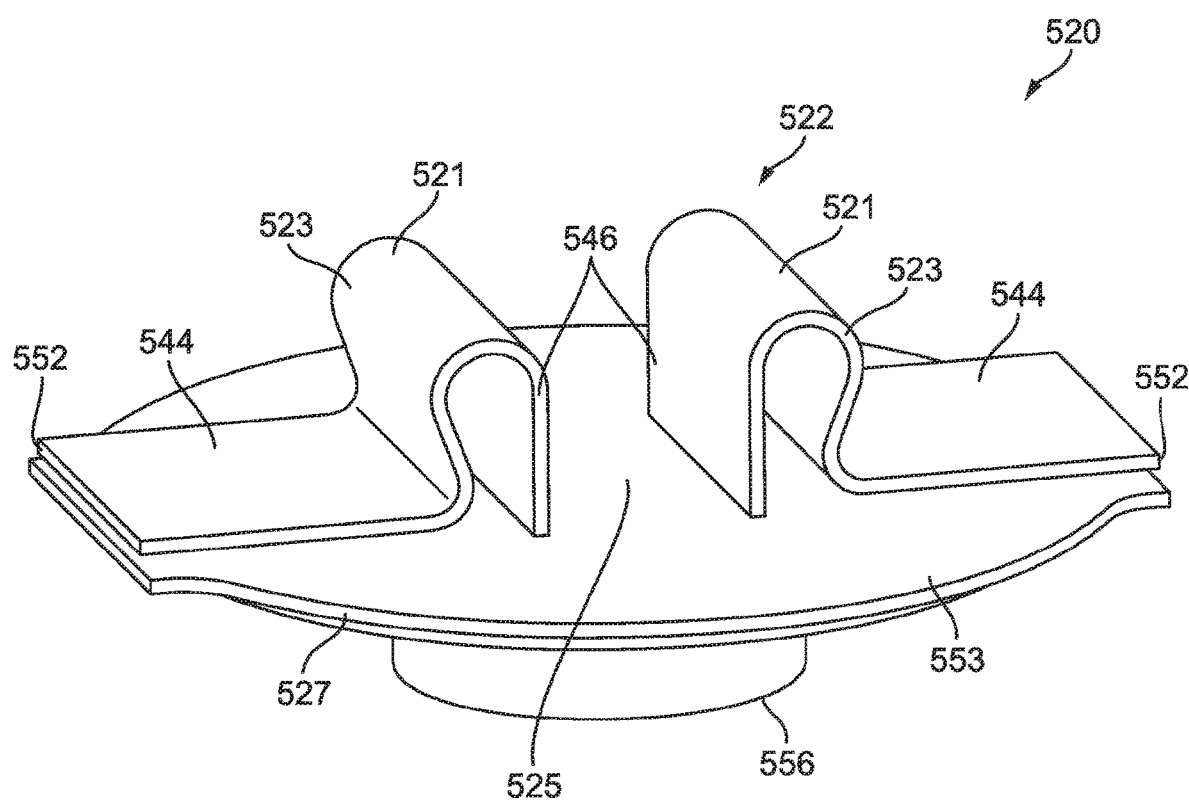
FIG. 18 shows a perspective view of a cover of the air cleaner of FIG. 17.
Figure 19:
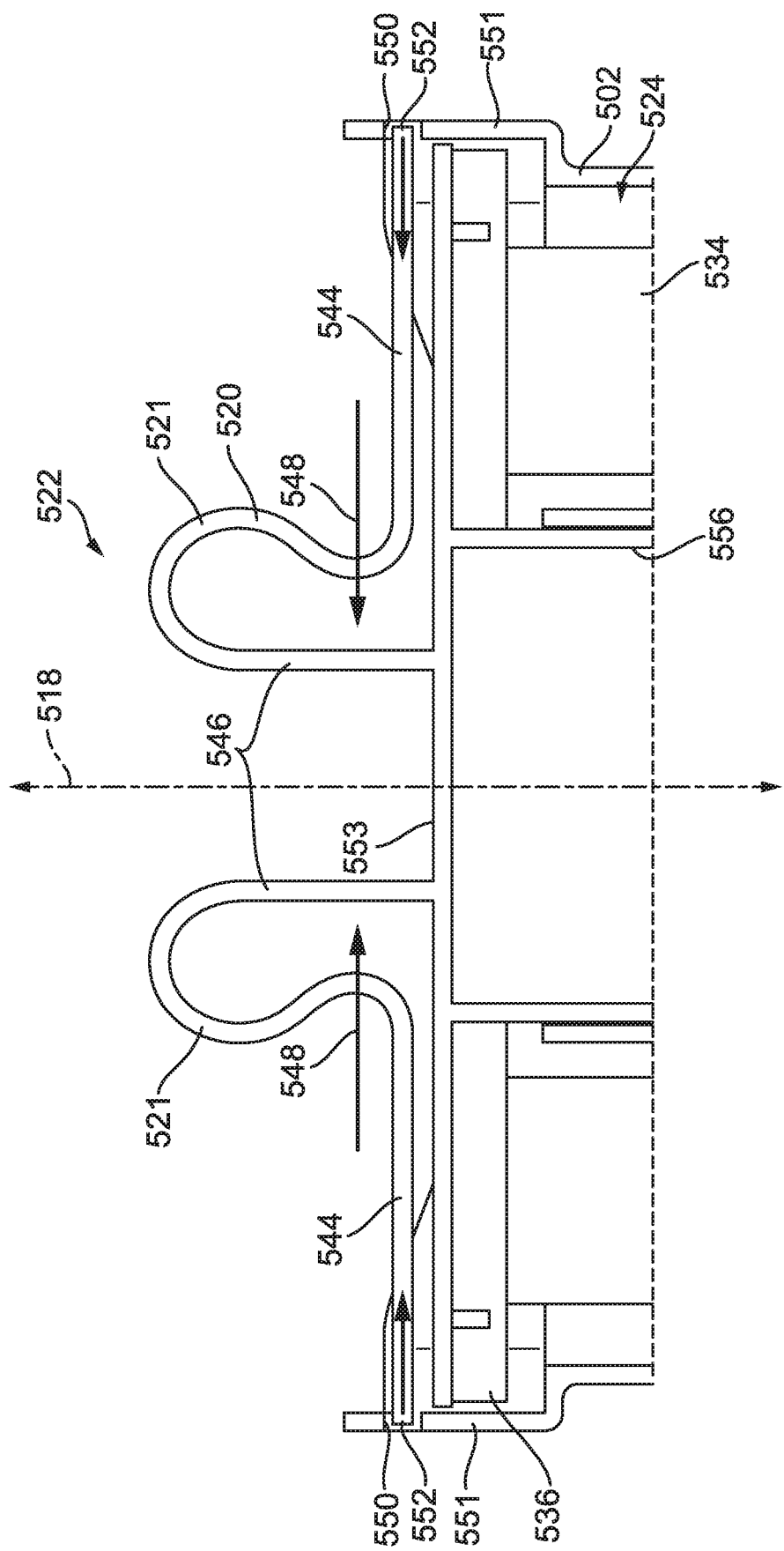
FIG. 19 shows a portion of a cross-sectional view of the air cleaner of FIG. 17.
Figure 20:
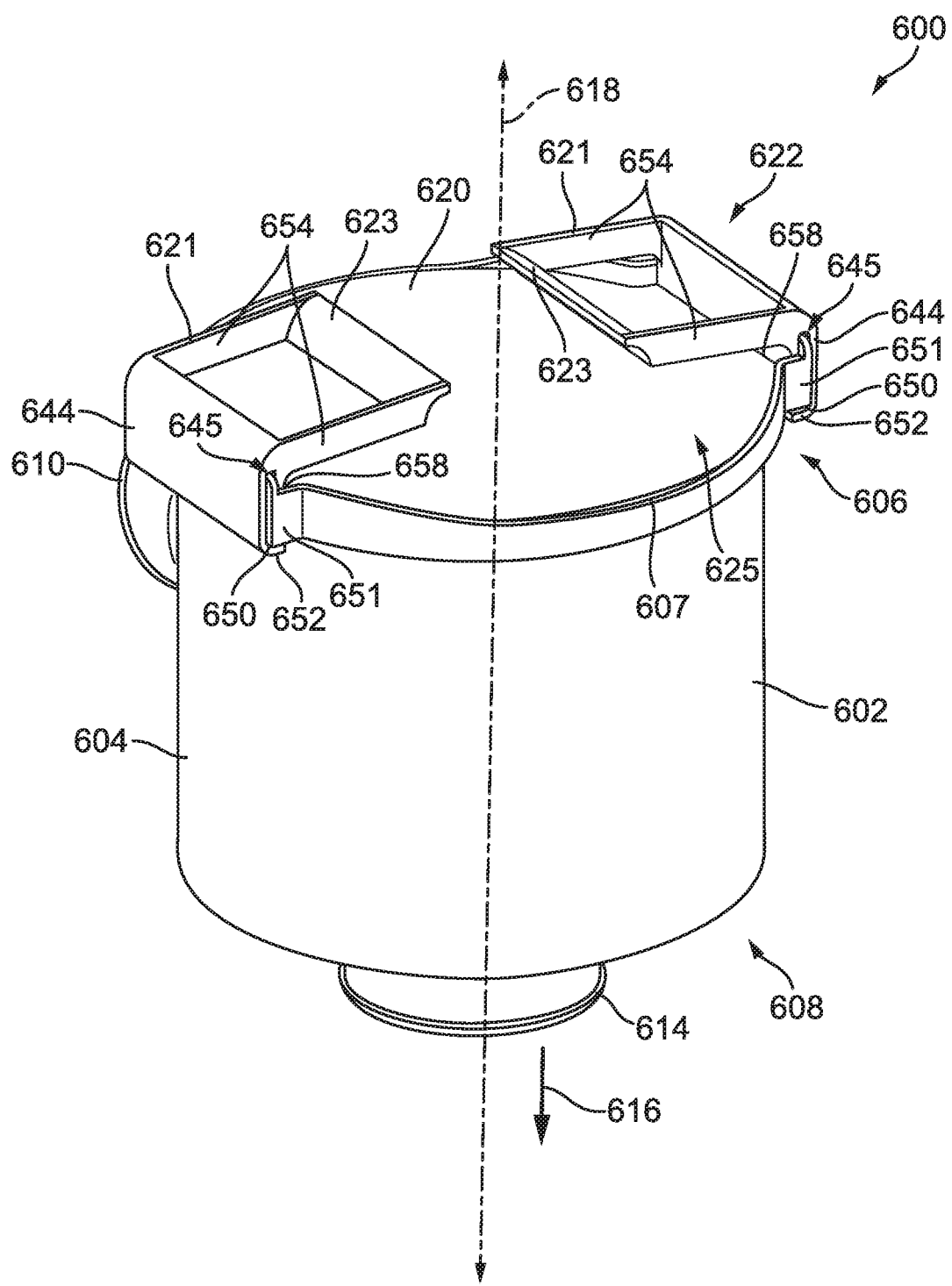
FIG. 20 shows a perspective view of an air cleaner, according to another example embodiment.
Figure 21:
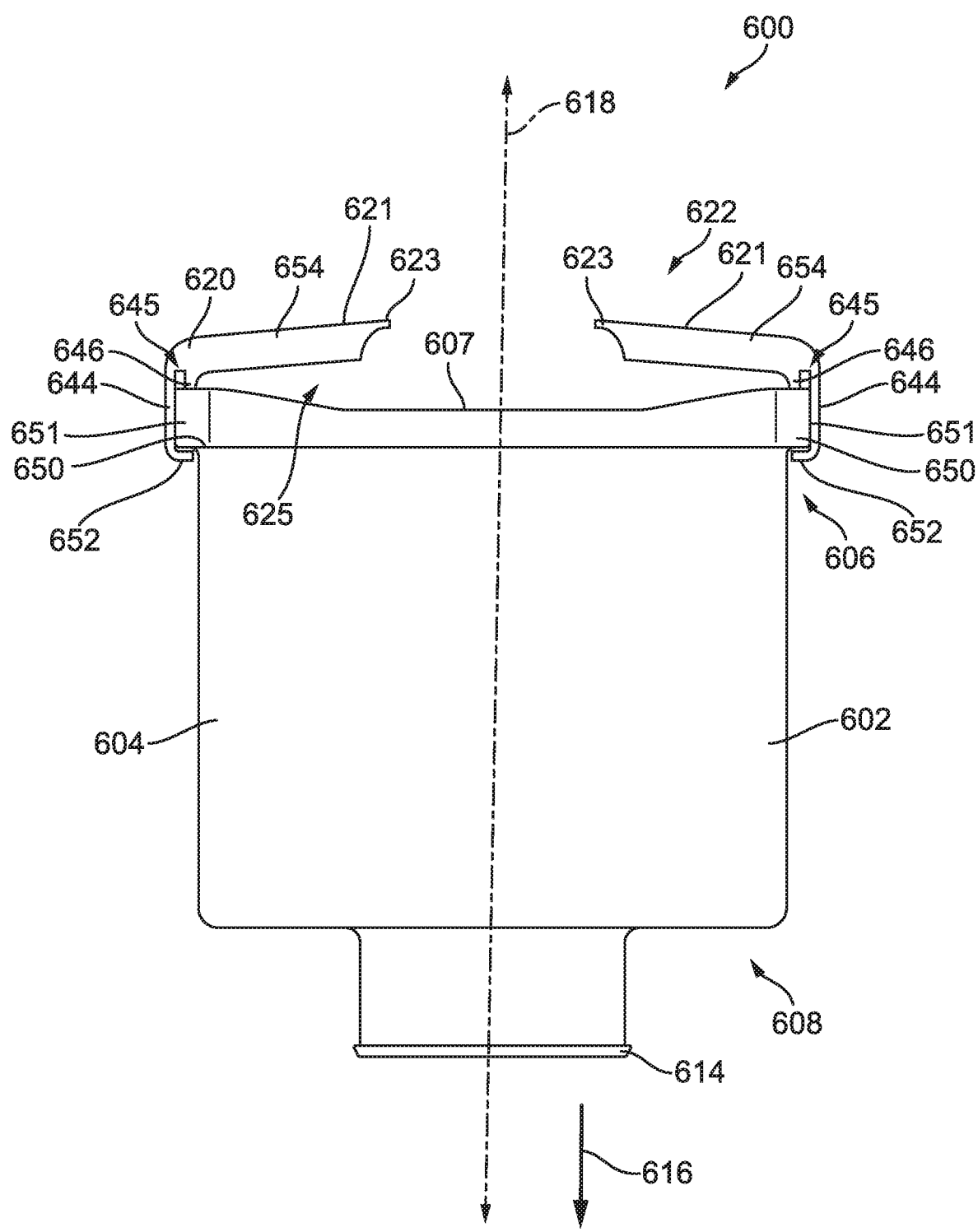
FIG. 21 shows a front view of the air cleaner of FIG. 20.

Referring to FIGS. 17-19, an air cleaner 500 according to another example embodiment is shown. The air cleaner 500 includes a housing 502 extending axially along a longitudinal axis 518 and having an annular sidewall 504 extending between a first end 506 and a second end 508. The sidewall 504 includes an air inlet configured to direct air into the housing 502. A cover 520 is coupled to the first end 506, as described further herein. The cover 520 is removable to enable replacement and servicing of the filter element 524 described below. When the cover 520 is coupled to the first end 506, the first end 506 is in a closed condition and when the cover 520 is decoupled and removed from the housing 502, the first end 506 is in an open position. The second end 508 includes an air outlet 514 configured to discharge clean filtered air substantially along outlet direction 516.

The air cleaner 500 includes a filter element 524. The filter element 524 is disposed in the housing 502 and axially extends between first and second axial ends that are respectively adjacent to the first and second ends 506, 508 of the housing 502. The air filter element 524 includes filter media 534 arranged in a cylindrical manner with an inner surface 530 defining a clean air outlet channel 532. An annular dirty air inlet channel 528 is defined between the outer surface of the filter element 524 and the housing inner surface 526. A first end of the filter media 534 is fitted with a top endplate 536 and a second end of the filter media 534 is fitted with a bottom endplate 538. In some embodiments, urethane adhesive attaches the filter media 534 to the cover 520 and as such, forms and acts as the top endplate 536. In this way, when the cover 520 and filter element 524 are assembled with the housing 502, the urethane adhesive axially seals the cover 520 to the housing 502. In some embodiments, the filter media 534 is embedded directly into the top endplate 536. In some embodiments, the top endplate 536 of the filter element 524 engages with the housing inner surface 526 such that a radial seal is created between the filter element 524 and the housing 502. The filter element 524 is axially insertable into the housing 502 through the first end 506 when the first end 506 is in an open condition (e.g., cover 520 is decoupled and removed from the housing 502). In addition, when the first end 506 is in an open condition, a user can access and service the filter element 524.

At the first end 506, the housing 502 includes a top perimeter edge 507 and two axially extending housing walls 551. The housing walls 551 are integral to the housing 502 and extend above the top perimeter edge 507. Each housing wall 551 is positioned substantially opposite each other relative to the longitudinal axis 518. Each housing wall 551 forms a retainer 550 configured to receive a latch 552 formed on a handle assembly 522 of the cover 520 as described further below.

Referring to FIG. 18, the cover 520 includes a handle assembly 522 configured to couple and decouple the cover 520 to and from the housing 502. The handle assembly 522 is formed as an integral piece with the cover 520. The handle assembly 522 includes two handle members 521, each including a curved portion 523, a straight portion 544, and a latch 552. The curved portion 523 provides a gripping surface for the user to squeeze the two handle members 521 together. The straight portion 544 extends from the curved portion 523 and ends at latch 552. Specifically, the handle members 521 extend vertically upward (e.g., substantially parallel to axis 518) from the top surface 553 of the cover 502 proximate the center 525. The handle members 521 curve back toward the top surface 553 in curved portions 523. Proximate, but not in contact with, the top surface 553, the handle members 521 curve back outward away from the center 525 (e.g., substantially perpendicular to axis 518 shown in FIG. 17) toward perimeter 527 forming straight portions 544. Latches 552 on the end of each straight portion 544 slidingly engage the retainers 550 on the housing 502. The engagement of the latches 552 with the retainers 550 prevents upward axial movement of the cover 520 relative to the housing 502.

A user can grip the handle members 521 at curved portions 523 and squeeze the handle members 521 together (e.g., toward axis 518 shown in FIG. 17). As the handle members 521 are moved inward toward the axis 518, the latches 552 also move inward along direction 548 (shown in FIG. 19) and disengage from the retainers 550 on the housing 502. When the user squeezes the handle members 521 to disengage latches 552 from the retainers 550 and simultaneously pulls the cover 520 upward along axis 518, the cover 520 is removed from the housing 502. When replacing the cover 520, a user can use handle assembly 522 to align the latches 552 with the retainers 550 and move cover 520 downward along axis 518 until the latches 552 engage with the retainers 550 snapping the cover 520 into place on the housing 502.

Referring to FIGS. 20-24, an air cleaner 600 according to another example embodiment is shown. The air cleaner 600 includes a housing 602 extending axially along a longitudinal axis 618 and having an annular sidewall 604 extending between a first end 606 and a second end 608. The sidewall 604 includes an air inlet 610 configured to direct air into the housing 602. A cover 620 is coupled to the first end 606, as described further herein. The cover 620 is removable to enable replacement and servicing of the filter element 624 described below. When the cover 620 is coupled to the first end 606, the first end 606 is in a closed condition and when the cover 620 is decoupled and removed from the housing 602, the first end 606 is in an open position. The second end 608 includes an air outlet 614 configured to discharge clean filtered air substantially along outlet direction 616.

Figure 24:
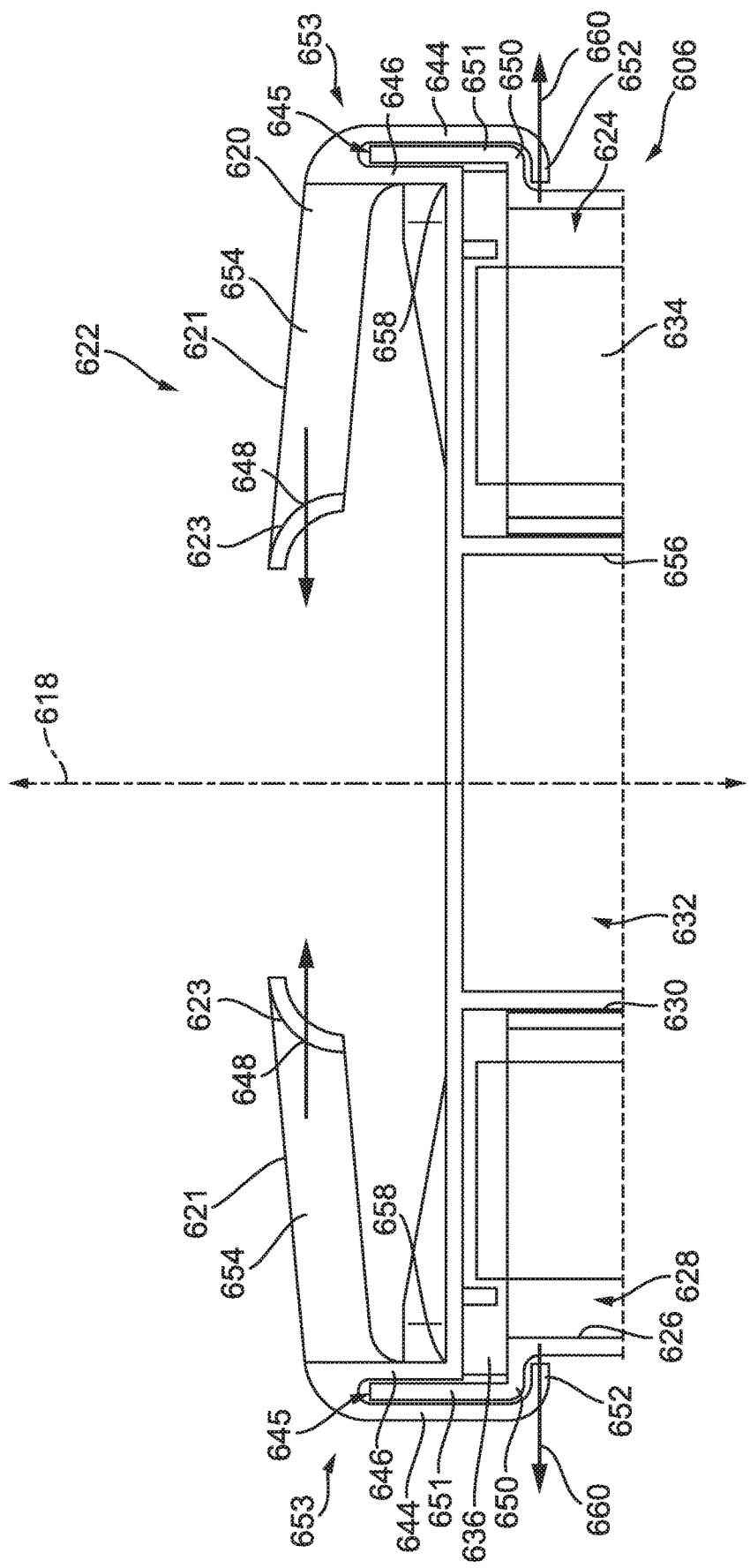
FIG. 24 shows a portion of a cross-sectional view of the air cleaner of FIG. 20.
Figure 25:
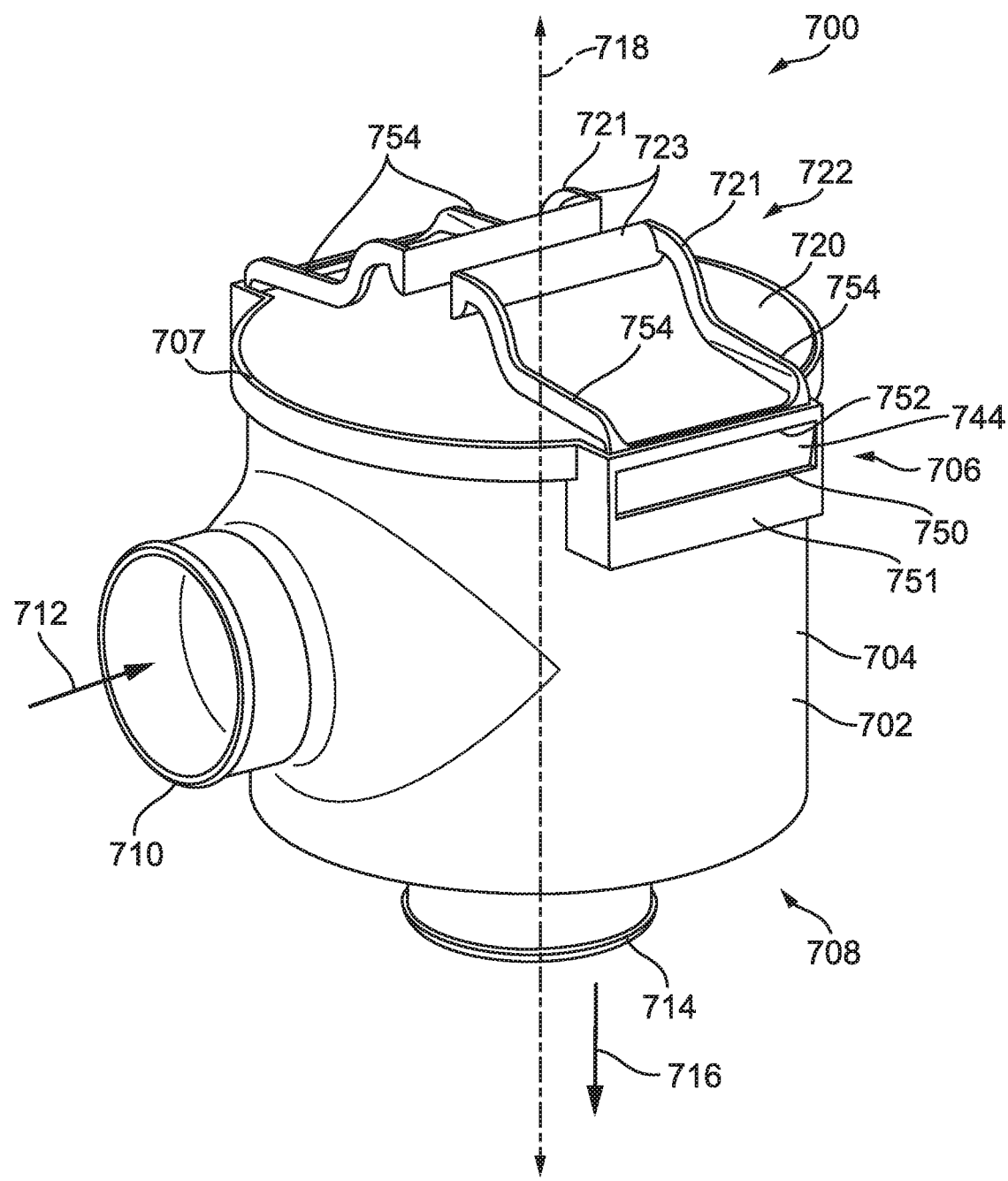
FIG. 25 shows a perspective view of an air cleaner, according to another example embodiment.

Referring to FIG. 24, the air cleaner 600 includes a filter element 624. The filter element 624 is disposed in the housing 602 and axially extends between first and second axial ends that are respectively adjacent to the first and second ends 606, 608 of the housing 602. The air filter element 624 includes filter media 634 arranged in a cylindrical manner with an inner surface 630 defining a clean air outlet channel 632. An annular dirty air inlet channel 628 is defined between the outer surface of the filter element 624 and the housing inner surface 626. A first end of the filter media 634 is fitted with a top endplate 636 and a second end of the filter media 634 is fitted with a bottom endplate 638. In some embodiments, urethane adhesive attaches the filter media 634 to the cover 620 and as such, forms and acts as the top endplate 636. In this way, when the cover 620 and filter element 624 are assembled with the housing 602, the urethane adhesive axially seals the cover 620 to the housing 602. In some embodiments, the filter media 634 is embedded directly into the top endplate 636. In some embodiments, the top endplate 636 of the filter element 624 engages with the housing inner surface 626 such that a radial seal is created between the filter element 624 and the housing 602. The filter element 264 is axially insertable into the housing 602 through the first end 606 when the first end 606 is in an open condition (e.g., cover 620 is decoupled and removed from the housing 602). In addition, when the first end 606 is in an open condition, a user can access and service the filter element 624.

At the first end 606, the housing 602 includes a top perimeter edge 607 and two axially extending housing walls 651. The housing walls 651, which are integral with the housing 602, extend above the top perimeter edge 607. Each housing wall 651 is positioned substantially opposite each other relative to the longitudinal axis 618. On an underside of each housing wall 651 a retainer 650 is formed. The retainer 650 is configured to engage a latch 652 formed on a handle assembly 622 of the cover 620 as described further below.

Figure 22:
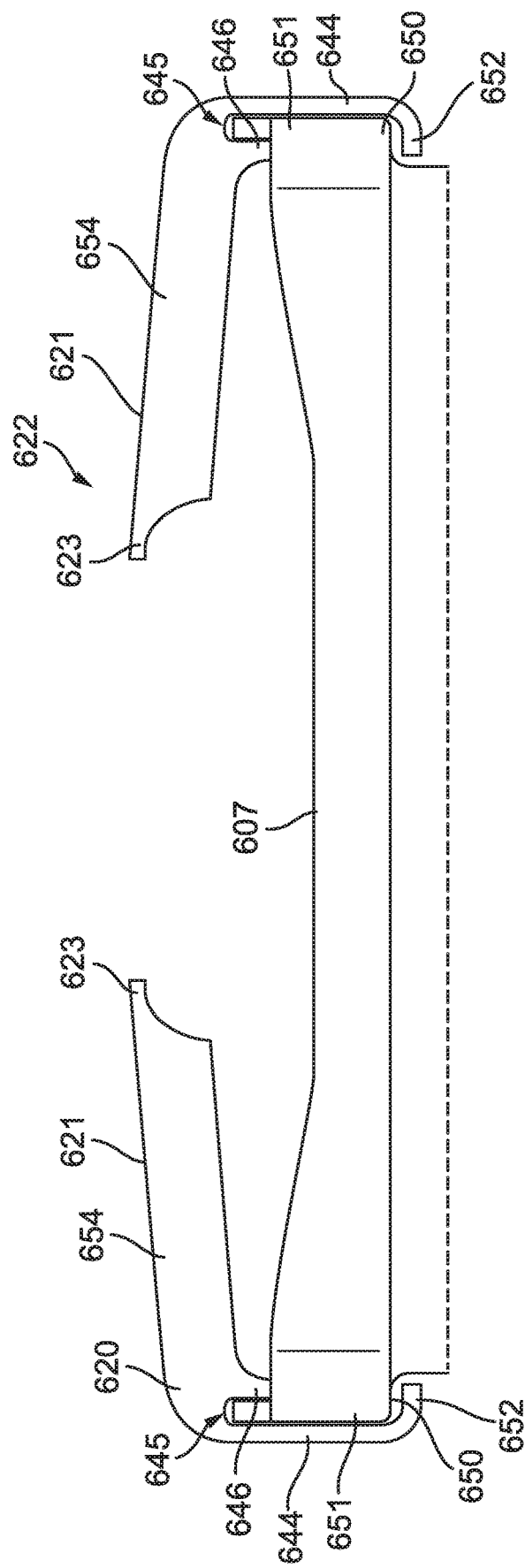
FIG. 22 shows a front view of a portion of the air cleaner of FIG. 20.
Figure 23:
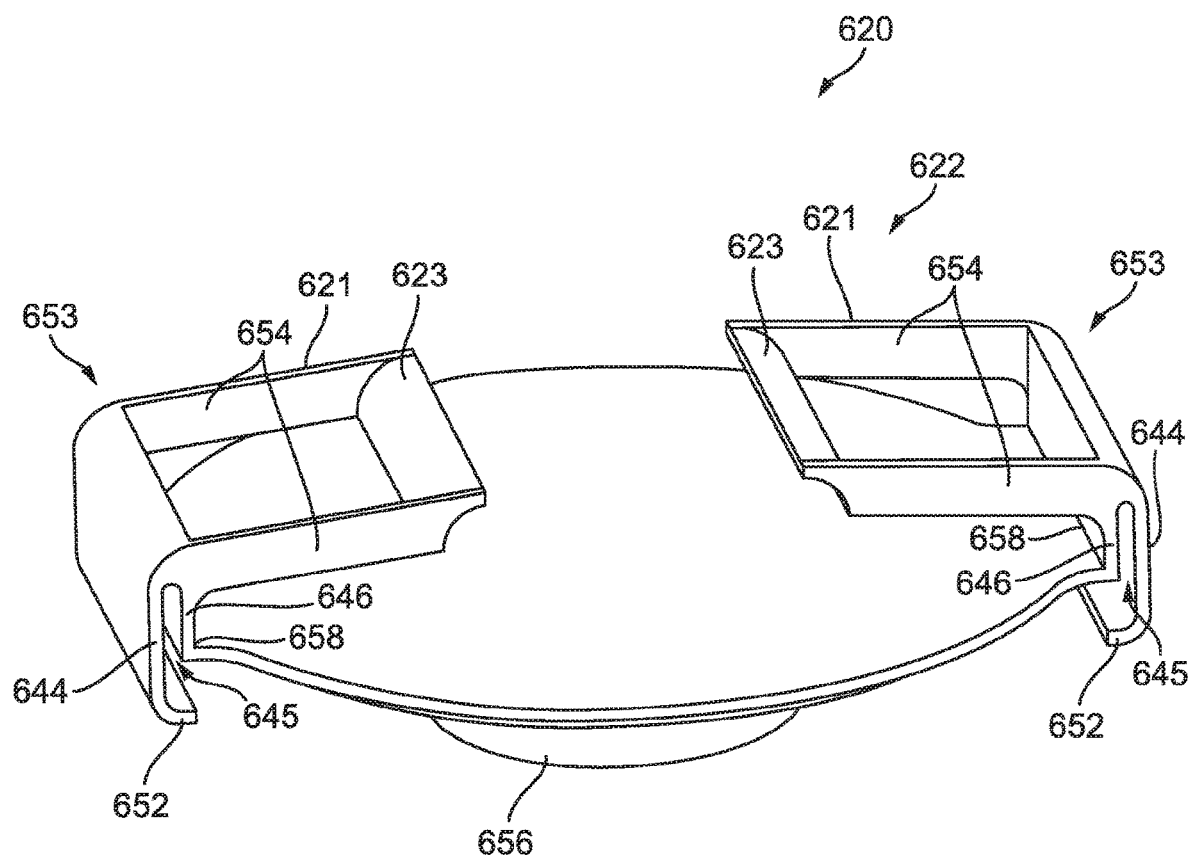
FIG. 23 shows a perspective view of a cover of the air cleaner of FIG. 20.

Referring to FIGS. 22-24, the cover 620 includes a handle assembly 622 configured to couple and decouple the cover 620 to and from the housing 602. The handle assembly 622 is formed as an integral piece with the cover 620. The handle assembly 622 includes two ends 653, with two handle members 621 extending inward toward the axis 618 from each end 653. At each end 653, the handle members 621 each include an outer wall 644 and an inner wall 646 substantially parallel to each other. A slot 645 is formed between the outer wall 644 and inner wall 646. When the cover 620 is coupled to the housing 602, each of the slots 645 receives a housing wall 651 formed on the housing 602. Accordingly, the inner wall 646 is positioned proximate an inner surface of the housing wall 651 and the outer wall 644 of the cover 620 is positioned proximate an outer surface of the housing wall 651. At a bottom end, each outer wall 644 includes a latch 652. The latch 652 extends inward toward the axis 618 and wraps under the retainer 650 formed on an underside of the housing wall 651. The engagement of the latch 652 with the retainer 650 prevents upward axial movement of the cover 620 relative to the housing 602.

Each handle member 621 includes two cantilever members 654 extending inward from each end 653 and a cross-member 623. The cross-member 623 joins the two cantilever members 654. Each handle member 621 is flexible approximately about a pivot 658. The cross-member 623 is curved inward toward the axis 618. The cross-member 623 is configured to be grasped by the user at the outer curved surfaces to flex the handle members 621 inward toward the axis 618 along direction 648 and downward toward the first end 606 of the housing 602.

Referring to FIG. 24, as the handle members 621 are moved inward toward the axis 618 along direction 648 (e.g., squeezed by the user), the latches 652 move outward along direction 660 and disengage from the retainers 650 on the housing 602. A gap 625 is formed between the handle assembly 622 and the first end 606 of the housing 602 to allow for the flex of the handle members 621 when a user grasps the cross-members 623. When the user squeezes the handle members 621 to disengage latches 652 from the retainers 650 and simultaneously moves the cover 620 upward along axis 618, the cover 620 is removed from the housing 602. When replacing the cover 620, a user can use handle assembly 622 to align the ends 653 of the cover 620 with the housing walls 651 and move the cover 620 downward along axis 618 until the latches 652 engage with the retainers 650 snapping the cover 620 into place on the housing 602.

Referring to FIGS. 25-28, an air cleaner 700 according to another example embodiment is shown. The air cleaner 700 includes a housing 702 extending axially along a longitudinal axis 718 and having an annular sidewall 704 extending between a first end 706 and a second end 708. The sidewall 704 includes an air inlet 710 configured to direct air into the housing 702. A cover 720 is coupled to the first end 706, as described further herein. The cover 720 is removable to enable replacement and servicing of the filter element 724 described below. When the cover 720 is coupled to the first end 706, the first end 706 is in a closed condition and when the cover 720 is decoupled and removed from the housing 702, the first end 706 is in an open position. The second end 708 includes an air outlet 714 configured to discharge clean filtered air substantially along outlet direction 716.

Figure 27:
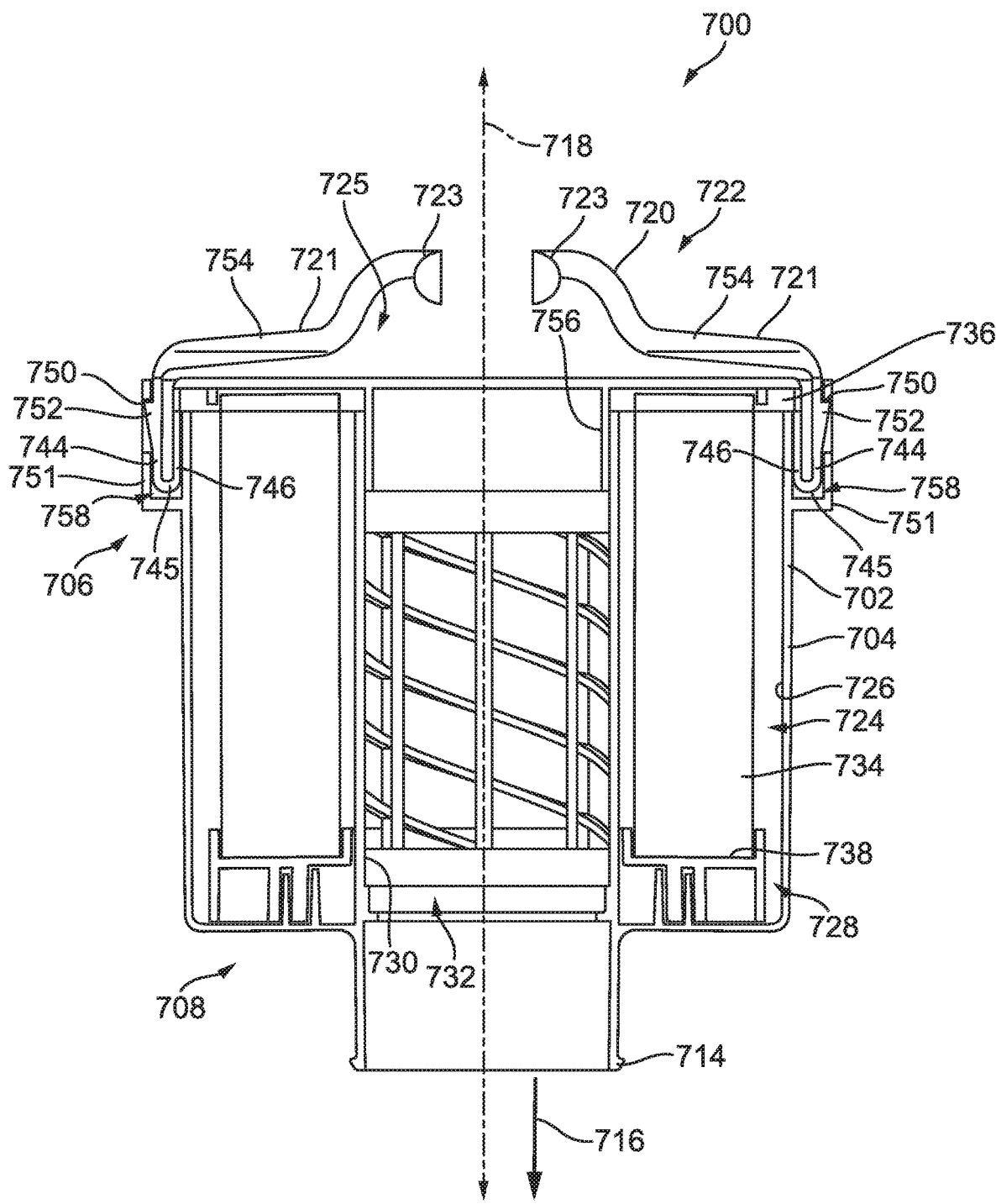
FIG. 27 shows a cross-sectional view of the air cleaner of FIG. 25.
Figure 28:
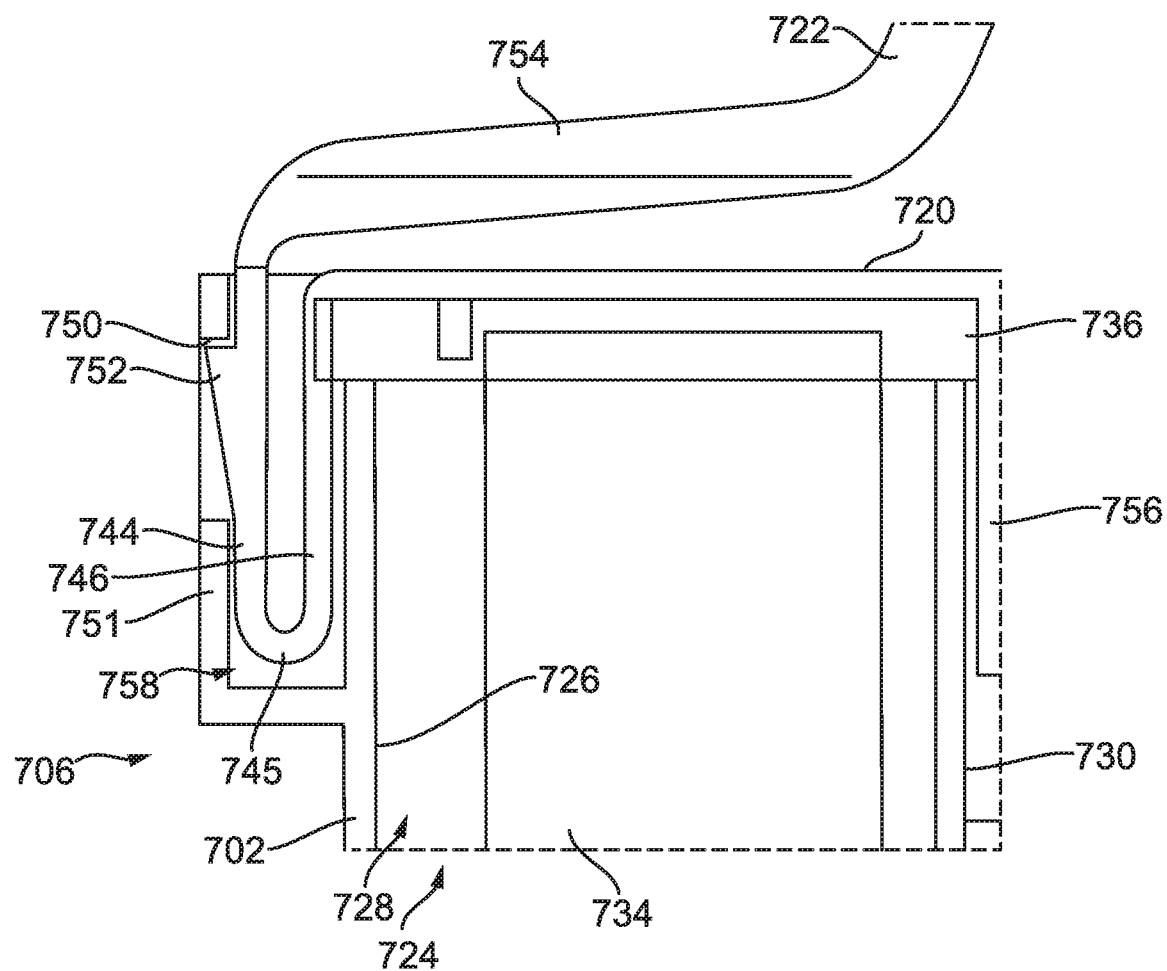
FIG. 28 shows a portion of a cross-sectional view of the air cleaner of FIG. 25.
Figure 29:
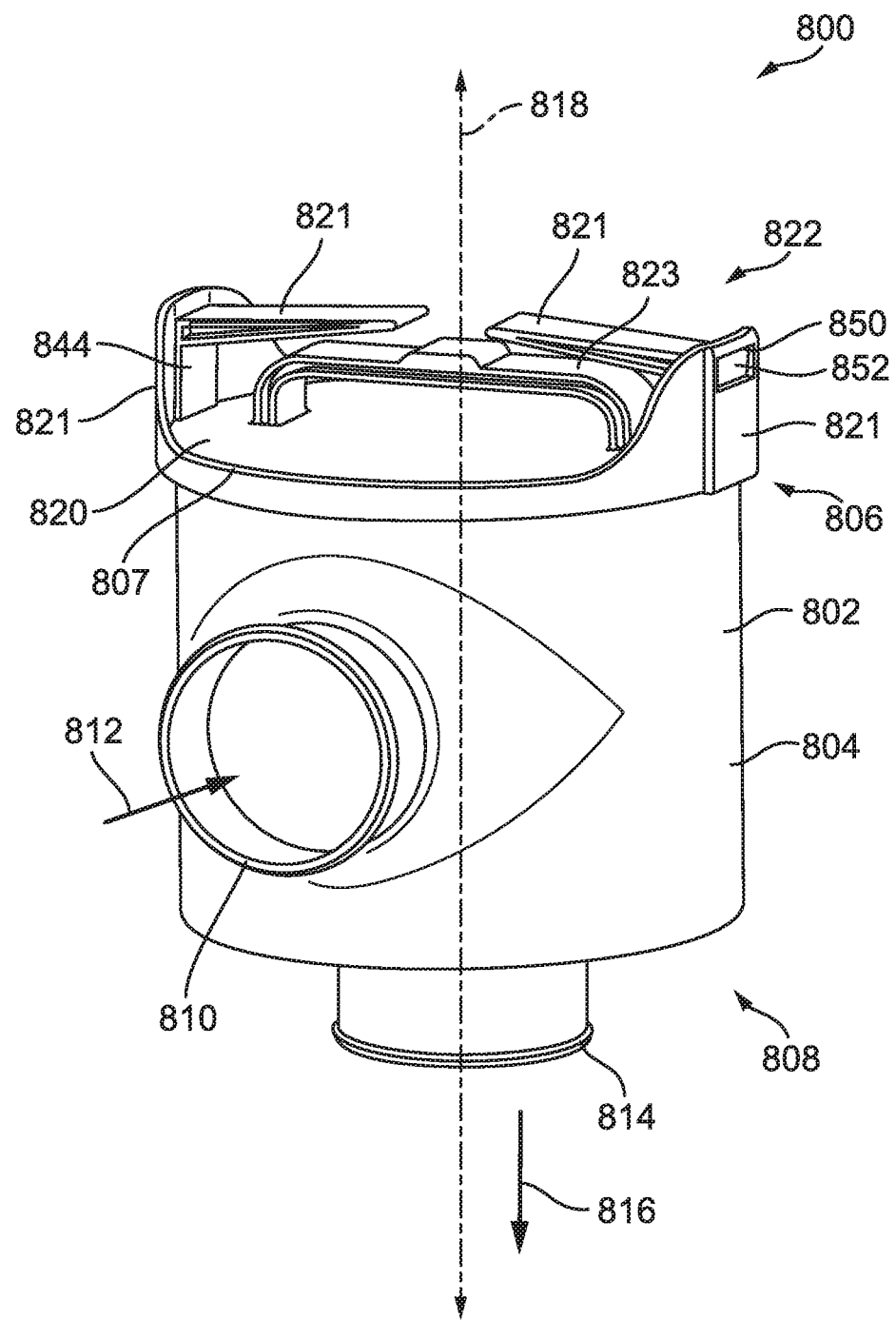
FIG. 29 shows a perspective view of an air cleaner, according to another example embodiment.

Referring to FIGS. 27-28, the air cleaner 700 includes a filter element 724. The filter element 724 is disposed in the housing 702 and axially extends between first and second axial ends that are respectively adjacent to the first and second ends 706, 708 of the housing 702. The air filter element 724 includes filter media 734 arranged in a cylindrical manner with an inner surface 730 defining a clean air outlet channel 732. An annular dirty air inlet channel 728 is defined between the outer surface of the filter element 724 and the housing inner surface 726. A first end of the filter media 734 is fitted with a top endplate 736 and a second end of the filter media 734 is fitted with a bottom endplate 738. In some embodiments, urethane adhesive attaches the filter media 734 to the cover 720 and as such, forms and acts as the top endplate 736. In this way, when the cover 720 and filter element 724 are assembled with the housing 702, the urethane adhesive axially seals the cover 720 to the housing 702. In some embodiments, the filter media 734 is embedded directly into the top endplate 736. In some embodiments, the top endplate 736 of the filter element 724 engages with the housing inner surface 726 such that a radial seal is created between the filter element 724 and the housing 702. The filter element 764 is axially insertable into the housing 702 through the first end 706 when the first end 706 is in an open condition (e.g., cover 720 is decoupled and removed from the housing 702). In addition, when the first end 706 is in an open condition, a user can access and service the filter element 724.

At the first end 706, the housing 702 includes a top perimeter edge 707 and two axially extending housing walls 751. The housing walls 751, which are integral with the housing 702, extend below the top perimeter edge 707 on the outside of the housing 702. Each housing wall 751 is positioned substantially opposite each other relative to the longitudinal axis 718. Each housing wall 751 includes a retainer 750 configured to receive a latch 752 of the handle assembly. A slot 758 is formed between each housing wall 751 and the outer surface of the housing 702. The slot 758 is configured to slidingly receive a curved portion 745 of the handle assembly 722. When the curved portion 745 is inserted into the slot 758, the retainer 750 engages the latch 752. The engagement of the latch 752 with the retainer 750 prevents upward axial movement of the cover 720 relative to the housing 702.

Figure 26:
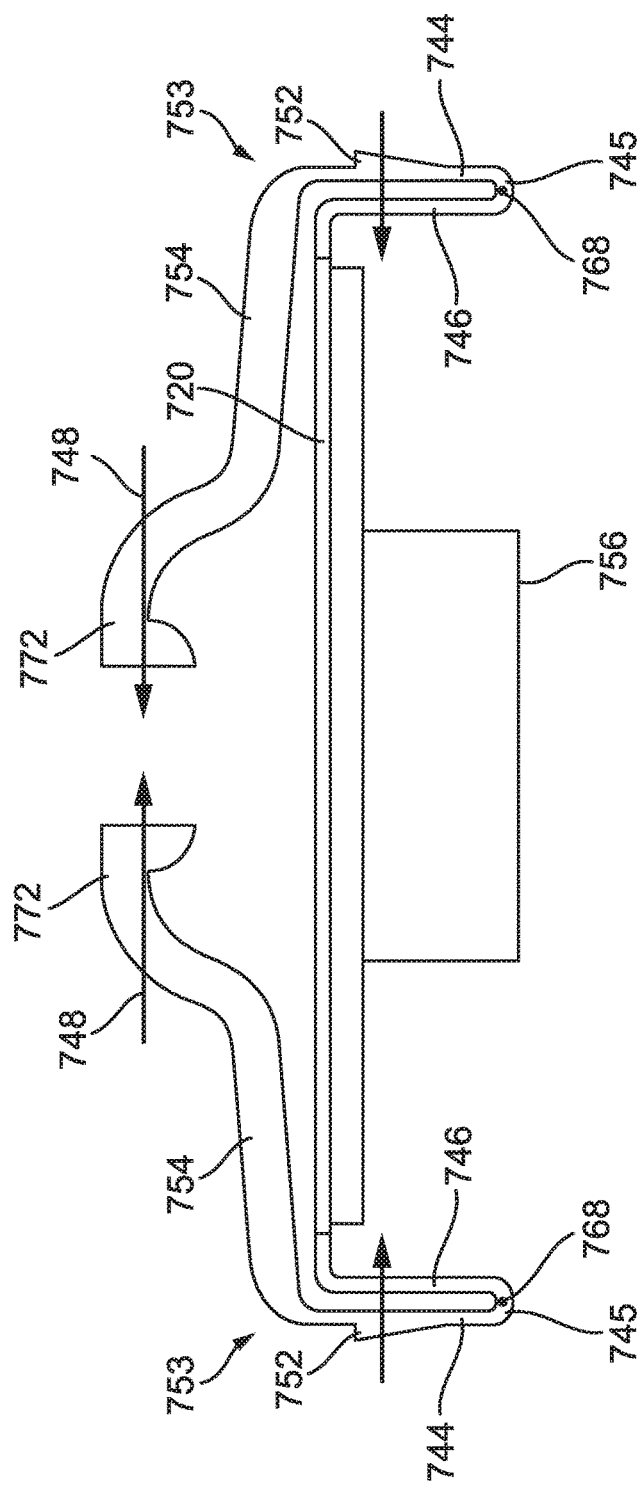
FIG. 26 shows a front view of a cover of the air cleaner of FIG. 25.

Referring to FIG. 26, the cover 720 includes a handle assembly 722 configured to couple and decouple the cover 720 to and from the housing 702. The handle assembly 722 is formed as an integral piece with the cover 720. The handle assembly 722 includes two ends 753, with two handle members 721 extending inward toward the axis 718 from each end 753. At each end 753, the handle members 721 each include an outer wall 744 and an inner wall 746 substantially parallel to each other and joined at the curved portion 745. When the cover 720 is coupled to the housing 702, each of the outer wall 744, the inner wall 746 and curved portion 745 are received in a slot 758 formed as part of the housing 702. Accordingly, the inner wall 746 is positioned proximate an outer surface of the housing 702 and the outer wall 744 is positioned proximate an inner surface of the housing wall 751. Each outer wall 744 includes a latch 752. The latch 752 is a protrusion formed on the outer wall 744 extending outward from the axis 718.

Each handle member 721 includes two cantilever members 754 extending inward from each end 753 and a cross-member 723. The cross-member 723 joins the two cantilever members 754. Each handle member 721 is flexible approximately about a pivot 768. The cross-member 723 is curved inward toward the axis 718. The cross-member 723 is configured to be grasped by the user at the outer curved surfaces to flex the handle members 721 inward toward the axis 718 along direction 748 and downward toward the first end 706 of the housing 702. As the handle members 721 are moved inward toward the axis 718 along direction 748 (e.g., squeezed by the user), the latches 752 also move inward toward axis 718 and disengage from the retainers 750 formed in the housing walls 751. A gap 725 (shown in FIG. 27) is formed between the handle assembly 722 and the first end 706 of the housing 702 to allow for the flex of the handle members 721 when a user grasps the cross-members 723. When the user squeezes the handle members 721 to disengage latches 752 from the retainers 750 and simultaneously moves the cover 720 upward along axis 718, the cover 720 is removed from the housing 702. When replacing the cover 720, a user can use handle assembly 722 to align the ends 753 of the cover 720 with the slots 758 formed in the housing 702 and move the cover 720 downward along axis 718 until the latches 752 engage with the retainers 750, thereby snapping the cover 720 into place on the housing 702.

Referring to FIGS. 29-32, an air cleaner 800 according to another example embodiment is shown. The air cleaner 800 includes a housing 802 extending axially along a longitudinal axis 818 and having an annular sidewall 804 extending between a first end 806 and a second end 808, where the sidewall 804 includes an air inlet 810 configured to direct air into the housing 802 substantially along inlet direction 812. A cover 820 is coupled to the first end 806, as described further herein. The cover 820 is removable to enable replacement and servicing of the filter element 824 described below. When the cover 820 is coupled to the first end 806, the first end 806 is in a closed condition and when the cover 820 is decoupled and removed from the housing 802, the first end 806 is in an open position. The second end 808 includes an air outlet 814 configured to discharge clean filtered air substantially along outlet direction 816.

Figure 31:
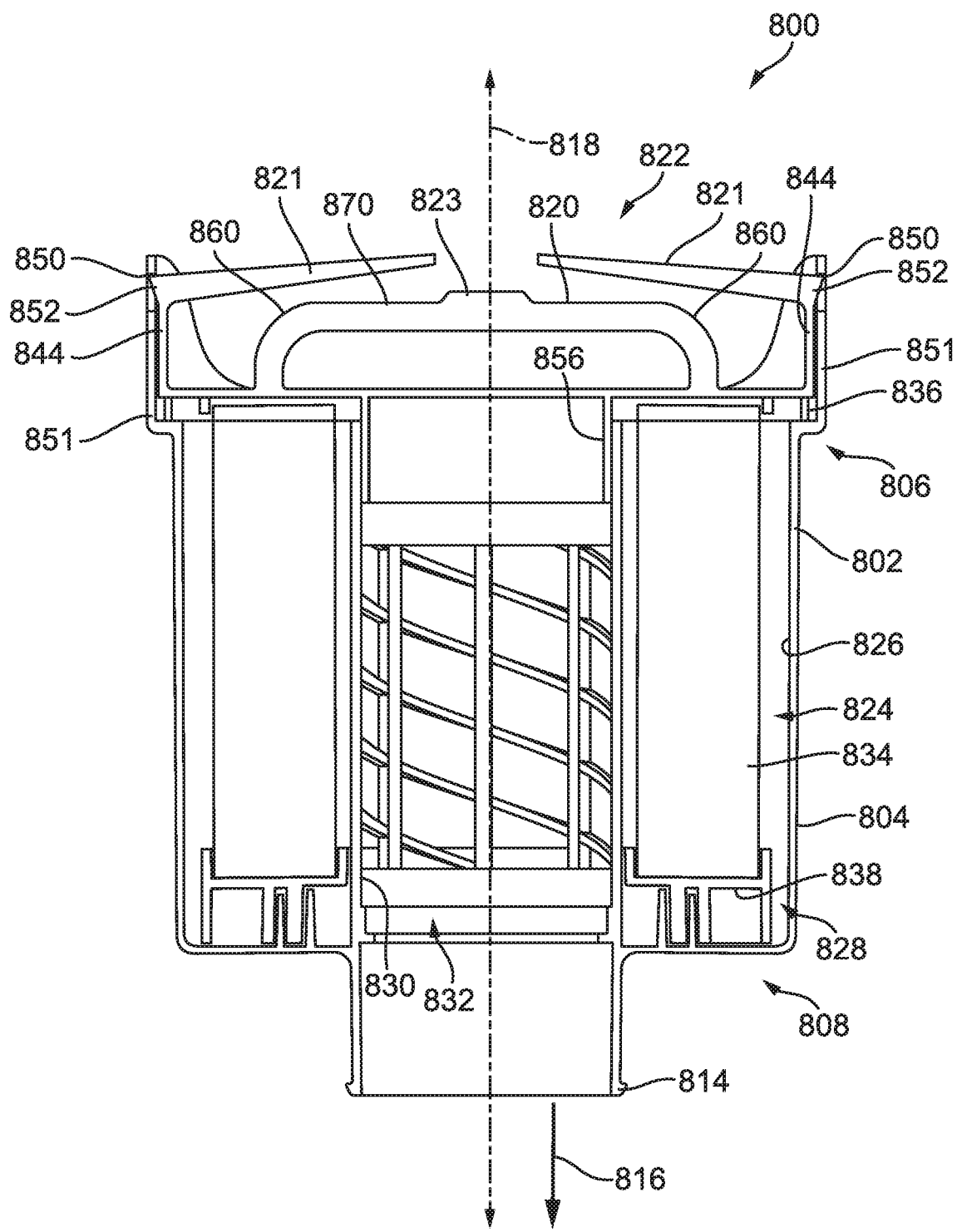
FIG. 31 shows a cross-sectional view of the air cleaner of FIG. 29.
Figure 32:
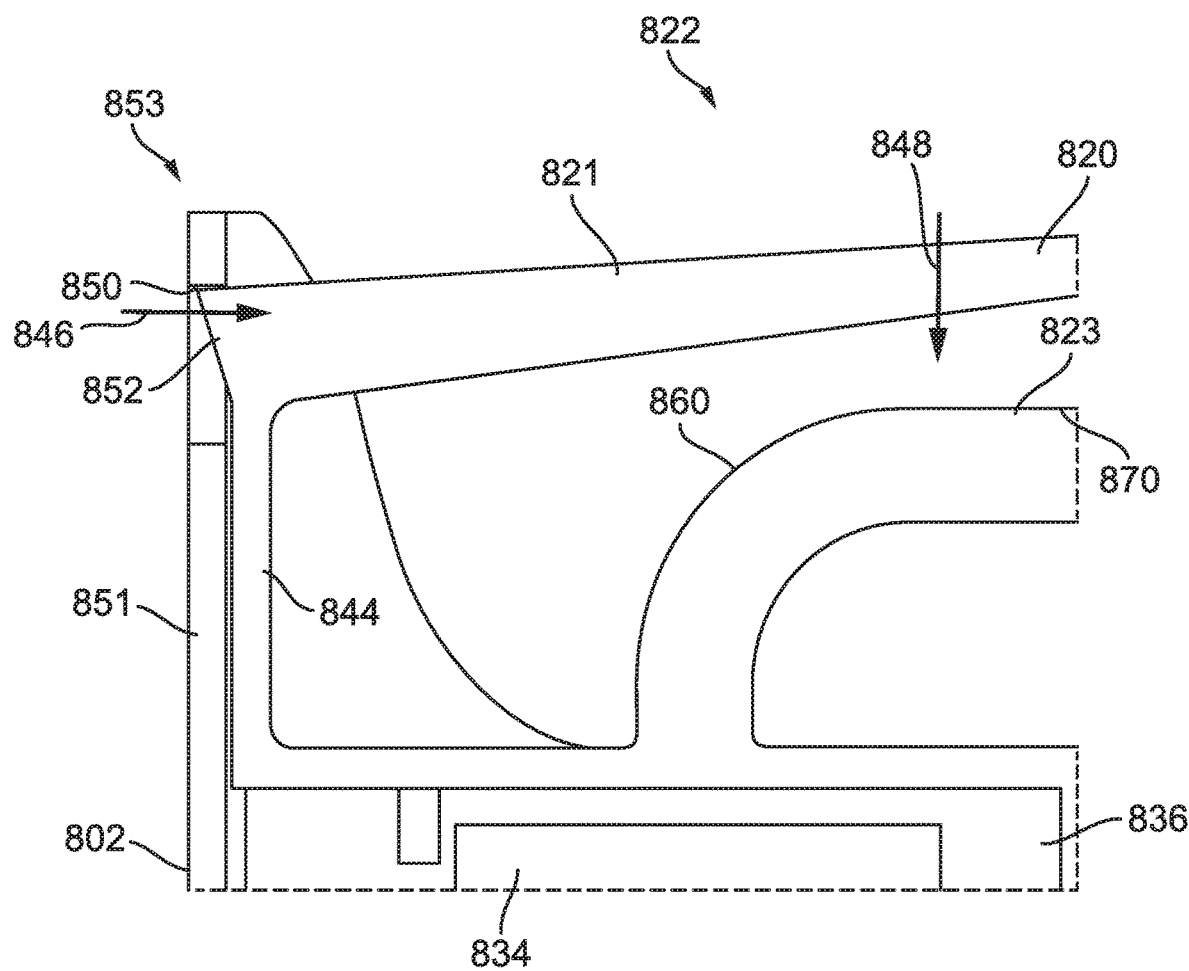
FIG. 32 shows a portion of a cross-sectional view of the air cleaner of FIG. 29.

As shown in FIG. 31, the air cleaner 800 includes a filter element 824. The filter element 824 is disposed in the housing 802 and axially extends between first and second axial ends that are respectively adjacent to the first and second ends 806, 808 of the housing 802. The air filter element 824 includes filter media 834 arranged in a cylindrical manner with an inner surface 830 defining a clean air outlet channel 832. An annular dirty air inlet channel 828 is defined between the outer surface of the filter element 824 and the housing inner surface 826. A first end of the filter media 834 is fitted with a top endplate 836 and a second end of the filter media 834 is fitted with a bottom endplate 838. In some embodiments, urethane adhesive attaches the filter media 834 to the cover 820 and as such, forms and acts as the top endplate 836. In this way, when the cover 820 and filter element 824 are assembled with the housing 802, the urethane adhesive axially seals the cover 820 to the housing 802. In some embodiments, the filter media 834 is embedded directly into the top endplate 836. In some embodiments, the top endplate 836 of the filter element 824 engages with the housing inner surface 826 such that a radial seal is created between the filter element 824 and the housing 802. The filter element 824 is axially insertable into the housing 802 through the first end 806 when the first end 806 is in an open condition (e.g., cover 820 is decoupled and removed from the housing 802). In addition, when the first end 806 is in an open condition, a user can access and service the filter element 824.

At the first end 806, the housing 802 includes a top perimeter edge 807 and two axially extending housing walls 851. The housing walls 851 extend above the top perimeter edge 807 and each housing wall 851 is positioned substantially opposite each other relative to the longitudinal axis 818. Each housing wall 851 forms a retainer 850 configured to receive a latch 852 of a handle assembly 822 of the cover 820 as described further below.

Figure 30:
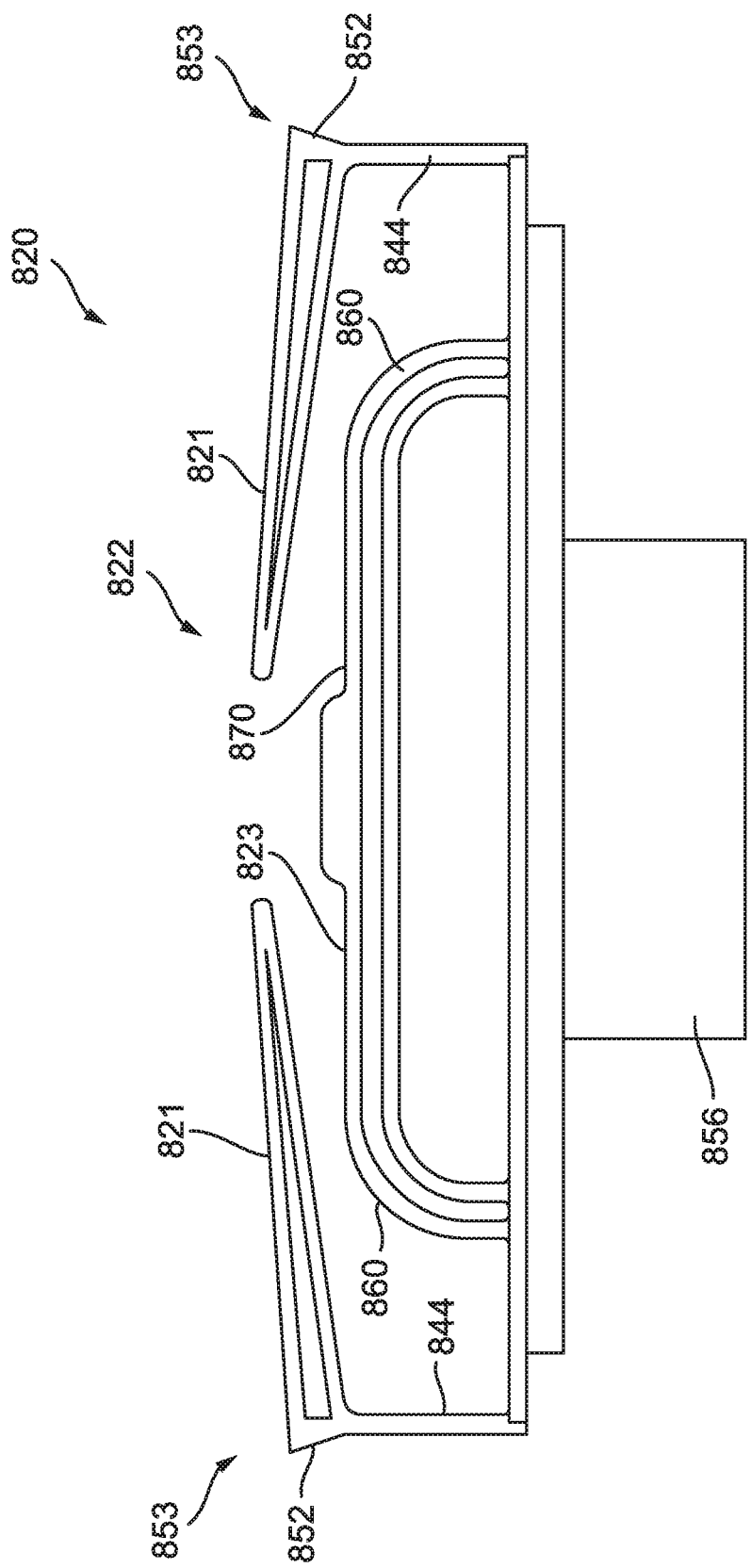
FIG. 30 shows a front view of a cover of the air cleaner of FIG. 29.

Referring to FIG. 30, the cover 820 includes a handle assembly 822 configured to couple and decouple the cover 820 to and from the housing 802. The handle assembly 822 is formed as an integral piece with the cover 820. The handle assembly 822 includes two flexible handle members 821 and a static handle member 823, with the two flexible handle members 821 positioned above the static handle member 823 (e.g., further away from housing 802) and extending substantially between ends 853 of the handle assembly 822. The flexible handle members 821 are flexible in nature and the static handle member 823 is fixed. The static handle member 823 includes a flat portion 870 joining two curved portions 860 positioned nearer the perimeter 827 of the cover 820. The flat portion 870 of the static handle member 823 acts as a stop for the flexible handle members 821 to ensure that the flexible handle members 821 are not pushed too far downward. A user can grasp the handle assembly 822 by grasping both the flexible handle members 821 and the static handle member 823 together and thereby move the flexible handle members 821 downward toward the static handle member 823 which remains fixed.

Each end 853 of the handle assembly 822 includes a latch 852. A latch 852 is positioned on each of the flexible handle members 821. The latch 852 engages with a retainer 850 of the housing 802 when the cover 820 is coupled to the housing 802. The engagement of the latch 852 with the retainer 850 prevents upward axial movement of the cover 820 relative to the housing 802. As the flexible handle members 821 are moved downward toward the static handle member 823 along direction 848, the latches 852 move inward along direction 846 and disengage from the retainers 850 on the housing 802. A gap 825 is formed between the static handle member 823 and the first end 806 of the housing 802 to allow a user to grasp the handle assembly 822 from underneath and pull in a substantially vertical direction along axis 818. Simultaneously, the user squeezes the flexible handle members 821 toward the static handle member 823 to disengage latches 852 from retainers 850 to remove the cover 820 from the housing 802. When replacing the cover 820, a user can use handle assembly 822 to align latches 852 with retainers 850 and move cover 820 downward along axis 818 until latches 852 engage retainers 850, thereby snapping the cover 820 into place on the housing 802.

Referring to FIGS. 33-36, an air cleaner 900 according to another example embodiment is shown. The air cleaner 900 includes a housing 902 extending axially along a longitudinal axis 918 and having an annular sidewall 904 extending between a first end 906 and a second end 908, where the sidewall 904 includes an air inlet 910 configured to direct air into the housing 902 substantially along inlet direction 912. A cover 920 is coupled to the first end 906, as described further herein. The cover 920 is removable to enable replacement and servicing of the filter element 924 described below. When the cover 920 is coupled to the first end 906, the first end 906 is in a closed condition and when the cover 920 is decoupled and removed from the housing 902, the first end 906 is in an open position. The second end 908 includes an air outlet 914 configured to discharge clean filtered air substantially along outlet direction 916.

Figure 33:
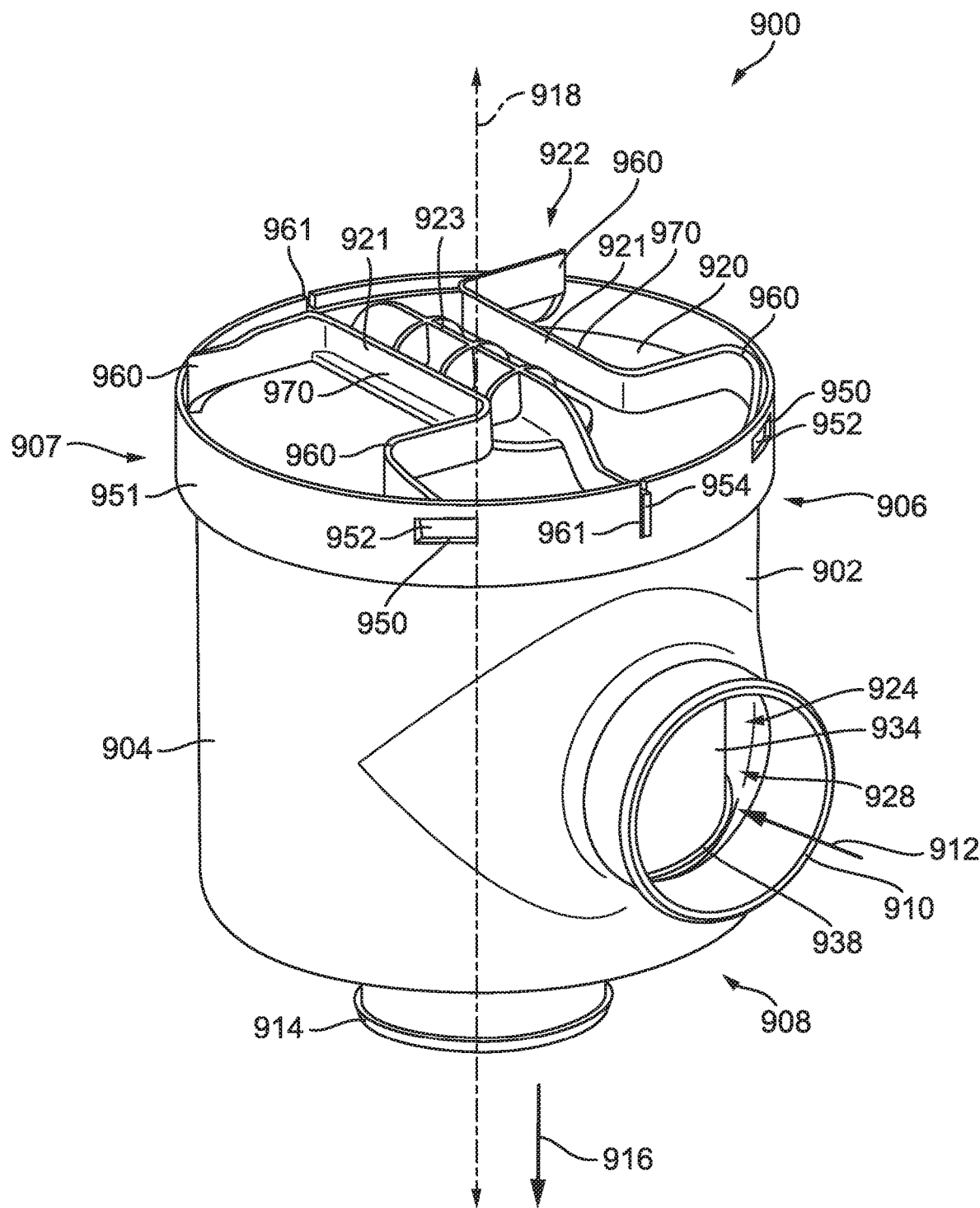
FIG. 33 shows a perspective view of an air cleaner, according to another example embodiment.

As shown in FIG. 33, the air cleaner 900 includes a filter element 924. The filter element 924 is disposed in the housing 902 and axially extends between first and second axial ends that are respectively adjacent to the first and second ends 906, 908 of the housing 902. The air filter element 924 includes filter media 934 arranged in a cylindrical manner with an inner surface 930 defining a clean air outlet channel 932. An annular dirty air inlet channel 928 is defined between the outer surface of the filter element 924 and the housing inner surface. A first end of the filter media 934 is fitted with a top endplate and a second end of the filter media 934 is fitted with a bottom endplate 938. In some embodiments, urethane adhesive attaches the filter media 934 to the cover 920 and as such, forms and acts as the top endplate. In this way, when the cover 920 and filter element 924 are assembled with the housing 902, the urethane adhesive axially seals the cover 920 to the housing 902. In some embodiments, the filter media 934 is embedded directly into the top endplate 936. In some embodiments, the top endplate 936 of the filter element 924 engages with the housing inner surface such that a radial seal is created between the filter element 924 and the housing 902. The filter element 924 is axially insertable into the housing 902 through the first end 906 when the first end 906 is in an open condition (e.g., cover 920 is decoupled and removed from the housing 902). In addition, when the first end 906 is in an open condition, a user can access and service the filter element 924.

At the first end 906, the housing 902 includes a stepped portion 907 including an axially extending perimeter wall 951. The perimeter wall 951 extends around the entire perimeter of the housing 902. The perimeter wall 951 includes grooves 961 configured to align with protrusions 954 on the cover 920. The perimeter wall 951 also includes retainers 950 each configured to receive a latch 952 of a handle assembly 922 of the cover 920 as described further below.

Figure 34:
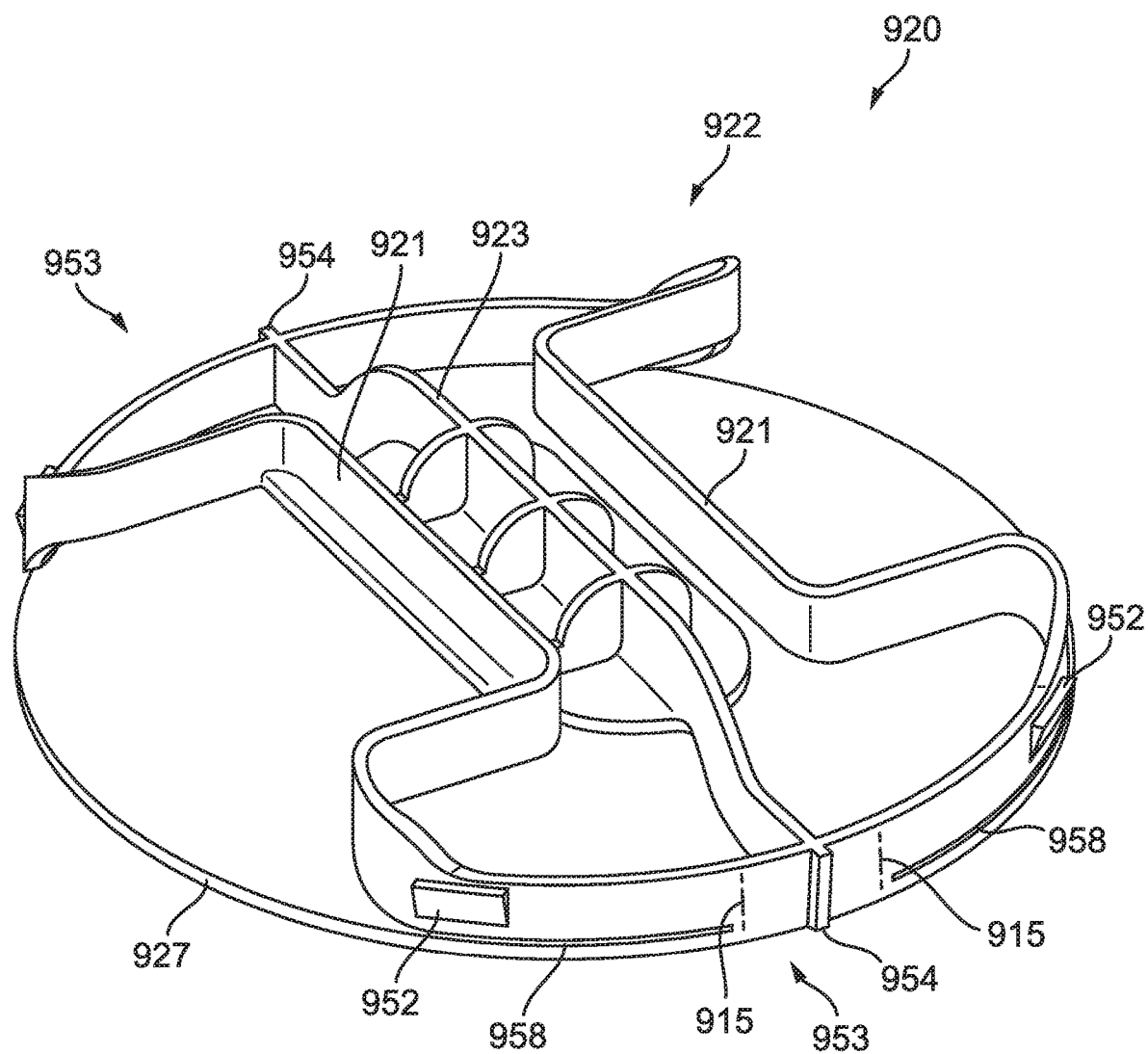
FIG. 34 shows a perspective view of a cover of the air cleaner of FIG. 33.
Figure 35:
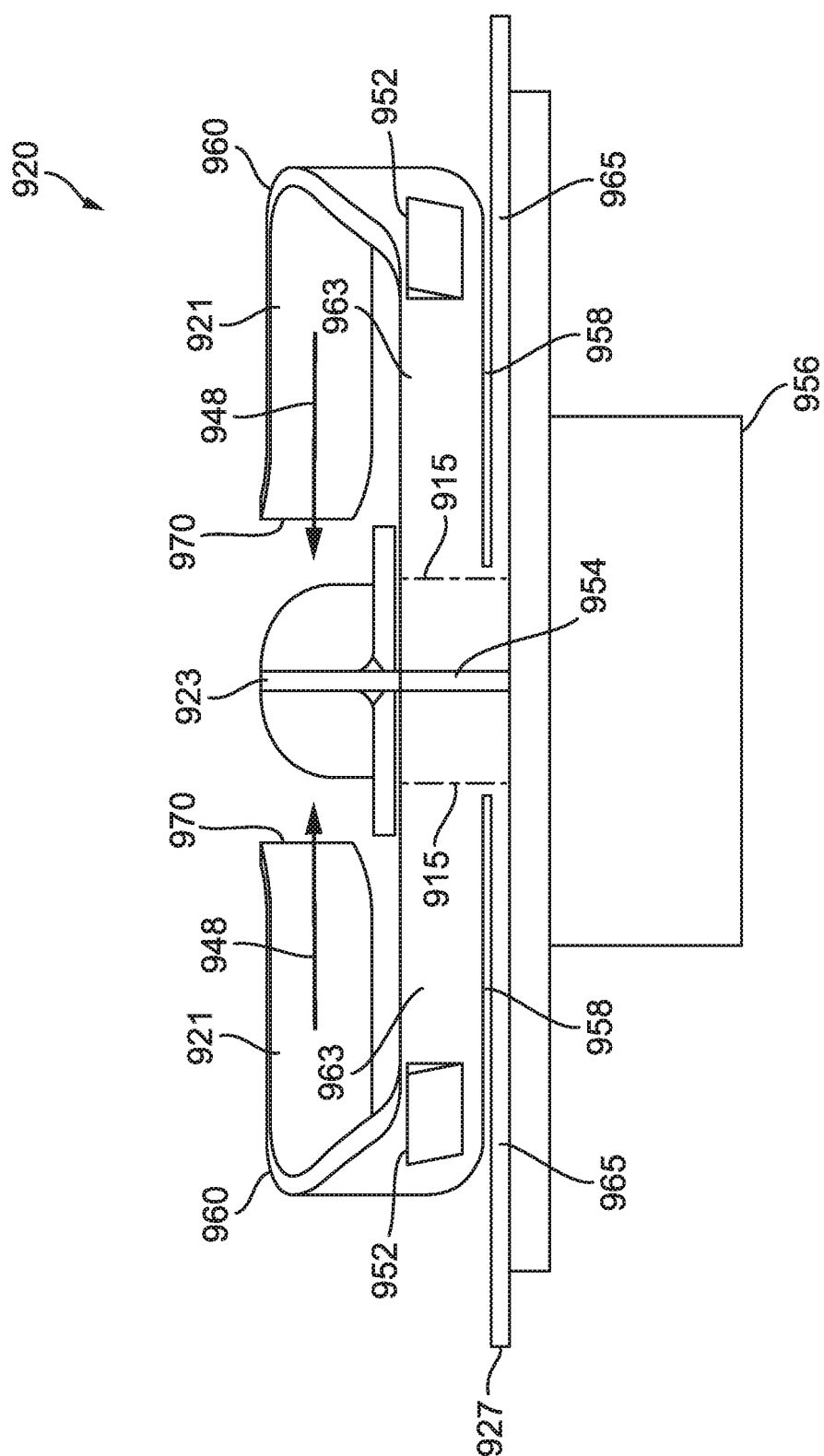
FIG. 35 shows a front view of the cover of the air cleaner of FIG. 33.
Figure 36:
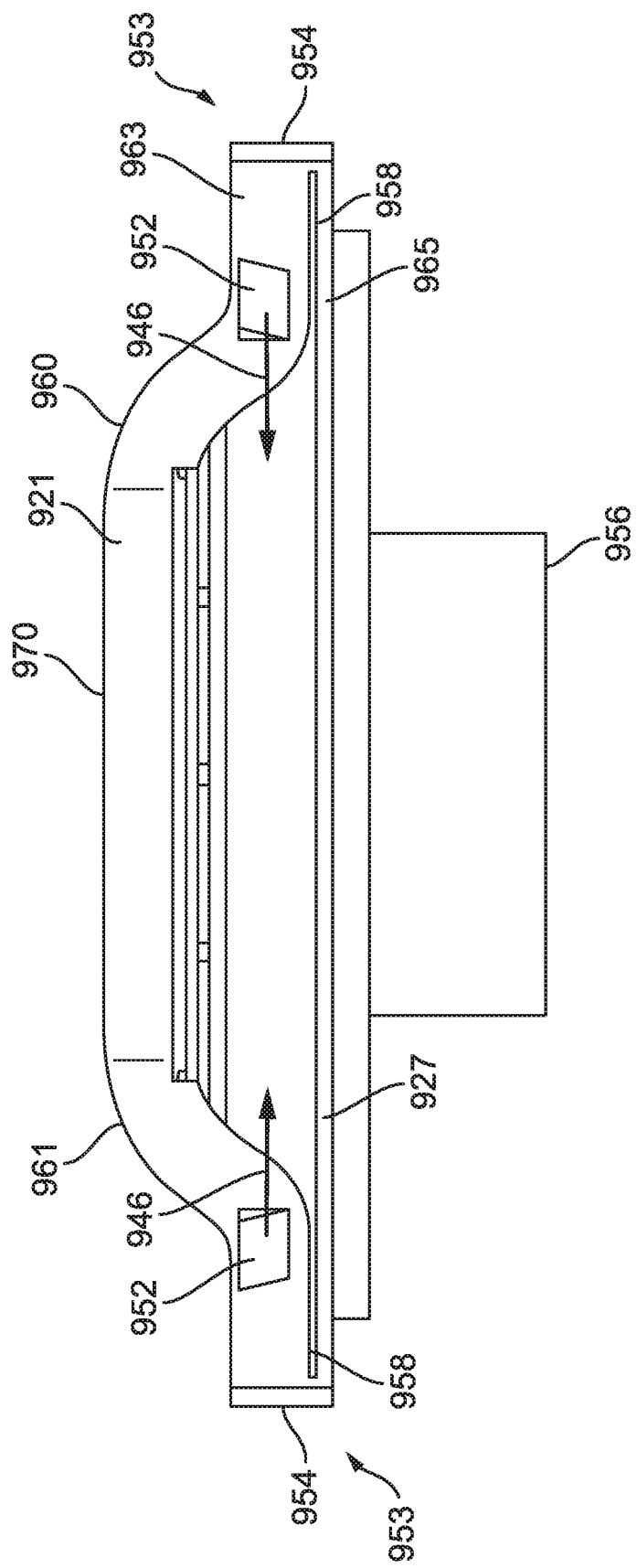
FIG. 36 shows a side view of the cover of the air cleaner of FIG. 33.
Figure 37:
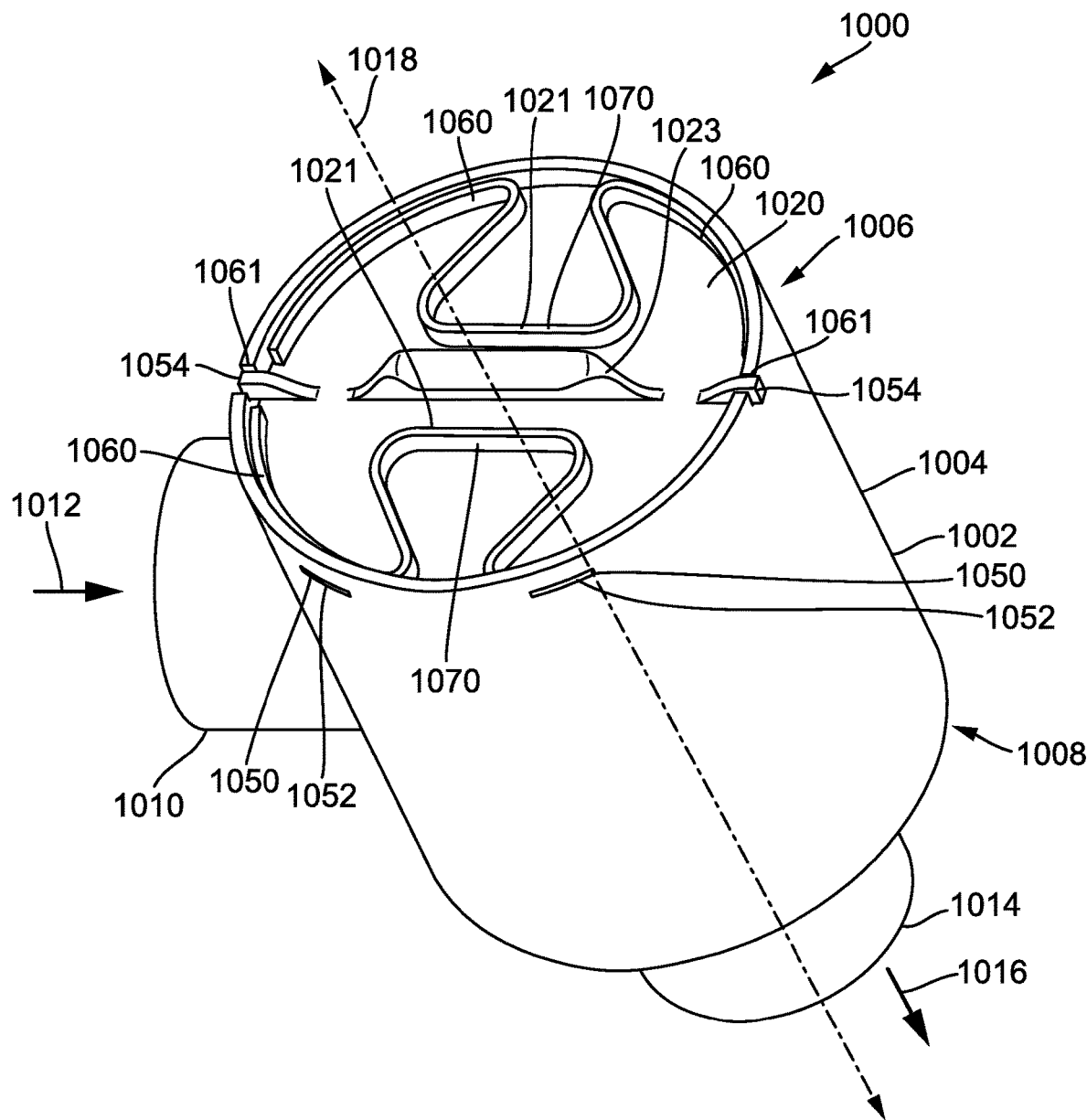
FIG. 37 shows a perspective view of an air cleaner, according to another example embodiment.

Referring to FIGS. 34-36, the cover 920 includes a handle assembly 922 configured to couple and decouple the cover 920 to and from the housing 902. The handle assembly 922 is formed as an integral piece with the cover 920. The handle assembly 922 includes two flexible handle members 921 and a static member 923 extending substantially between ends 953 of the handle assembly 922. Each of the flexible handle members 921 includes a flat portion 970 joining two curved portions 960 nearer the perimeter 927 of the cover 920. The flexible handle members 921 are positioned outside (e.g., radially further from the axis 918) the static member 923 at a substantially equal distance from the static member 923. The flexible handle members 921 are flexible in nature such that a user can squeeze the flexible handle members 921 toward each other and toward the static member 923 (e.g., squeeze flexible handle members 921 inward toward axis 918 along direction 948 shown in FIG. 35). Each flexible handle member 921 is flexible approximately about a pivot 915. The static member 923 is fixed and includes two protrusions 954 extending outward from the cover 920 from each end 953. The protrusions 954 are configured to align with and fit into the grooves 961 formed on the housing 902. The protrusions 954 and grooves 961 ensure that the cover 920 is in the correct orientation when installed onto the housing 902.

Each flexible handle member 921 includes two latches 952, one proximate each end 953. The latches 952 engage with retainers 950 of the housing 902 when the cover 920 is coupled to the housing 902. The engagement of the latches 952 with retainers 950 prevents upward axial movement of the cover 920 relative to the housing 902. As the flexible handle members 921 are moved inward toward each other (e.g., along direction 948), the latches 952 move radially inward along direction 946 (shown in FIG. 36) and disengage from the retainers 950 on the housing 902. As shown in FIG. 35, the handle assembly includes a movable portion 963 and a fixed portion 965 divided by a slot 958 formed on each end 953 (e.g., between the flexible handle member 921 and the top surface of the cover 920). The slot 958 allows the movable portion 963, including the latch 952, to move radially inward toward axis 918 along direction 946 and away from the retainer 950. A user can squeeze the flexible handle members 921 toward each other to disengage latches 952 from retainers 950 while simultaneously pulling upward on the handle assembly 922 to remove the cover 920 from the housing 902. When replacing the cover 920, a user can use handle assembly 922 to align protrusions 954 at each end 953 of the cover 920 with grooves 961 in the housing 902 and move cover 920 downward along axis 918 until latches 952 engage retainers 490, thereby snapping the cover 920 into place on the housing 902.

Referring to FIGS. 37-40, an air cleaner 1000 according to another example embodiment is shown. The air cleaner 1000 includes a housing 1002 extending axially along a longitudinal axis 1018 and having an annular sidewall 1004 extending between a first end 1006 and a second end 1008, where the sidewall 1004 includes an air inlet 1010 configured to direct air into the housing 1002 substantially along inlet direction 1012. A cover 1020 is coupled to the first end 1006, as described further herein. The cover 1020 is removable to enable replacement and servicing of the filter element 1024 described below. When the cover 1020 is coupled to the first end 1006, the first end 1006 is in a closed condition and when the cover 1020 is decoupled and removed from the housing 1002, the first end 1006 is in an open position. The second end 1008 includes an air outlet 1014 configured to discharge clean filtered air substantially along outlet direction 1016. The air cleaner 1000 includes a filter element disposed in the housing 1002 and axially extending between first and second axial ends that are respectively adjacent to the first and second ends 1006, 1008 of the housing 1002. The air filter element includes filter media arranged in a cylindrical manner with an inner surface defining a clean air outlet channel. An annular dirty air inlet channel is defined between the outer surface of the filter element and the housing inner surface. A first end of the filter media is fitted with a top endplate and a second end of the filter media is fitted with a bottom endplate. In some embodiments, urethane adhesive attaches the filter media to the cover 1020 and as such, forms and acts as the top endplate. In this way, when the cover 1020 and filter element are assembled with the housing 1002, the urethane adhesive axially seals the cover 1020 to the housing 1002. In some embodiments, the filter media 1034 is embedded directly into the top endplate 1036. In some embodiments, the top endplate 1036 of the filter element 1024 engages with the housing inner surface such that a radial seal is created between the filter element 1024 and the housing 1002. The filter element is axially insertable into the housing 1002 through the first end 1006 when the first end 1006 is in an open condition (e.g., cover 1020 is decoupled and removed from the housing 1002). In addition, when the first end 1006 is in an open condition, a user can access and service the filter element.

At the first end 1006, the housing 1002 includes grooves 1061 configured to align with protrusions 1054 on the cover 1020. The housing 1002 also includes retainers 1050 each configured to receive a latch 1052 of a handle assembly 1022 of the cover 1020 as described further below.

Figure 38:
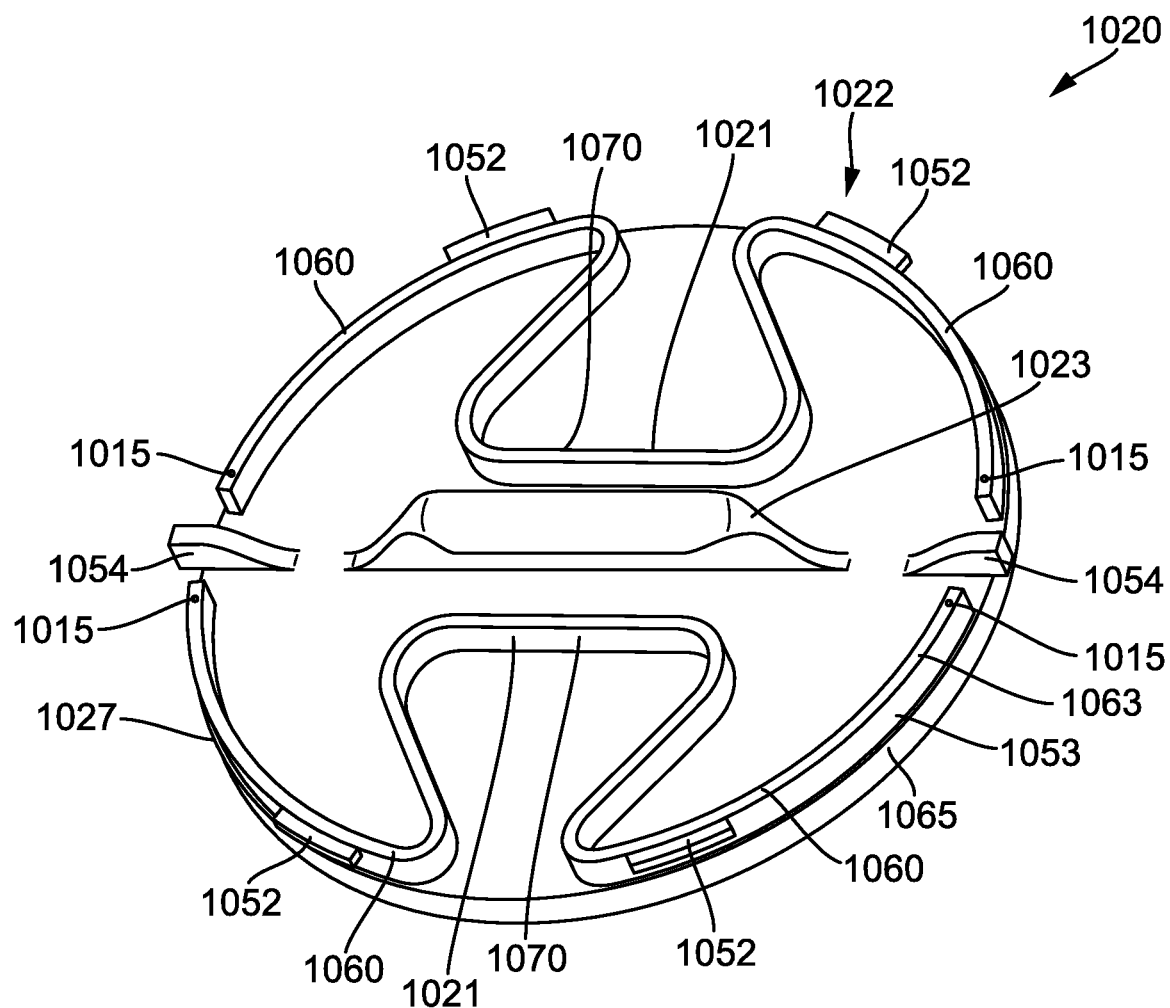
FIG. 38 shows a perspective view of a cover of the air cleaner of FIG. 37.
Figure 39:
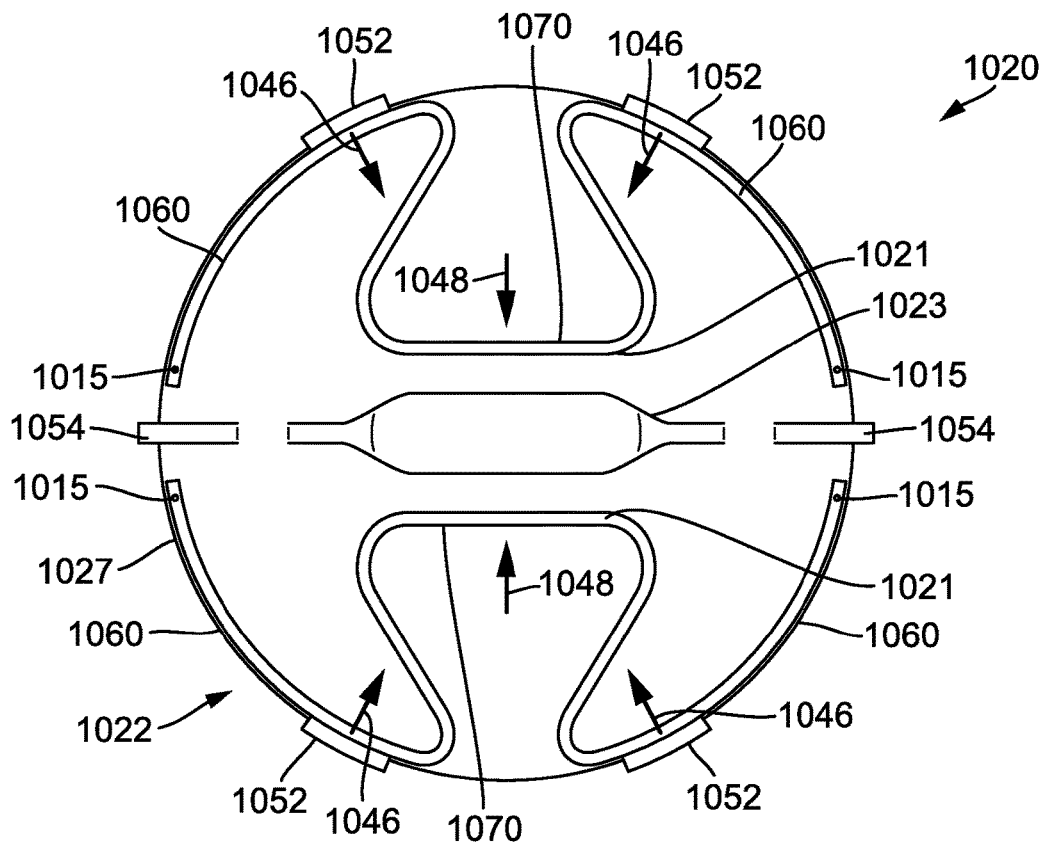
FIG. 39 shows a top view of the cover of the air cleaner of FIG. 37.
Figure 40:
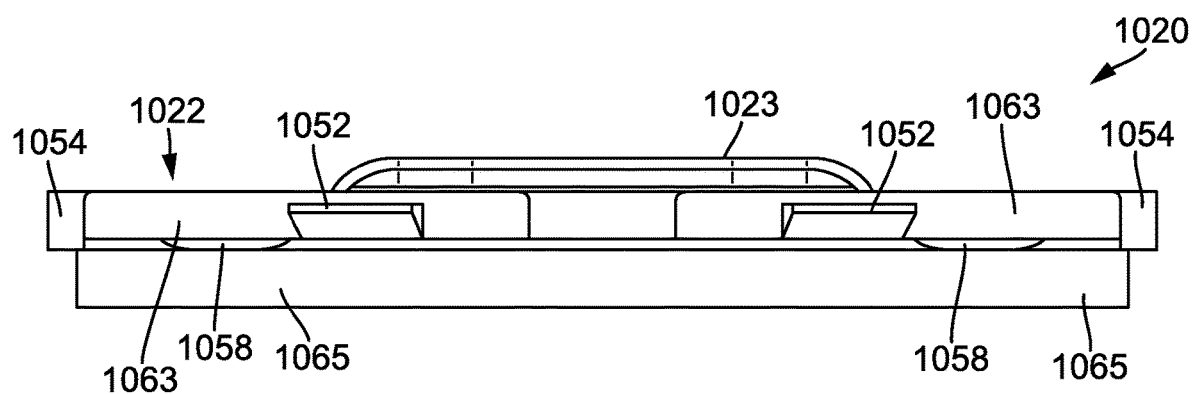
FIG. 40 shows a side view of the cover of the air cleaner of FIG. 37.

Referring to FIGS. 38-40, the cover 1020 includes a handle assembly 1022 configured to couple and decouple the cover 1020 to and from the housing 1002. The handle assembly 1022 is formed as an integral piece with the cover 1020. The handle assembly 1022 includes two flexible handle members 1021 and a static member 1023 extending substantially between ends 1053 of the handle assembly 1022. Each of the flexible handle members 1021 includes a flat portion 1070 joining two curved portions 1060 nearer the perimeter 1027 of the cover 1020. The flexible handle members 1021 are positioned outside (e.g., radially further from the axis 1018) the static member 1023 at a substantially equal distance from the static member 1023. The flexible handle members 1021 are flexible in nature such that a user can squeeze the flexible handle members 1021 toward each other and toward the static member 1023 (e.g., squeeze flexible handle members 1021 inward toward axis 1018 along direction 1048 shown in FIG. 39). Each flexible handle member 1021 is flexible approximately about a pivot 1015. The static member 1023 is fixed and includes two protrusions 1054 extending outward from the cover 1020 from each end 1053. The protrusions 1054 are configured to align with and fit into the grooves 1061 formed on the housing 1002. The alignment of the protrusions 1054 and grooves 1061 ensure that the cover 1020 is in the correct orientation when installed onto the housing 1002.

Each flexible handle member 1021 includes two latches 1052 positioned proximate the perimeter 1027 of the cover 1020. The latches 1052 engage with retainers 1050 of the housing 1002 when the cover 1020 is coupled to the housing 1002. The engagement of the latches 1052 with retainers 1050 prevents upward axial movement of the cover 1020 relative to the housing 1002. As the flexible handle members 1021 are moved inward toward each other (e.g., along direction 1048), the latches 1052 move radially inward along direction 1046 (shown in FIG. 39) and disengage from the retainers 1050 on the housing 1002. As shown in FIGS. 38 and 40, the handle assembly 1022 includes a movable portion 1063 and a fixed portion 1065 divided by a slot 1058 formed between the flexible handle member 1021 and the top surface of the cover 1020. The slot 1058 allows the movable portion 1063, including the latches 1052, to move radially inward toward axis 1018 along direction 1046 and away from the retainer 1050. A user can squeeze the flexible handle members 1021 toward each other to disengage latches 1052 from retainers 1050 while simultaneously pulling upward on the handle assembly 1022 to remove the cover 1020 from the housing 1002. When replacing the cover 1020, a user can use handle assembly 1022 to align protrusions 1054 at each end 1053 of the handle assembly 1022 with grooves 1061 in the housing 1002 and move cover 1020 downward along axis 1018 until latches 1052 engage retainers 1090, thereby snapping the cover 1020 into place on the housing 1002.

Figure 41:
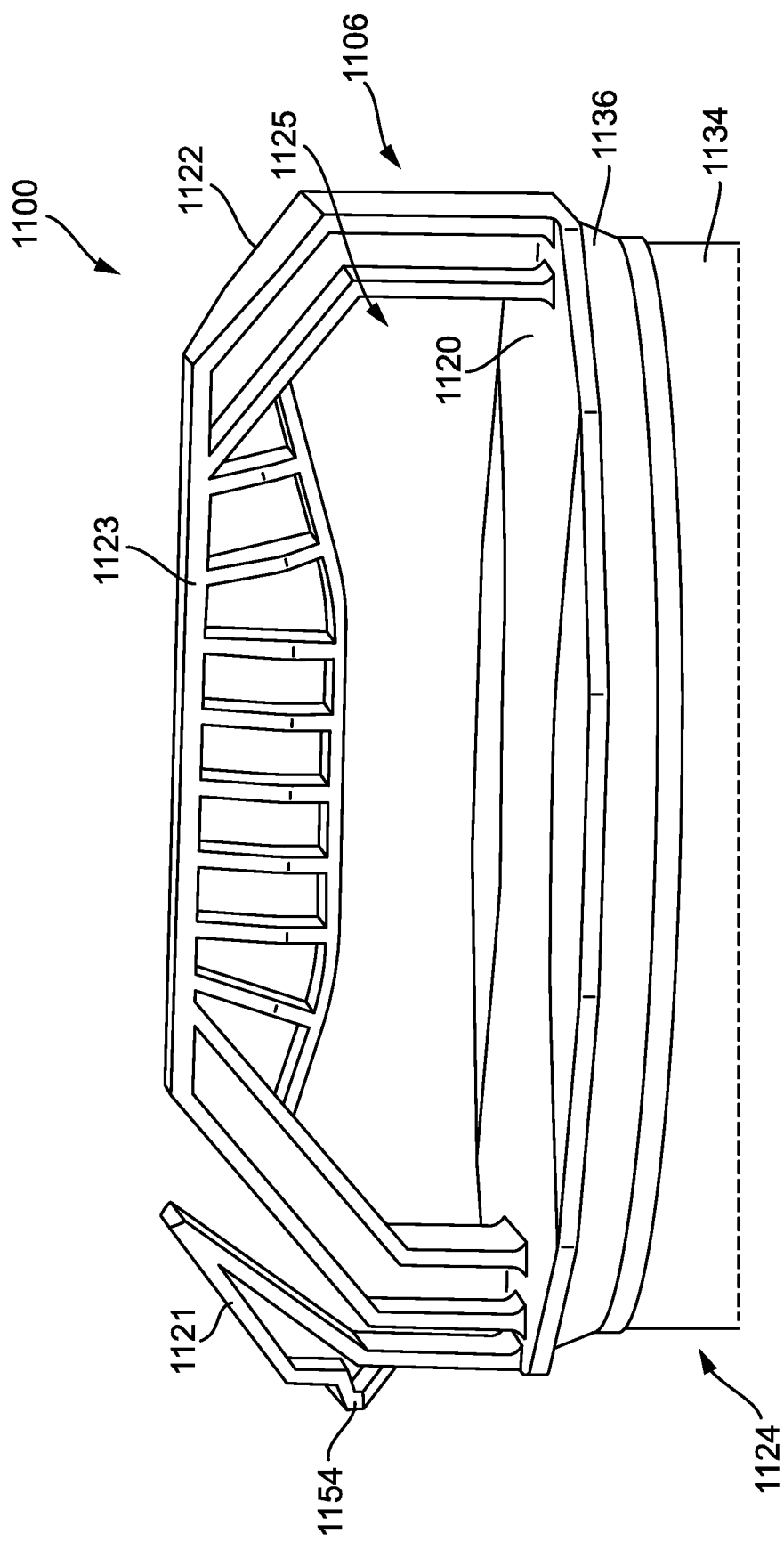
FIG. 41 shows a perspective view of an air cleaner, according to yet another example embodiment.
Figure 42:
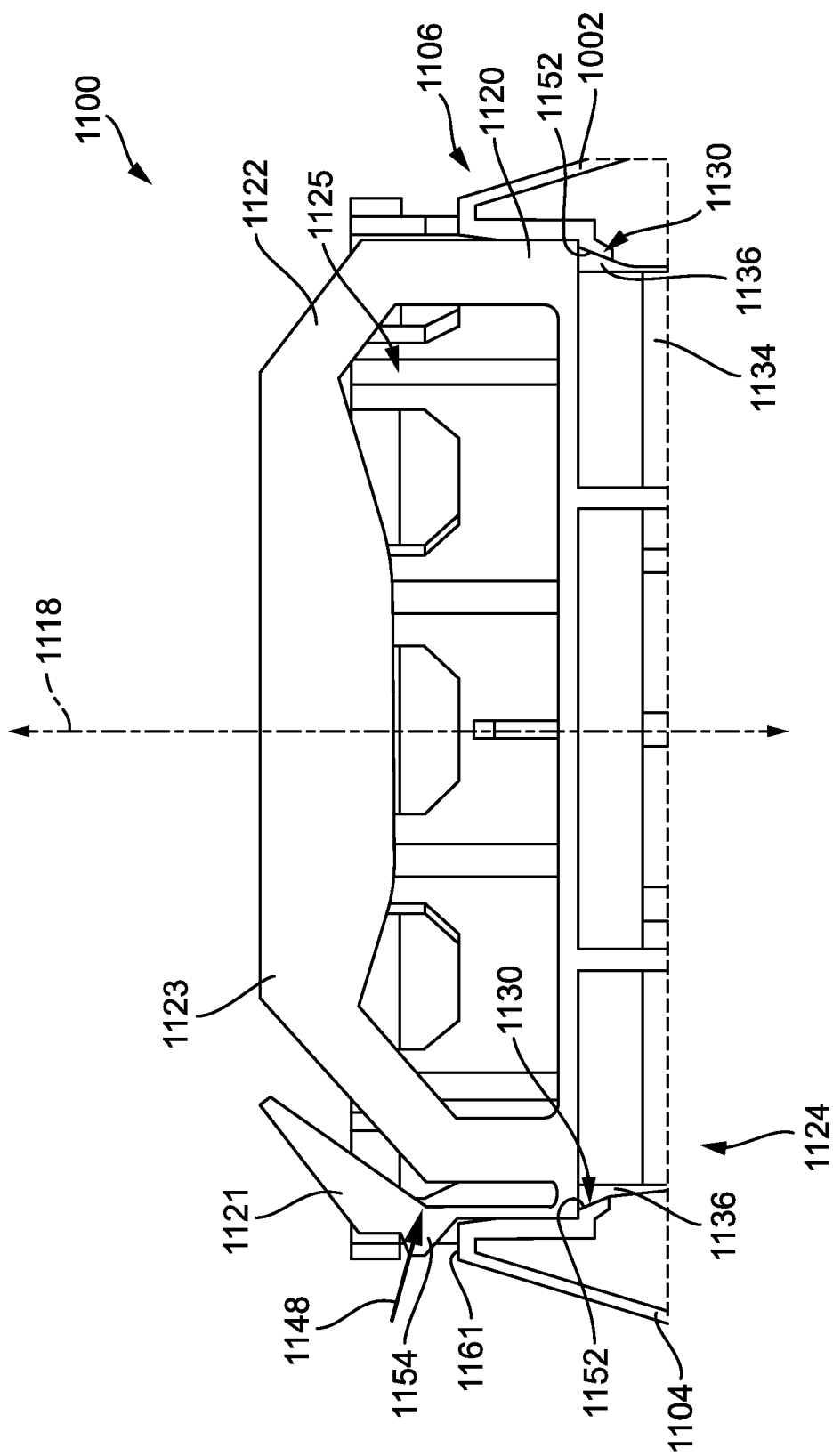
FIG. 42 shows a cross-sectional view of the air cleaner of FIG. 41.

Referring to FIGS. 41-42, an air cleaner 1100 is shown according to another example embodiment. FIG. 41 shows a perspective view of the air cleaner 1100, and FIG. 42 shows a cross-sectional view of the air cleaner 1100. The air cleaner 1100 includes a housing 1102 extending axially along a longitudinal axis 1118 and having an annular sidewall 1104 extending between a first end 1106 and a second end (not shown). A cover 1120 is coupled to the first end 1106. The cover 1120 is removable to enable replacement and servicing of the filter element 1124 described below. When the cover 1120 is coupled to the first end 1106, the first end 1106 is in a closed condition and when the cover 1120 is decoupled and removed from the housing 1102, the first end 1106 is in an open position.

As shown in FIGS. 41-42, the air cleaner 1100 includes a filter element 1124. The filter element 1124 is disposed in the housing 1102 and axially extends between first and second axial ends that are respectively adjacent to the first end 1106 and second end of the housing 1102. The air filter element 1124 includes filter media 1134 arranged in a cylindrical manner. A first end of the filter media 1134 is fitted with a top endplate 1136. In some embodiments, the top endplate 1136 of the filter element 1124 engages with an inner wall 1152 of the housing 1102 such that a radial seal 1130 is created between the filter element 1124 and the housing 1102. In some embodiments, the filter media 1134 is embedded directly into the top endplate 1136. In some embodiments, urethane adhesive attaches the filter media 1134 to the cover 1120 and as such, forms and acts as the top endplate 1136. In this way, when the cover 1120 and filter element 1124 are assembled with the housing 1102, the urethane adhesive axially seals the cover 1120 to the housing 1102. The filter element 1124 is axially insertable into the housing 1102 through the first end 1106 when the first end 1106 is in an open condition (e.g., cover 1120 is decoupled and removed from the housing 1102). In addition, when the first end 1106 is in an open condition, a user can access and service the filter element 1124. As shown in FIG. 42, the filter element 1124 is integrated with the cover 1120.

The cover 1120 includes a handle assembly 1122 configured to couple and decouple the cover 1120 to and from the housing 1102. The handle assembly 1122 is formed as an integral piece with the cover 1120. The handle assembly 1122 includes a flexible portion 1121 and a static portion 1123. The static portion 1123 is fixed in position. The flexible portion 1121 is flexible in nature such that a user can squeeze the flexible portion 1121 inward toward axis 1118 along direction 1148 shown in FIG. 42). The flexible portion 1121 include a protrusion 1154 configured to align with and fit into a slot 1161 formed on the housing 1102. The alignment of the protrusion 1154 and slot 1161 ensure that the cover 1120 is in the correct orientation when installed onto the housing 1102. The engagement of the protrusion 1154 with the slot 1161 also prevents upward axial movement of the cover 1120 relative to the housing 1102. As the flexible portion 1121 is moved inward toward the axis 1118, the protrusion 1154 moves radially inward along direction 1148 and disengages from the slot 1161 on the housing 1102.

A gap 1125 is formed between the handle assembly 1122 and the first end 1106 of the housing 1102 to allow a user to grasp the handle assembly 1122 from underneath and pull in a substantially vertical direction along axis 1118. Accordingly, a user can squeeze the flexible portion 1121 toward the axis 1118 to disengage the protrusion 1154 from the slot 1161 while simultaneously pulling upward on the handle assembly 1122 to remove the cover 1120 from the housing 1102. When replacing the cover 1120, a user can use handle assembly 1122 to align the protrusion 1154 with the slot 1161 and move cover 1120 downward along axis 1118 until the protrusion 1154 engages with the slot 1161, thereby snapping the cover 1120 into place on the housing 1102.

Using the covers, handle assemblies and filter housings discussed herein, a cover of an air cleaner can be decoupled from an air cleaner housing using only one hand. The coupling mechanisms described herein can double as latching mechanisms and handles making coupling and decoupling of the cover to and from a filter housing easier for a user. When removing a cover, the user can grasp the handle assembly and thus disengage latches on the cover from retainers on the filter housing using a single hand and no tools. In addition, no separate latch mechanisms are required for coupling and decoupling of the cover thereby reducing the manufacturing cost of such assemblies.

References herein to the positions of elements (e.g., "top," "bottom," "above," "below," etc.) are merely used to describe the orientation of various elements in the Figures. It should be noted that the orientation of various elements may differ according to other example embodiments, and that such variations are intended to be encompassed by the present disclosure. Further, the formation of a passage by one or more surfaces can comprise a wide variety of passage cross-sectional shapes, for example, passages having circular, rectangular, oval, etc. cross-sectional shapes.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications to the flow structures are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. An air cleaner assembly comprising:
   a filter housing extending axially along a longitudinal axis and comprising:
      at least one sidewall extending between a first housing end and a second housing end; and
      a retainer formed proximate at least one of the first housing end and the second housing end; and
   a cover removably coupled to at least one of the first housing end and the second housing end, the cover comprising:
      a flexible latch portion positioned on an axial surface of the cover, the flexible latch portion having a protrusion configured to releasably engage the retainer of the filter housing, and
      a static handle portion positioned on the axial surface of the cover adjacent to the flexible portion;
   wherein the filter housing is configured to accept a filter element axially insertable into the filter housing when the cover is separated from the filter housing.

2. The air cleaner assembly of claim 1, wherein the filter housing comprises a top perimeter edge and a plurality of axially extending walls proximate the top perimeter edge, each axially extending wall positioned substantially opposite another axially extending wall relative to the longitudinal axis.

3. The air cleaner assembly of claim 1, wherein the air cleaner housing assembly defines a gap between the handle assembly and the filter housing, allowing a user to grasp the handle assembly.

4. The air cleaner assembly of claim 1, wherein the filter element comprises filter media arranged in a cylindrical manner, the filter media comprising a first end fitted with a top endplate and a second end fitted with a bottom endplate; wherein the filter media is attached to the cover using urethane adhesive, the urethane adhesive forming and acting as the top endplate.

5. An air cleaner assembly comprising:
   a filter housing extending axially along a longitudinal axis and comprising:

at least one sidewall extending between a first housing end and a second housing end;
a retainer formed proximate at least one of the first housing end and the second housing end; and
a top perimeter edge and a plurality of axially extending walls proximate the top perimeter edge, each axially extending wall positioned substantially opposite another axially extending wall relative to the longitudinal axis; and
a cover removably coupled to at least one of the first housing end and the second housing end, the cover comprising a handle assembly comprising a latch configured to releasably engage the retainer of the filter housing,
wherein the filter housing is configured to accept a filter element axially insertable into the filter housing when the cover is separated from the filter housing, and
wherein each of the plurality of axially extending walls comprises a groove configured to receive the handle assembly.

6. The air cleaner assembly of claim 5, wherein the handle assembly comprises two outer handle members positioned opposite each other relative to the longitudinal axis.

7. The air cleaner assembly of claim 6, wherein the two outer handle members are flexible such that a user can squeeze the two outer handle members in a direction toward the longitudinal axis.

8. An air cleaner assembly comprising:
a filter housing extending axially along a longitudinal axis and comprising:
at least one sidewall extending between a first housing end and a second housing end; and
a retainer formed proximate at least one of the first housing end and the second housing end; and
a cover removably coupled to at least one of the first housing end and the second housing end, the cover comprising a handle assembly comprising a latch configured to releasably engage the retainer of the filter housing,
wherein the filter housing is configured to accept a filter element axially insertable into the filter housing when the cover is separated from the filter housing,
wherein the filter element comprises filter media arranged in a cylindrical manner, the filter media comprising a first end fitted with a top endplate and a second end fitted with a bottom endplate,
wherein the filter media is attached to the cover using urethane adhesive, the urethane adhesive forming and acting as the top endplate, and
wherein the cover and the filter element are assembled with the filter housing, the urethane adhesive axially sealing the cover to the filter housing.

9. An air cleaner assembly, comprising:
a filter housing extending axially along a longitudinal axis and comprising:
at least one sidewall extending between a first housing end and a second housing end; and
a slot formed proximate at least one of the first housing end and the second housing end;
a cover removably coupled to at least one of the first housing end and the second housing end, the cover comprising:
a flexible latch portion positioned on an axial surface of the cover, the flexible latch portion having a protrusion configured to releasably engage the slot of the filter housing, and
a static handle portion positioned on the axial surface of the cover adjacent to the flexible latch portion; and
a filter element having filter media arranged in a cylindrical manner, the filter media comprising a first end fitted with a top endplate and a second end fitted with a bottom endplate, the filter media attached to the cover using urethane adhesive, the urethane adhesive forming and acting as the top endplate;
wherein the filter housing is configured to accept the filter element axially into the filter housing.

10. The air cleaner assembly of claim 9, wherein the filter media is directly embedded into the top endplate.

11. The air cleaner assembly of claim 9, wherein a radial seal is formed between the filter element and an inner surface of the filter housing.

12. The air cleaner assembly of claim 9, wherein the handle assembly further comprises a static portion;
wherein to remove the filter element from the filter housing, a user grasps the static portion simultaneous to moving the flexible portion toward the longitudinal axis to disengage the protrusion from the slot and axially removes the filter element from the filter housing.

13. An air cleaner assembly, comprising:
a filter housing extending axially along a longitudinal axis and comprising:
at least one sidewall extending between a first housing end and a second housing end; and
a slot formed proximate at least one of the first housing end and the second housing end;
a cover removably coupled to at least one of the first housing end and the second housing end, the cover comprising a handle assembly comprising a flexible portion having a protrusion configured to releasably engage the slot of the filter housing; and
a filter element having filter media arranged in a cylindrical manner, the filter media comprising a first end fitted with a top endplate and a second end fitted with a bottom endplate, the filter media attached to the cover using urethane adhesive, the urethane adhesive forming and acting as the top endplate,
wherein the cover and the filter element are assembled with the filter housing, the urethane adhesive axially sealing the cover to the filter housing.

14. A filter element comprising:
filter media arranged in a cylindrical manner, the filter media comprising a first end fitted with a top endplate;
a cover attached to the filter media using a urethane adhesive which forms and acts as the top endplate such that the urethane adhesive is configured to form a seal between the cover and a filter housing, the cover comprising a handle assembly having a flexible portion and a static portion, the cover and the filter media axially insertable into a filter housing;
wherein the flexible portion of the handle assembly is removably coupled to the filter housing.

15. The filter element of claim 14, wherein the flexible portion comprises a protrusion configured to engage a slot on the filter housing, the flexible portion movable relative to the static portion to move the protrusion in and out of engagement with the slot.

16. The filter element of claim 14, wherein the handle assembly defines a gap in the static portion allowing a user to grasp the handle assembly.

17. The filter element of claim 14, wherein the filter media is embedded directly into the top endplate.

18. An air cleaner assembly comprising:

a filter housing and a cover, the filter housing extending axially along a longitudinal axis and comprising:

at least one sidewall extending between a first housing end and a second housing end; and retaining means formed proximate at least one of the first housing end and the second housing end, the retaining means for retaining a cover with the filter housing;

the cover comprising a handle assembly comprising engaging means for releasably engaging the retaining means of the filter housing;

wherein the retaining means comprises a top perimeter edge and a plurality of axially extending walls proximate the top perimeter edge, each axially extending wall positioned substantially opposite another axially extending wall relative to the longitudinal axis, each of the plurality of axially extending walls comprising a groove configured to receive the engaging means.

19. An air cleaner assembly, comprising:

a filter housing, a cover, and a filter element, the filter housing extending axially along a longitudinal axis and comprising:

at least one sidewall extending between a first housing end and a second housing end; and retaining means for retaining the cover formed proximate at least one of the first housing end and the second housing end;

the cover comprising a handle assembly comprising engaging means for releasably engaging the retaining means of the filter housing; and the filter element having filter media arranged in a cylindrical manner, the filter media comprising a first end fitted with a top endplate and a second end fitted with a bottom endplate, the filter media coupled to the cover using urethane adhesive which forms and acts as the top endplate, the urethane adhesive forming a seal between the cover and the filter housing;

wherein the filter housing is configured to accept the filter element axially into the filter housing.

\* \* \* \* \*